(12) United States Patent
Ozeki et al.

(10) Patent No.: US 8,179,972 B2
(45) Date of Patent: May 15, 2012

(54) IMAGE ENCODING DEVICE, IMAGE DECODING DEVICE, AND INTEGRATED CIRCUIT USED THEREIN

(75) Inventors: Hidekatsu Ozeki, Gifu (JP); Masayasu Iguchi, Hyogo (JP); Takahiro Nishi, Nara (JP); Hiroaki Toida, Osaka (JP); Hiroto Tomita, Fukuoka (JP); Akihiko Inoue, Fukuoka (JP); Takashi Hashimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 1559 days.

(21) Appl. No.: 11/628,733

(22) PCT Filed: Jun. 7, 2005

(86) PCT No.: PCT/JP2005/010419
§ 371 (c)(1),
(2), (4) Date: Dec. 7, 2006

(87) PCT Pub. No.: WO2005/122590
PCT Pub. Date: Dec. 22, 2005

(65) Prior Publication Data
US 2008/0049832 A1    Feb. 28, 2008

(30) Foreign Application Priority Data
Jun. 8, 2004  (JP) .................................. 2004-169726

(51) Int. Cl.
*H04N 7/12* (2006.01)
(52) U.S. Cl. ................................. 375/240.18
(58) Field of Classification Search .......... 375/240.01–240.29; *H04N 7/12*
See application file for complete search history.

(56) References Cited

U.S. PATENT DOCUMENTS
5,168,375 A   12/1992   Reisch et al.
5,331,584 A    7/1994   Kitsuki et al.
(Continued)

FOREIGN PATENT DOCUMENTS
JP   5-181896   7/1993
(Continued)

OTHER PUBLICATIONS
Draft ITU-T Recommendation and Final Draft International Standard of Joint Video Specification (ITU-T Rec. H.264|ISO/IEC 14496-10 AVC), Doc. JVT-G050r1, May 27, 2003, pp. 127-134.
(Continued)

*Primary Examiner* — Y Lee
*Assistant Examiner* — Paola Abi-Nader
(74) *Attorney, Agent, or Firm* — Wenderoth Lind & Ponack, L.L.P.

(57) ABSTRACT

An image decoding device and an encoding device include an arithmetic unit for performing arithmetic processing, an arithmetic data storage unit for storing an arithmetic result by the arithmetic unit, an input selection unit for selecting whether to read pixel data that is to be inputted to the arithmetic unit from compressed image data or from pixel data stored in the arithmetic data storage unit, and inputting the read pixel data to the arithmetic unit, and an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing.

18 Claims, 32 Drawing Sheets

U.S. PATENT DOCUMENTS

| | | | |
|---|---|---|---|
| 5,398,067 A | 3/1995 | Sakamoto | |
| 5,430,556 A | 7/1995 | Ito | |
| 5,471,412 A * | 11/1995 | Shyu | 708/402 |
| 5,719,963 A | 2/1998 | Kazui et al. | |
| 6,157,740 A | 12/2000 | Buerkle et al. | |
| 6,189,021 B1 | 2/2001 | Shyu | |
| 6,587,590 B1 | 7/2003 | Pan | |
| 7,024,052 B2 | 4/2006 | Hirase | |
| 7,139,436 B2 | 11/2006 | Tomita et al. | |
| 7,346,640 B2 * | 3/2008 | Katayama | 708/402 |
| 2003/0147463 A1 | 8/2003 | Sato et al. | |
| 2003/0152281 A1 | 8/2003 | Tomita et al. | |
| 2004/0006581 A1 | 1/2004 | Nakayama | |
| 2004/0062446 A1 | 4/2004 | Katayama | |

FOREIGN PATENT DOCUMENTS

| | | |
|---|---|---|
| JP | 6-46404 | 2/1994 |
| JP | 7-23381 | 1/1995 |
| JP | 8-44708 | 2/1996 |
| JP | 2000-99495 | 4/2000 |
| JP | 2001-128174 | 5/2001 |
| JP | 2001-325247 | 11/2001 |
| JP | 2002-262293 | 9/2002 |
| JP | 2003-223433 | 8/2003 |
| JP | 2003-289542 | 10/2003 |
| JP | 2004-38451 | 2/2004 |
| JP | 2004-120439 | 4/2004 |
| JP | 2005-501447 | 1/2005 |
| WO | 03/017497 | 2/2003 |

OTHER PUBLICATIONS

Joint Final Committee Draft (JFCD) of Joint Video Specification (ITU-T Rec. H264|ISO/IEC 14496-10 AVC), Doc. JVT-D157, Aug. 10, 2002, pp. 141-143.

Draft of Version 4 of H.264/AVC (ITU-T Recommendation H.264 and ISO/IEC 14496-10 (MPEG-4 part 10) Advanced Video Coding), Doc. JVT-N050d1, Jan. 28, 2005, pp. 153-170.

H.267/AVC Kyokasho, IMPRESS, pp. 82-83.

* cited by examiner

F I G. 4

| NO. OF ARITHMETIC OPERATIONS | ARITHMETIC EXPRESSIONS | SELECTION BY INPUT SELECTION UNIT 102 | | | | | | | |
|---|---|---|---|---|---|---|---|---|---|
| | | p1 | p2 | p3 | p4 | p7 | p8 | p5 | p6 |
| 1ST | a[0]=in[0]+in[2]<br>a[1]=in[0]−in[2]<br>a[2]=(in[1]>>1)−in[3]<br>a[3]=in[1]+(in[3]>>1) | in[0] | | in[2] | | in[1] | | in[3] | |
| 2ND | b[0]=a[0]+a[3]<br>b[3]=a[0]−a[3]<br>b[2]=a[1]−a[2]<br>b[1]=a[1]+a[2] | a[0] | | a[3] | | a[1] | | a[2] | |

FIG. 7

| NO. OF ARITHMETIC OPERATIONS (PROCESSING NUMBERS) | ARITHMETIC EXPRESSIONS | SELECTION BY INPUT SELECTION UNIT 102 | | | | | | | |
|---|---|---|---|---|---|---|---|---|---|
| | | p1 | p2 | p3 | p4 | p7 | p8 | p5 | p6 |
| 1ST | a[0]=in[0]+in[4]<br>a[4]=in[0]−in[4]<br>a[2]=(in[2]>>1)−in[6]<br>a[6]=in[2]+(in[6]>>1) | in[0] | | in[4] | | in[2] | | in[6] | |
| 2ND | b[0]=a[0]+a[6]<br>b[6]=a[0]−a[6]<br>b[4]=a[4]−a[2]<br>b[2]=a[4]+a[2] | a[0] | | a[6] | | a[4] | | a[2] | |
| 3RD | a1[5]=in[5]+in[7]<br>a1[1]=in[5]−in[7]<br>a2[3]=(in[3]>>1)−in[7]<br>a2[1]=in[3]+(in[7]>>1) | in[5] | | in[7] | | in[3] | | in[7] | |
| 4TH | a1[7]=in[1]+in[3]<br>a1[3]=in[1]−in[3]<br>a2[5]=(in[5]>>1)−in[1]<br>a2[7]=in[5]+(in[1]>>1) | in[1] | | in[3] | | in[5] | | in[1] | |
| 5TH | a[5]=a1[5]+a2[5] ⎫*1<br>a[1]=a1[1]−a2[1] ⎭<br>a[3]=a1[3]−a2[3] ⎫*2<br>a[7]=a1[7]+a2[7] ⎭ | a1[5] | a1[1] | a2[5] | a2[1] | a1[3] | a1[7] | a2[3] | a2[7] |
| 6TH | b[1]=a[1]+(a[7]>>2)<br>b[7]=(a[1]>>2)−a[7]<br>b[5]=(a[3]>>2)−a[5]<br>b[3]=a[3]+(a[5]>>2) | a[1] | | a[7] | | a[3] | | a[5] | |
| 7TH | out[7]=b[0]+b[7]<br>out[0]=b[0]−b[7]<br>out[6]=b[2]−b[5]<br>out[1]=b[2]+b[5] | b[0] | | b[7] | | b[2] | | b[5] | |
| 8TH | out[2]=b[4]+b[3]<br>out[5]=b[4]−b[3]<br>out[4]=b[6]−b[1]<br>out[3]=b[6]+b[1] | b[4] | | b[3] | | b[6] | | b[1] | |

FIG. 9

| NO. OF ARITHMETIC OPERATIONS | ARITHMETIC EXPRESSIONS | SELECTION BY INPUT SELECTION UNIT 102 | | | | | | | |
|---|---|---|---|---|---|---|---|---|---|
| | | p1 | p2 | p3 | p4 | p7 | p8 | p5 | p6 |
| 1ST | a[0]=in[0]+in[3]<br>a[3]=in[0]−in[3]<br>a[2]=in[1]−in[2]<br>a[1]=in[1]+in[2] | in[0] | | in[3] | | in[1] | | in[2] | |
| 2ND | b[0]=a[0]+a[1]<br>b[2]=a[0]−a[1]<br>b[1]=(a[3]<<1)+a[2]<br>b[3]=a[3]−(a[2]<<1) | a[0] | | a[1] | | a[3] | | a[2] | |

FIG. 10A

| NO. OF ARITHMETIC OPERATIONS (PROCESSING NUMBERS) | ARITHMETIC EXPRESSIONS | SELECTION BY INPUT SELECTION UNIT 102 | | | | | | | |
|---|---|---|---|---|---|---|---|---|---|
| | | p1 | p2 | p3 | p4 | p7 | p8 | p5 | p6 |
| 1ST | a[0]=in[0]+in[7]<br>a[4]=in[0]−in[7]<br>a[5]=in[1]−in[6]<br>a[1]=in[1]+in[6] | in[0] || in[7] || in[1] || in[6] ||
| 2ND | a[2]=in[2]+in[5]<br>a[6]=in[2]−in[5]<br>a[7]=in[3]−in[4]<br>a[3]=in[3]+in[4] | in[2] || in[5] || in[3] || in[4] ||
| 3RD | b[0]=a[0]+a[3]<br>b[2]=a[0]−a[3]<br>b[3]=a[1]−a[2]<br>b[1]=a[1]+a[2] | a[0] || a[3] || a[1] || a[2] ||
| 4TH | b1[4]=a[4]+a[6]<br>b1[5]=a[4]−a[6]<br>b1[7]=a[7]−a[5]<br>b1[6]=a[5]+a[7] | a[4] || a[6] || a[7] || a[5] ||
| 5TH | b2[4]=(a[4]>>1)+a[5]<br>b2[6]=a[4]−(a[5]>>1)<br>b2[5]=a[6]−(a[7]>>1)<br>b2[4]=(a[6]>>1)+a[7] | a[4] || a[5] || a[6] || a[7] ||
| 6TH | b[4]=b1[4]+b2[4]<br>b[5]=b1[4]−b2[5]<br>b[7]=b1[7]−b2[7]<br>b[6]=b1[6]+b2[6] | b1[4] | b1[5] | b2[4] | b2[5] | b1[6] | b1[6] | b2[7] | b2[7] |
| 7TH | out[0]=b[0]+b[1]<br>out[4]=b[0]−b[1]<br>out[6]=(b[2]>>1)−b[3]<br>out[2]=b[2]+(b[3]>>1) | b[0] || b[1] || b[2] || b[3] ||
| 8TH | out[1]=b[4]+(b[7]>>2)<br>out[7]=(b[4]>>2)−b[7]<br>out[5]=b[6]−(b[5]>>2)<br>out[3]=(b[6]>>2)+b[5] | b[4] || b[7] || b[6] || b[5] ||

FIG. 15

| NO. OF ARITHMETIC OPERATIONS | FIRST ARITHMETIC UNIT | | SECOND ARITHMETIC UNIT | |
|---|---|---|---|---|
| | PROCESSING NUMBERS | ARITHMETIC EXPRESSIONS | PROCESSING NUMBERS | ARITHMETIC EXPRESSIONS |
| 1ST | 3 | a1[5]=in[5]+in[7]<br>a1[1]=in[5]−in[7]<br>a2[3]=(in[3]>>1)−in[7]<br>a2[1]=in[3]+(in[7]>>1) | 4 | a1[7]=in[1]+in[3]<br>a1[3]=in[1]−in[3]<br>a2[5]=(in[5]>>1)−in[1]<br>a2[7]=in[5]+(in[1]>>1) |
| 2ND | 1 | a[0]=in[0]+in[4]<br>a[4]=in[0]−in[4]<br>a[2]=(in[2]>>1)−in[6]<br>a[6]=in[2]+(in[6]>>1) | 5 | a[5]=a1[5]+a2[5]<br>a[1]=a1[1]−a2[1]<br>a[3]=a1[3]−a2[3]<br>a[7]=a1[7]+a2[7] |
| 3RD | 2 | b[0]=a[0]+a[6]<br>b[6]=a[0]−a[6]<br>b[4]=a[4]−a[2]<br>b[2]=a[4]+a[2] | 6 | b[1]=a[1]+(a[7]>>2)<br>b[7]=(a[1]>>2)−a[7]<br>b[5]=(a[3]>>2)−a[5]<br>b[3]=a[3]+(a[5]>>2) |
| 4TH | 7 | out[7]=b[0]+b[7]<br>out[0]=b[0]−b[7]<br>out[6]=b[2]−b[5]<br>out[1]=b[2]+b[5] | 8 | out[2]=b[4]+b[3]<br>out[5]=b[4]−b[3]<br>out[4]=b[6]−b[1]<br>out[3]=b[6]+b[1] |

INVERSE DCT TRANSFORM DATA FLOWS

FIG. 22  8×8 INVERSE INTEGER TRANSFORM DATA FLOWS

4×4 INTEGER TRANSFORM DATA FLOWS

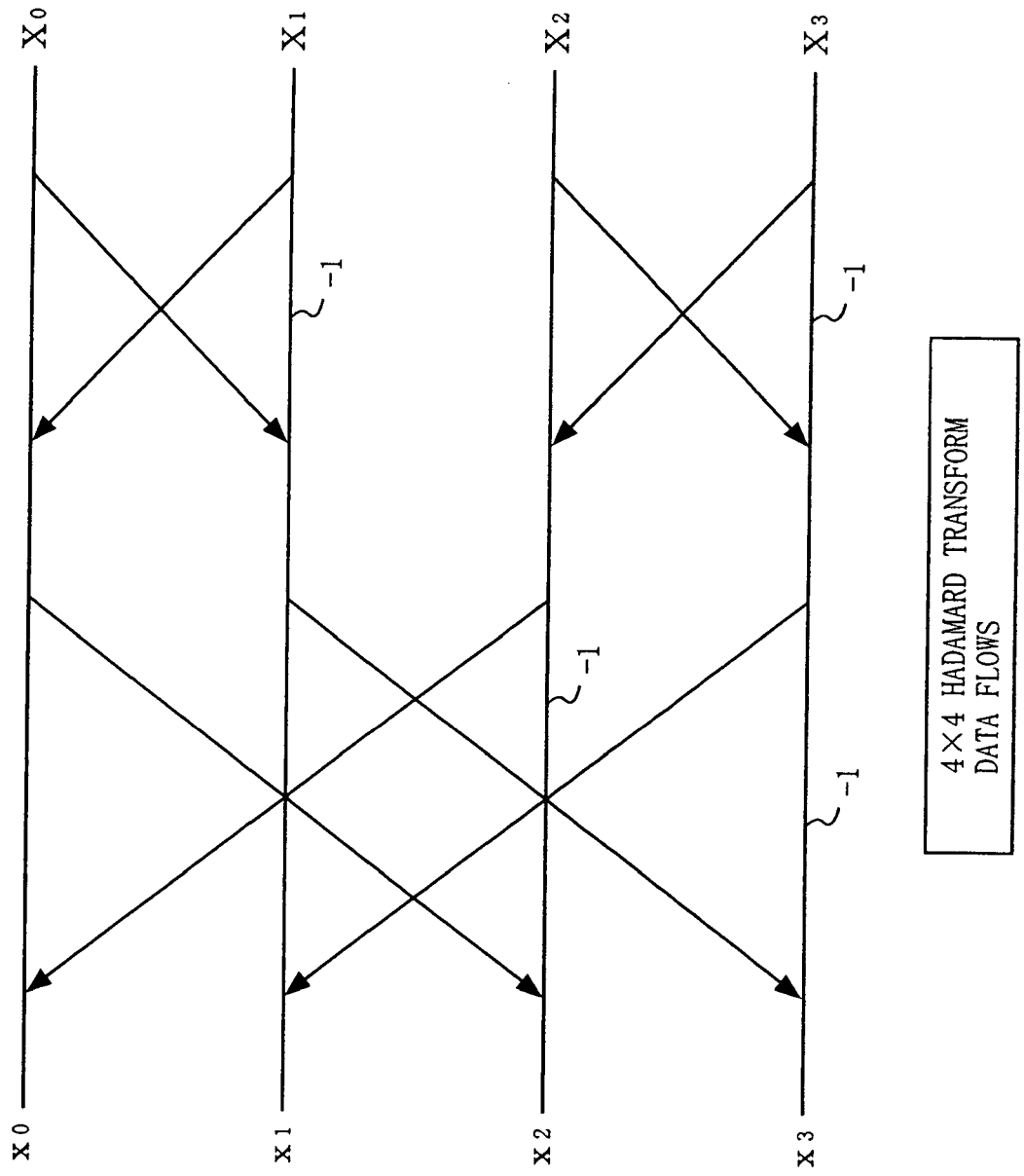

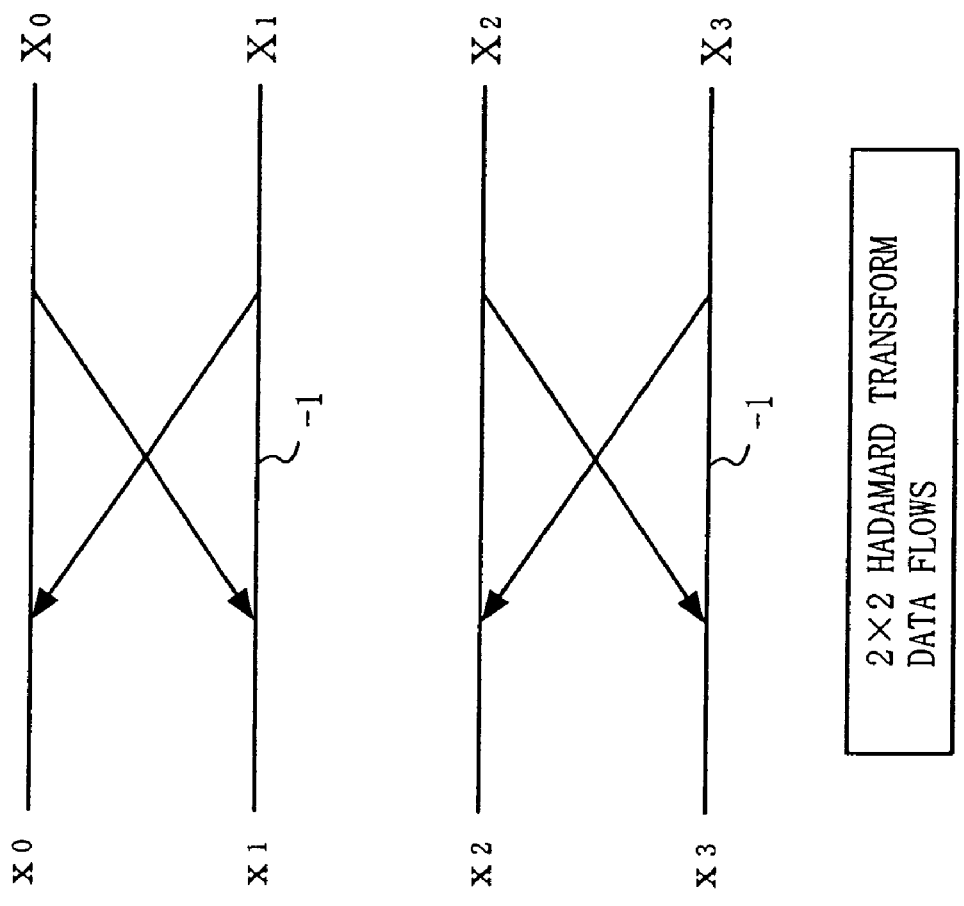

F I G. 2 8
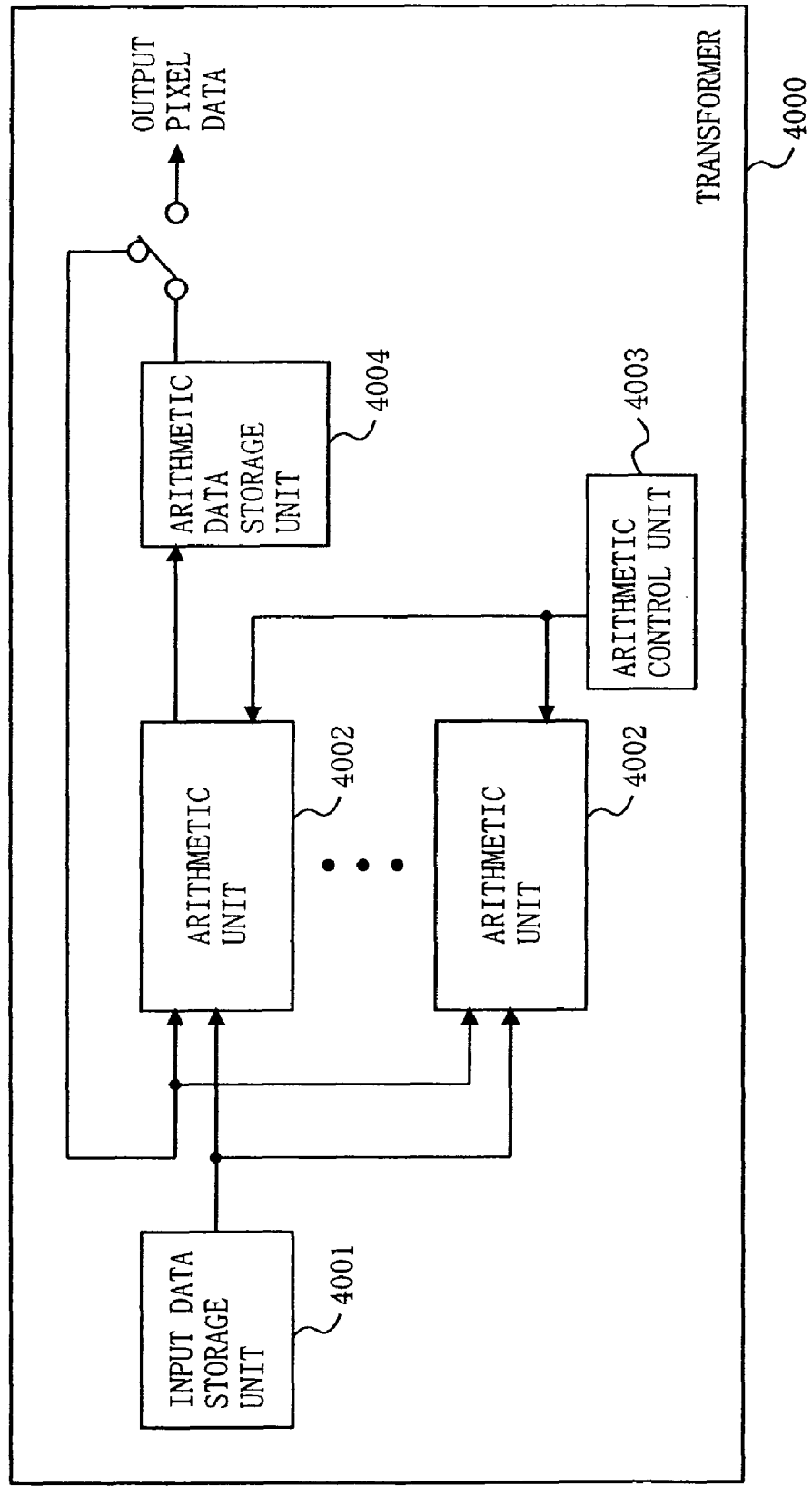

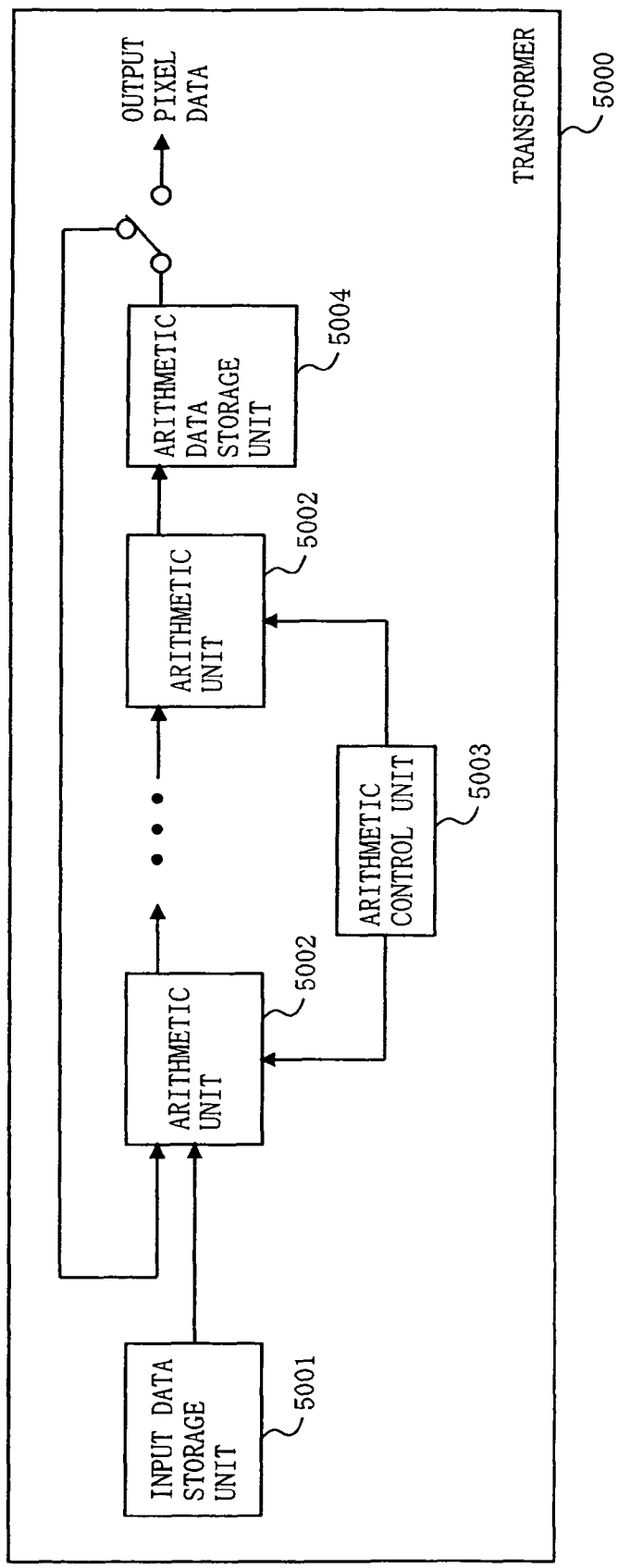

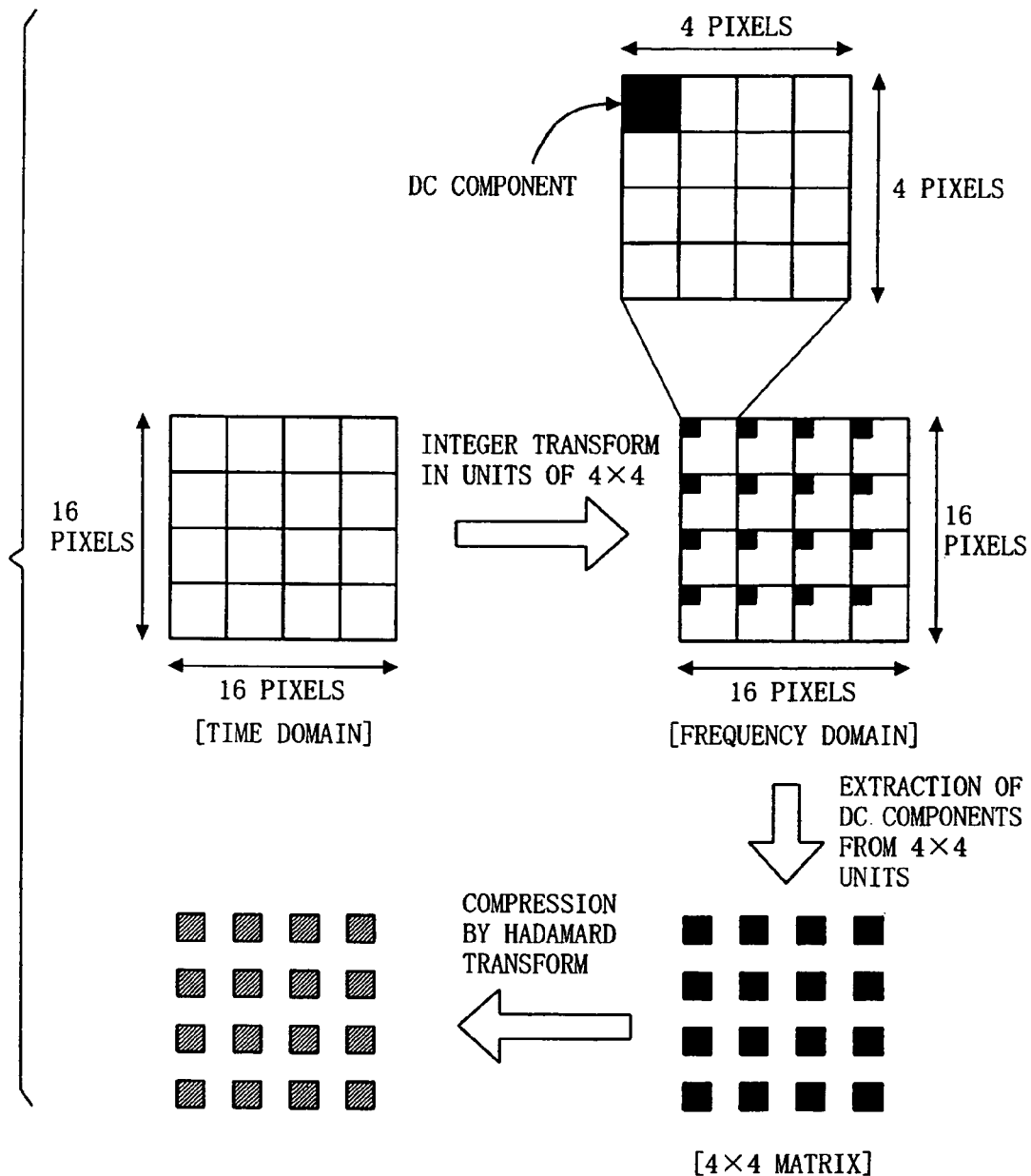

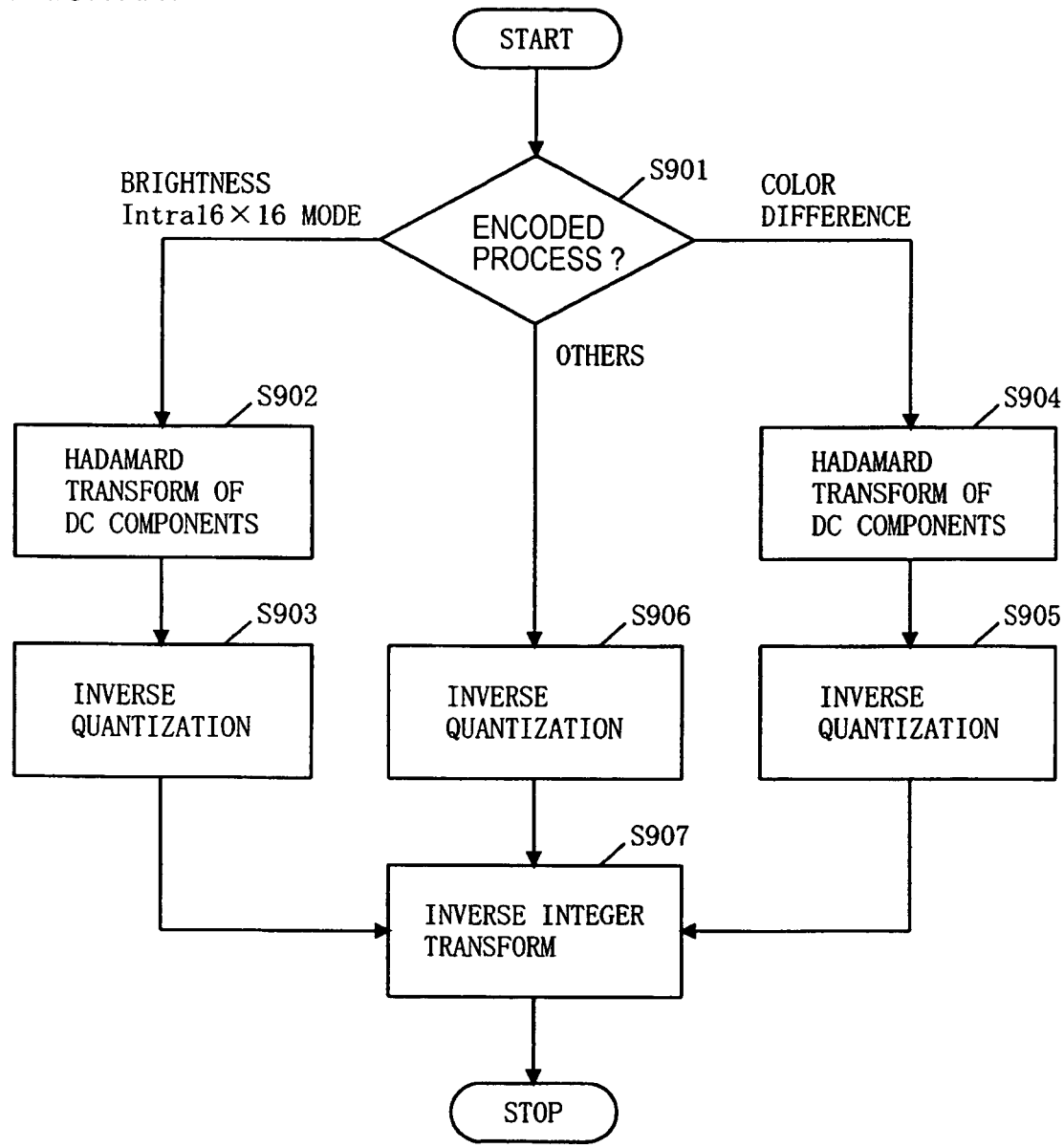

IMAGE ENCODING DEVICE, IMAGE DECODING DEVICE, AND INTEGRATED CIRCUIT USED THEREIN

BACKGROUND OF THE INVENTION

1. Technical Field

The present invention relates to image encoding devices, image decoding devices and integrated circuits used therein, which are characterized by transforms and inverse transforms between a time domain and a frequency domain.

2. Background Art

As a moving image encoding method, MPEG-2 has already been used for digital broadcasting and DVDs, and MPEG-4 has been used in the fields of Internet streaming and mobile communications. A more compression-effective encoding method is standardized by the JVT (Joint Video Team). This encoding method is known as "H.264/MPEG-4 AVC" or "MPEG-4 part 10" (hereinafter, referred to as "H.264").

In methods, such as MPEG-2 and MPEG-4, which perform compression (encoding) based on intra-screen correlations, an 8×8 pixel block is first subjected to a discrete cosine transform (DCT) from a time domain to a frequency domain. Then, each coefficient for the obtained frequency domain is divided by a divisor (a quantization step), and the remainder is rounded. This achieves encoding and compression. In a decoding process, conversely, inverse quantization is performed by multiplying an 8×8 pixel block by a quantization step. After the inverse quantization, an inverse discrete cosine transform (IDCT) is performed for transformation from the frequency domain to the time domain.

On the other hand, in H.264, a macroblock consisting of 16×16 pixels is divided into 4×4 pixel blocks at the time of encoding. The obtained 4×4 blocks are each taken as a unit, and transformed from the time domain to the frequency domain by bit shifting, addition and subtraction. At the time of decoding, conversely, the 4×4 blocks obtained as the frequency domain are transformed from the frequency domain to the time domain by bit shifting, addition and subtraction. Such a transform from the time domain to the frequency domain by bit shifting, addition and subtraction is referred to as the "integer transform". Also, a transform from the frequency domain to the time domain by bit shifting, addition and subtraction is referred to as the "inverse integer transform" (see Non-Patent Publication 1).

Further, in H.264, when transforming from the time domain to the frequency domain for intra-frame encoding in units of 16×16 pixels (hereinafter, referred to as the "Intra 16×16 mode") and color difference encoding, an integer transform is performed, and thereafter, DC components obtained by the integer transform are subjected to a Hadamard transform (see Non-Patent Publication 1) FIG. 30 is a diagram illustrating the flow of transforming pixel data in the Intra 16×16 mode. First, 16×16 pixels having a brightness in the time domain are subjected to the integer transform to the frequency domain in units of 4×4 pixels. Then, a 4×4 matrix, which is obtained by extracting DC components included in the integer-transformed 4×4 pixel units, is compressed by the Hadamard transform. Thereafter, the DC components compressed by the Hadamard transform are quantized, and integer-transformed data other than the DC components is quantized. This realizes encoding in the Intra 16×16 mode.

FIG. 31 is a flowchart illustrating the procedure for a decoding process in H.264. First, whether encoded data is Intra 16×16 mode-encoded data, color difference data or other data is determined (step S901). If encoded by the Intra 16×16 mode, DC components of the encoded data are subjected to a Hadamard transform (step S902), and the Hadamard-transformed DC components and other components are inversely quantized (step S903). If the encoded data is color difference data, DC components of the encoded data are subjected to a Hadamard transform (step S904), and the Hadamard-transformed DC components and other components are inversely quantized (step S905). If the encoded data is other data, it is inversely quantized (step S906). Thereafter, the inversely quantized data is decoded by an inverse integer transform (step S907).

Expression 1 is a transform expression for subjecting a 4×4 matrix $C(c_{ij})$ (i, j=1, 1, 2, 3) consisting only of DC components to the Hadamard transform at steps S902 and S904. In Expression 1, the 4×4 matrix $C(C_{ij})$ is multiplied by a Hadamard transform matrix A from the right and left sides to obtain a Hadamard-transformed 4×4 matrix f (see Non-Patent Publication 1, page 131, expression (8-254)).

$$f = ACA = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \quad \text{[Expression 1]}$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Expression 2 indicates an arithmetic expression for subjecting frequency-domain components $d_{ij}$ (i, j=0, 1, 2, 3) to an inverse integer transform to obtain time-domain components $f_{ij}$ (i, j=0, 1, 2, 3) at step S907. The arithmetic expression indicated in Expression 2 is used to first obtain components $e_{i0}$ $e_{i3}$ and components $f_{i0}$ to $f_{i3}$ for an arbitrary i (=0, 1, 2, 3) in the frequency domain (see Non-Patent Publication 1, page 133, expressions (8-266) to (8-273)). Further, the components $f_{ij}$ are transposed (i and j are interchanged), and the components obtained by the transposition are taken as components $d_{ij}$ to obtain the components $e_{i0}$ to $e_{i3}$ and the components $f_{i0}$ to $f_{i3}$ again. The ultimately obtained components $f_{ij}$ are time-domain components obtained by the inverse integer transform. Note that in Expression 2, (x>>k) is meant to indicate that x is shifted to the right by k bits (the same below). In addition, (x<<k) is meant to indicate that x is shifted to the left by k bits (the same below).

$$\begin{aligned}
e_{i0} &= d_{i0} + d_{i2} \\
e_{i1} &= d_{i0} - d_{i2} \\
e_{i2} &= (d_{i1} \gg 1) - d_{i3} \\
e_{i3} &= d_{i1} + (d_{i3} \gg 1) \\
f_{i0} &= e_{i0} + e_{i3} \\
f_{i1} &= e_{i1} + e_{i2} \\
f_{i2} &= e_{i1} - e_{i2} \\
f_{i3} &= e_{i0} - e_{i3}
\end{aligned} \quad \text{[Expression 2]}$$

Further, it has been proposed to adaptively change the size of blocks to be processed in a macroblock consisting of 16×16 pixels, and subject the blocks with a changed size to an integer transform (see Non-Patent Publication 2). Expression 3 indicates a transform expression for an inverse integer transform in the case where the size of blocks to be processed is 8×8 (see Non-Patent Publication 2, page 142, expressions (12-10) and (12-12)). In Expression 3, an 8×8 matrix $W(w_{ij})$ (i, j=0, 1, ... 7) represents a frequency domain for the inverse integer transform. An 8×8 matrix T is a matrix for the inverse integer transform. An 8×8 matrix X represents a time domain after the inverse integer transform. The transform expression indicated in Expression 3 makes it possible to obtain the time domain after the inverse integer transform.

$$X = T^T W T \quad (T^T \text{ is a transposed matrix}) \quad \text{[Expression 3]}$$

$$W = \begin{bmatrix} w_{00} & \cdots & w_{07} \\ \vdots & \ddots & \vdots \\ w_{70} & \cdots & w_{77} \end{bmatrix}$$

$$T = \begin{bmatrix} 13 & 13 & 13 & 13 & 13 & 13 & 13 & 13 \\ 19 & 15 & 9 & 3 & -3 & -9 & -15 & -19 \\ 17 & 7 & -7 & -17 & -17 & -7 & 7 & 17 \\ 9 & 3 & -19 & -15 & 15 & 19 & -3 & -9 \\ 13 & -13 & -13 & 13 & 13 & -13 & -13 & 13 \\ 15 & -19 & -3 & 9 & -9 & 3 & 19 & -15 \\ 7 & -17 & 17 & -7 & -7 & 17 & -17 & 7 \\ 3 & -9 & 15 & -19 & 19 & -15 & 9 & -3 \end{bmatrix}$$

A matrix Ta for an inverse integer transform as shown in Expression 4 is proposed as a replacement for the matrix T indicated in Expression 3 (see Non-Patent Publication 3, pages 165 to 166, expressions (8-341) to (8-356)).

$$Ta = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -3 \end{bmatrix} \cdot 1/8 \quad \text{[Expression 4]}$$

Expression 5 indicates an arithmetic expression for performing an inverse integer transform using the matrix Ta indicated in Expression 4. In Expression 5, in[j] represents $w_{ij}$ in the case where an arbitrary i (i=0, 1, ... 7) is selected as a row. When the arbitrary i is selected as a row, it is possible to calculate a[0] to a[7] and b[0] to b[7] by the arithmetic expression in Expression 5. By using b[0] to b[7], out[0] to out[7] for the arbitrary i are calculated. The obtained out[0] to out[7] compose a matrix WTa for the arbitrary i. Next, i and j in out[0] to out[7] are transposed, and the transposed values are taken as in[0] to in[7]. Then, Expression 5 is similarly used for an arithmetic operation to obtain out[0] to out[7]. The obtained out [0] to out [7] compose a matrix $Ta^T WTa$, and therefore represent a time domain after the inverse integer transform.

a[0]=in[0]+in[4]

a[4]=in[0]−in[4]

a[2]=(in[2]>>1)−in[6]

a[6]=in[2]+(in[6]>>1)

b[0]=a[0]+a[6]

b[2]=a[4]+a[2]

b[4]=a[4]−a[2]

b[6]=a[0]−a[6]

a[1]=−in[3]+in[5]−in[7]−(in[7]>>1)

a[3]=in[1]+in[7]−in[3]−(in[3]>>1)

a[5]=−in[1]+in[7]+in[5]+(in[5]>>1)

a[7]=in[3]+in[5]+in[1]+(in[1]>>1)

b[1]=a[1]+(a[7]>>2)

b[7]=−a[1]>>2+a[7]

b[3]=a[3]+(a[5]>>2)

b[5]=(a[3]>>2)−a[5]

out[0]=b[0]+b[7]

out[1]=b[2]+b[5]

out[2]=b[4]+b[3]

out[3]=b[6]+b[1]

out[4]=b[6]−b[1]

out[5]=b[4]−b[3]

out[6]=b[2]−b[5]

out[7]=b[0]−b[7]   [Expression 5]

[Non-Patent Publication 1] Draft ITU-T Recommendation and Final Draft International Standard of Joint Video Specification (ITU-T Rec. H.264|ISO/IEC 14496-10 AVC), Doc. JVT-G050r1, May 27, 2003, pages 127 to 134

[Non-Patent Publication 2] Joint Final Committee Draft (JFCD) of Joint Video Specification (ITU-T Rec. H.264|ISO/IEC 14496-10 AVC), Doc. JVT-D157, Aug. 10, 2002, pages 141 to 143

[Non-Patent Publication 3] Draft of Version 4 of H.264/AVC (ITU-T Recommendation H.264 and ISO/IEC 14496-10 (MPEG-4 part 10) Advanced Video Coding), Doc. JVT-N050d1, Jan. 28, 2005, pages 153 to 170

For decoding in H.264 as described above, it is necessary to use the Hadamard transform, the 4×4 inverse integer transform, and the 8×8 inverse integer transform in combination. If separate arithmetic units respectively corresponding to the Hadamard transform, the 4×4 inverse integer transform, and the 8×8 inverse integer transform are prepared, the circuit scale of the decoding device is increased. The same can be said of the encoding device.

Also, in recent years, a plurality of standards for image encoding coexist, and new standards are further proposed one after another. In such circumstances, it is necessary to provide an image encoding device and an image decoding device, which are capable of readily dealing with a plurality of standards as well as standards that will be introduced anew. Naturally, arithmetic units respectively corresponding to the individual standards can be separately prepared and provided in the decoding device and the encoding device, though this increases the circuit scale.

Therefore, an object of the present invention is to provide an image encoding device and an image decoding device, which are capable of dealing with various encoding standards, while achieving compactness.

SUMMARY OF THE INVENTION

To achieve the above object, the present invention has the following aspects. A first aspect of the present invention is directed to an image decoding device for decoding compressed image data by switching between a plurality of transform modes from a frequency domain to a time domain as necessary, the device including: an arithmetic unit for performing arithmetic processing on a plurality of pieces of inputted pixel data; an arithmetic data storage unit for storing an arithmetic result by the arithmetic unit; an input selection unit for selecting whether to read pixel data that is to be inputted to the arithmetic unit from the compressed image data or from pixel data stored in the arithmetic data storage unit, and inputting the read pixel data to the arithmetic unit; and an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations.

According to the first aspect of the present invention, the arithmetic control unit defines the arithmetic procedure in each transform mode by dividing the procedure into units that can be executed in one arithmetic operation in the arithmetic unit, and therefore arithmetic operations in each transform mode can be executed by a single arithmetic unit. Thus, it is possible to provide an image decoding device capable of dealing with various encoding standards, while achieving compactness.

In a second aspect of the present invention, the arithmetic unit is configured to be able to execute integer arithmetic, and the arithmetic control unit controls a combination of pieces of pixel data targeted for the integer arithmetic, and bit shift amounts for the arithmetic unit as the multiplier coefficients.

According to the second aspect of the present invention, the arithmetic unit is configured to be able to execute integer arithmetic, and therefore it is possible to provide an image decoding device capable of executing various integer transforms by switching between them.

For example, the arithmetic unit includes: first to eighth terminals; a first bit arithmetic unit for bit-shifting an input to the second terminal; a second bit arithmetic unit for bit-shifting an input to the third terminal; a third bit arithmetic unit for bit-shifting an input to the sixth terminal; a fourth bit arithmetic unit for bit-shifting an input to the seventh terminal; a first addition unit for adding an input to the first terminal to an output of the second bit arithmetic unit; a first subtraction unit for subtracting an input to the fourth terminal from an output of the first bit arithmetic unit; a second subtraction unit for subtracting an input to the fifth terminal from an output of the fourth bit arithmetic unit; and a second addition unit for adding an input to the eighth terminal to an output of the third bit arithmetic unit, the arithmetic data storage unit stores arithmetic results by the first and second addition units and the first and second subtraction units, and the arithmetic control unit controls, based on the transform mode and the number of arithmetic operations, pieces of pixel data that are to be inputted to the first to eighth terminals, and bit shift amounts for the first to fourth bit arithmetic units.

For example, the plurality of transform modes include at least two among a 4×4 inverse integer transform, an 8×8 inverse integer transform, and a Hadamard transform.

Thus, it is possible to implement decoding of compressed image data in H.264 with a small-sized device.

In a third aspect of the present invention, the arithmetic control unit defines an arithmetic procedure in each transform mode by dividing the procedure into basic units of arithmetic processing for each number of arithmetic operations, the arithmetic unit is configured to be able to execute the basic units of arithmetic processing, and the arithmetic control unit controls a combination of pieces of pixel data targeted for the arithmetic processing and the multiplier coefficients, such that the basic units of arithmetic processing are repeated by the arithmetic unit.

According to the third aspect of the present invention, the arithmetic procedure in each transform mode is divided into basic units of arithmetic processing, and therefore it is possible to implement the arithmetic unit with a more simplified configuration, whereby it is possible to provide an image decoding device capable of dealing with various encoding standards, while achieving compactness.

Preferably, the basic units of arithmetic processing may constitute arithmetic processing capable of implementing a two-input/two-output data flow.

As a result, the arithmetic procedure in each transform mode can be divided into two-input/two-output data flows, and therefore by setting the two-input/two-output data flows as basic units, it is made possible to share the procedure between standards and achieve a reduction in device size.

Preferably, the arithmetic control unit may be capable of storing a combination of pieces of pixel data for a new transform mode and multiplier coefficients in association with the number of arithmetic operations, and when the new transform mode is used, the arithmetic control unit may control the input selection unit and the arithmetic unit based on the stored content.

Thus, it is possible to provide a small-sized image decoding device capable of decoding even when a new transform mode is introduced.

For example, the arithmetic unit includes: first to fourth terminals; a first multiplication unit for performing multiplication processing on an input to the first terminal; a second multiplication unit for performing multiplication processing on an input to the third terminal; a third multiplication unit for performing multiplication processing on an input to the second terminal; a fourth multiplication unit for performing multiplication processing on an input to the fourth terminal; a first addition unit for adding an output of the first multiplication unit to an output of the second multiplication unit; and a second addition unit for adding an output of the third multiplication unit to an output of the fourth multiplication unit, the arithmetic data storage unit stores arithmetic results by the first and second addition units, and the arithmetic control unit causes the input selection unit to control, based on the transform mode and the number of arithmetic operations, pieces of pixel data that are to be inputted to the first to fourth terminals, and multipliers as the multiplier coefficients for the first to fourth multiplication units.

Preferably, the arithmetic control unit may include: a multiplier storage unit for storing the multipliers in association with the transform modes; a multiplier setting unit for setting the multipliers for the first to fourth multiplication units; a transform mode setting unit for managing the transform modes; and an arithmetic order management unit for managing an arithmetic order in the arithmetic unit, based on a current transform mode managed by the transform mode setting unit and the number of arithmetic operations managed by the arithmetic order management unit, the multiplier setting unit may read proper multipliers from the multiplier storage unit and set the multipliers for the first to fourth multiplication units, and based on the current transform mode and the number of arithmetic operations, the arithmetic order management unit may cause the input selection unit to control the pieces of pixel data that are to be inputted to the first to fourth terminals.

Preferably, the arithmetic control unit may further include: a multiplier setting unit for setting multipliers for use in a new transform mode in association with the number of arithmetic operations; and a new transform mode multiplier storage unit for storing the multipliers set by the multiplier setting unit, and when the new transform mode is used, the multiplier setting unit may read multipliers associated with the number of arithmetic operations from the new transform mode multiplier storage unit, and set the multipliers for the first to fourth multiplication units, and the arithmetic order management unit may cause the input selection unit to control the pieces of pixel data that are to be inputted to the first to fourth terminals based on the number of arithmetic operations.

For example, the plurality of transform modes include at least two among an inverse discrete cosine transform, a 4×4 inverse integer transform, an 8×8 inverse integer transform, and a Hadamard transform.

Thus, it is possible to provide an image decoding device capable of dealing with JPEG, MPEG-2, MPEG-4, MPEG-4AVC (H.264), and new transform modes.

Preferably, a plurality of arithmetic units may be connected in parallel or in series, and the arithmetic control unit may control the arithmetic units connected in parallel or in series.

Thus, pipeline processing is made possible, thereby enhancing the processing speed.

A fourth aspect of the present invention is directed to an image encoding device for encoding image data by switching between a plurality of transform modes from a time domain to a frequency domain as necessary, the device including: an arithmetic unit for performing arithmetic processing on a plurality of pieces of inputted pixel data; an arithmetic data storage unit for storing an arithmetic result by the arithmetic unit; an input selection unit for selecting whether to read pixel data that is to be inputted to the arithmetic unit from the image data or from pixel data stored in the arithmetic data storage unit, and inputting the read pixel data to the arithmetic unit; and an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations.

In a fifth aspect of the present invention, the arithmetic unit is configured to be able to execute integer arithmetic, and the arithmetic control unit controls a combination of pieces of pixel data targeted for the integer arithmetic, and bit shift amounts for the arithmetic unit as the multiplier coefficients.

For example, the arithmetic unit includes: first to eighth terminals; a first bit arithmetic unit for bit-shifting an input to the second terminal; a second bit arithmetic unit for bit-shifting an input to the third terminal; a third bit arithmetic unit for bit-shifting an input to the sixth terminal; a fourth bit arithmetic unit for bit-shifting an input to the seventh terminal; a fifth bit arithmetic unit for bit-shifting an input to the first terminal; a sixth bit arithmetic unit for bit-shifting an input to the fourth terminal; a seventh bit arithmetic unit for bit-shifting an input to the fifth terminal; an eighth bit arithmetic unit for bit-shifting an input to the eighth terminal; a first addition unit for adding an output of the fifth terminal to an output of the second bit arithmetic unit; a first subtraction unit for subtracting an output of the first terminal from an output of the sixth bit arithmetic unit; a second subtraction unit for subtracting an output of the seventh terminal from an output of the fourth bit arithmetic unit; and a second addition unit for adding an output of the eighth bit arithmetic unit to an output of the third bit arithmetic unit, the arithmetic data storage unit stores arithmetic results by the first and second addition units and the first and second subtraction units, and the arithmetic control unit controls, based on the transform mode and the number of arithmetic operations, pieces of pixel data that are to be inputted to the first to eighth terminals, and bit shift amounts for the first to fourth bit arithmetic units.

For example, the plurality of transform modes include at least two among a 4×4 inverse integer transform, an 8×8 inverse integer transform, a 4×4 integer transform, an 8×8 integer transform, and a Hadamard transform. With the above configuration, it is possible to provide a transformer capable of dealing with all of these transform modes.

In a sixth aspect of the present invention, the arithmetic control unit defines the arithmetic procedure in each transform mode by dividing the procedure into basic units of arithmetic processing for each number of arithmetic operations, the arithmetic unit is configured to be able to execute the basic units of arithmetic processing, and the arithmetic control unit controls a combination of pieces of pixel data targeted for the arithmetic processing and the multiplier coefficients, such that the basic units of arithmetic processing are repeated by the arithmetic unit.

Preferably, the basic units of arithmetic processing may constitute arithmetic processing capable of implementing a two-input/two-output data flow.

Preferably, the arithmetic control unit is capable of storing a combination of pieces of pixel data for a new transform mode and multiplier coefficients in association with the number of arithmetic operations, and when the new transform mode is used, the arithmetic control unit controls the input selection unit and the arithmetic unit based on the stored content.

For example, the arithmetic unit includes: first to fourth terminals; a first multiplication unit for performing multiplication processing on an input to the first terminal; a second multiplication unit for performing multiplication processing on an input to the third terminal; a third multiplication unit for performing multiplication processing on an input to the second terminal; a fourth multiplication unit for performing multiplication processing on an input to the fourth terminal; a first addition unit for adding an output of the first multiplication unit to an output of the second multiplication unit; and a second addition unit for adding an output of the third multiplication unit to an output of the fourth multiplication unit, the arithmetic data storage unit stores arithmetic results by the first and second addition units, and the arithmetic control unit causes the input selection unit to control, based on the transform mode and the number of arithmetic operations, pieces of pixel data that are to be inputted to the first to fourth terminals, and multipliers as the multiplier coefficients for the first to fourth multiplication units.

For example, the arithmetic control unit includes: a multiplier storage unit for storing the multipliers in association with the transform modes; a multiplier setting unit for setting the multipliers for the first to fourth multiplication units; a transform mode setting unit for managing the transform modes; and an arithmetic order management unit for managing an arithmetic order in the arithmetic unit, based on a current transform mode managed by the transform mode setting unit and the number of arithmetic operations managed by the arithmetic order management unit, the multiplier setting unit reads proper multipliers from the multiplier storage unit and sets the multipliers for the first to fourth multiplication units, and based on the current transform mode and the number of arithmetic operations, the arithmetic order management unit causes the input selection unit to control the pieces of pixel data that are to be inputted to the first to fourth terminals.

Preferably, the arithmetic control unit further includes: a multiplier setting unit for setting multipliers for use in a new transform mode in association with the number of arithmetic operations; and a new transform mode multiplier storage unit for storing the multipliers set by the multiplier setting unit, and when the new transform mode is used, the multiplier setting unit reads multipliers associated with the number of arithmetic operations from the new transform mode multiplier storage unit, and sets the multipliers for the first to fourth multiplication units, and the arithmetic order management unit causes the input selection unit to control the pieces of pixel data that are to be inputted to the first to fourth terminals based on the number of arithmetic operations.

For example, the plurality of transform modes include at least two among an inverse discrete cosine transform, a 4×4 inverse integer transform, an 8×8 inverse integer transform, a discrete cosine transform, a 4×4 integer transform, an 8×8 integer transform, and a Hadamard transform. With the above configuration, it is possible to provide a transformer capable of dealing with all of these transform modes.

Preferably, a plurality of arithmetic units are connected in parallel or in series, and the arithmetic control unit controls the arithmetic units connected in parallel or in series.

The image encoding device can achieve effects similar to effects achieved by the image decoding device.

A seventh aspect of the present invention is directed to an integrated circuit for use in an image decoding device for decoding compressed image data by switching between a plurality of transform modes from a frequency domain to a time domain as necessary, the circuit including: an arithmetic unit for performing arithmetic processing on a plurality of pieces of inputted pixel data; an input selection unit for selecting whether to read pixel data that is to be inputted to the arithmetic unit from the compressed image data or from an arithmetic result by the arithmetic unit, and inputting the read pixel data to the arithmetic unit; and an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations.

An eighth aspect of the present invention is directed to an integrated circuit for use in an image encoding device for encoding image data by switching between a plurality of transform modes from a time domain to a frequency domain as necessary, the circuit including: an arithmetic unit for performing arithmetic processing on a plurality of pieces of inputted pixel data; an input selection unit for selecting whether to read pixel data that is to be inputted to the arithmetic unit from the image data or from an arithmetic result by the arithmetic unit, and inputting the read pixel data to the arithmetic unit; and an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations.

EFFECT OF THE INVENTION

Thus, the image encoding device and the image decoding device according to the present invention are capable of dealing with various encoding standards, while achieving compactness.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table showing arithmetic expressions associated with the number of arithmetic operations and the relationship between combinations of pieces of pixel data targeted for arithmetic processing after inputted to input terminals p1 to p8 by an input selection unit 102.

FIG. 7 is a table showing arithmetic expressions associated with the number of arithmetic operations and the relationship between combinations of pieces of pixel data that are to be inputted to the input terminals p1 to p8 by the input selection unit 102.

FIG. 9 is a table showing, in relation to a 4×4 integer transform, arithmetic expressions associated with the number of arithmetic operations and the relationship between combinations of pieces of pixel data that are to be inputted to the input terminals p1 to p8 by the input selection unit 102.

FIG. 15 is a table showing arithmetic expressions for the first arithmetic unit 1100 and the second arithmetic unit 2100 in association with the number of arithmetic operations.

FIG. 26 is a diagram illustrating data flows for a 4×4 Hadamard transform.

FIG. 27 is a diagram illustrating data flows for a 2×2 Hadamard transform.

FIG. 28 is a block diagram illustrating the configuration of a transformer 4000 according to a fourth embodiment.

FIG. 29 is a block diagram illustrating the configuration of a transformer 5000 according to a fifth embodiment.

FIG. 30 is a diagram illustrating the flow of transforming pixel data in Intra 16×16 mode.

FIG. 31 is a flowchart illustrating the procedure for a decoding process in H.264.

DESCRIPTION OF THE REFERENCE CHARACTERS

Figure 1:
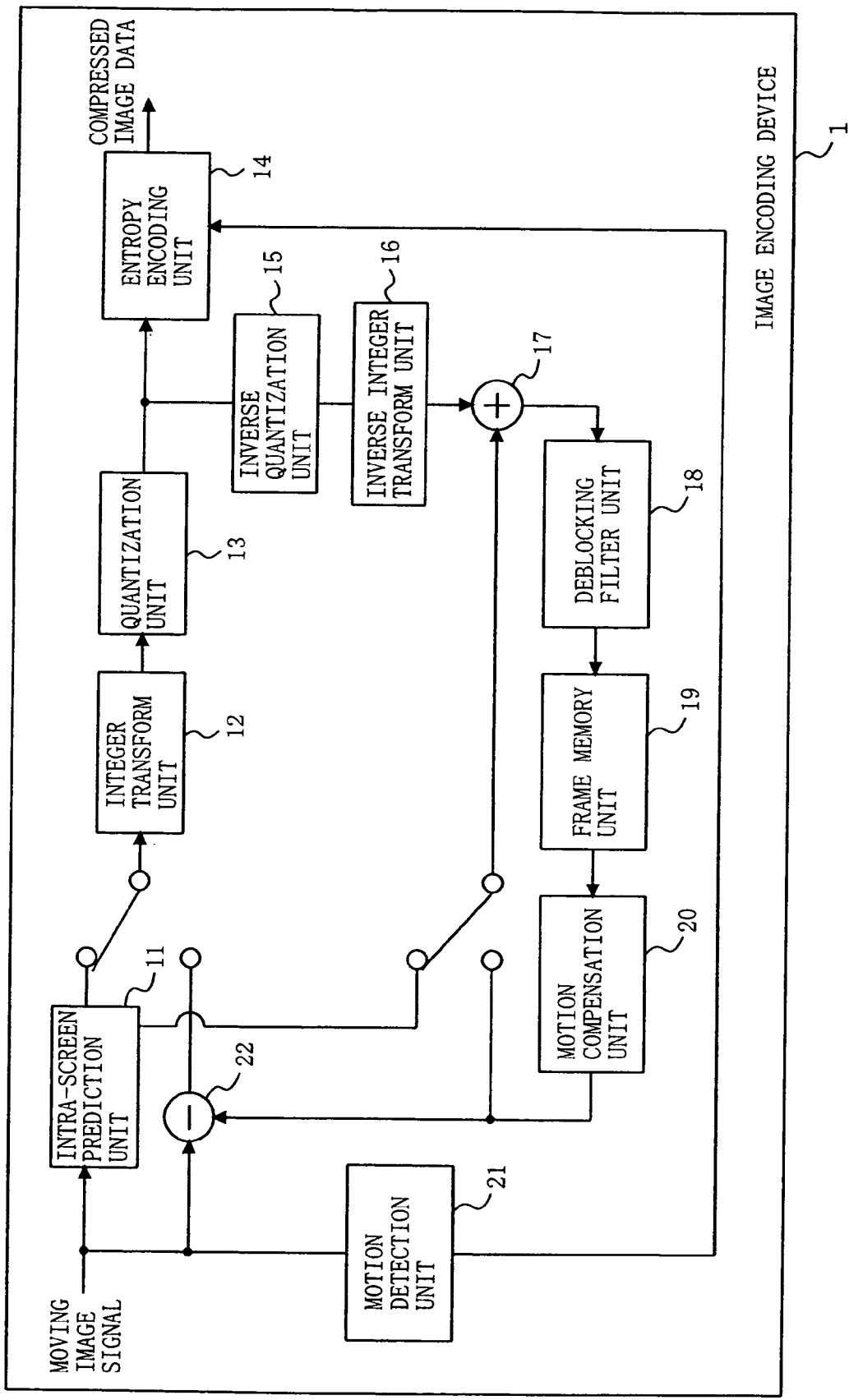
FIG. 1 is a block diagram illustrating an exemplary configuration of an image encoding device 1 according to a first embodiment of the present invention.

1 image encoding device
2 image decoding device
3 image encoding device
4 image decoding device
11 intra-screen prediction unit
12 integer transform unit
13 quantization unit
14 entropy encoding unit
15 inverse quantization unit 15
16 inverse integer transform unit
17 addition unit
18 deblocking filter unit
19 frame memory unit
20 motion compensation unit
21 motion detection unit
22 subtraction unit
23 entropy decoding unit
24 inverse quantization unit
25 inverse integer transform unit
26 deblocking filter unit
27 motion compensation unit
28 weighting prediction unit
29 intra-screen prediction unit
30 addition unit
31 image data input unit
32 time-frequency transform unit
33 quantization unit
34 compressed data output unit
41 compressed data input unit
42 inverse quantization unit
43 frequency-time transform unit
44 image data output unit
100 arithmetic unit
101 arithmetic control unit
102 input selection unit
103 bit arithmetic unit
103a bit arithmetic unit
104 bit arithmetic unit
104a bit arithmetic unit
105 bit arithmetic unit
105a bit arithmetic unit
106 bit arithmetic unit
106a bit arithmetic unit
107 addition unit
108 subtraction unit
109 subtraction unit
110 addition unit
111 input data storage unit
112 arithmetic data storage unit
201 arithmetic control unit
1000 integer transformer
1100 first arithmetic unit
1102 input selection unit
1103 bit arithmetic unit
1105 bit arithmetic unit
1107 addition unit
1108 subtraction unit
2000 integer transformer
2100 second arithmetic unit
2102 input selection unit
2103 bit arithmetic unit
2105 bit arithmetic unit
2107 addition unit
2108 subtraction unit
3000 transformer
3001 input data storage unit
3002 input selection unit
3003 multiplication unit
3004 multiplication unit
3005 multiplication unit
3006 multiplication unit
3007 addition unit
3008 addition unit
3009 arithmetic data storage unit
3010 arithmetic unit
3011 multiplier setting unit
3012 arithmetic order management unit
3013 transform mode setting unit
3014 first multiplier storage unit
3015 second multiplier storage unit

3016 new transform mode multiplier storage unit
3017 new multiplier setting unit
4000 transformer
4001 input data storage unit
4002 arithmetic unit
4003 arithmetic control unit
4004 arithmetic data storage unit
5000 transformer
5001 input data storage unit
5002 arithmetic unit
5003 arithmetic control unit
5004 arithmetic data storage unit

DETAILED DESCRIPTION OF THE INVENTION

Hereinafter, embodiments of the present invention will be described with reference to the drawings.

First Embodiment

A first embodiment will be described with respect to an image encoding device and an image decoding device, which use an integer transform unit and an inverse integer transform unit in a time-sharing manner to perform an integer transform and an inverse integer transform.

FIG. 1 is a block diagram illustrating an exemplary configuration of an image encoding device 1 according to the first embodiment of the present invention. In FIG. 1, the image decoding device 1 includes an intra-screen prediction unit 11, an integer transform unit 12, a quantization unit 13, an entropy encoding unit 14, an inverse quantization unit 15, an inverse integer transform unit 16, an addition unit 17, a deblocking filter unit 18, a frame memory unit 19, a motion compensation unit 20, a motion detection unit 21, and a subtraction unit 22.

The intra-screen prediction unit 11 executes intra-frame prediction for I-pictures in an inputted moving image signal, and outputs difference values. The integer transform unit 12 performs an integer transform on the difference values outputted from the intra-screen prediction unit 11. The quantization unit 13 quantizes frequency-domain components outputted from the integer transform unit 12. The entropy encoding unit 14 entropy encodes an output from the quantization unit 13, and outputs it as compressed image data.

The inverse quantization unit 15 inversely quantizes the output from the quantization unit 13, and outputs it. The inverse integer transform unit 16 performs an inverse integer transform on the output from the inverse quantization unit 15, and outputs it. The addition unit 17 adds an output from the intra-screen prediction unit 11 or the motion compensation unit 20 to the output from the inverse integer transform unit 16. The deblocking filter unit 18 removes block noise in an output from the addition unit 17. The frame memory unit 19 stores frames. The motion compensation unit 20 performs motion compensation, and inputs frames multiplied by a weighting factor to the subtraction unit 22 with a prediction about weighting. For frames other than the I-pictures, the subtraction unit 22 subtracts the frames from the motion compensation unit 20, and inputs them to the integer transform unit 12. The motion detection unit 21 detects a motion vector, and inputs it to the entropy encoding unit 14. The entropy encoding unit 14 executes entropy encoding based on the motion vector. Thus, compressed image data with improved motion compensation is outputted.

Figure 2:
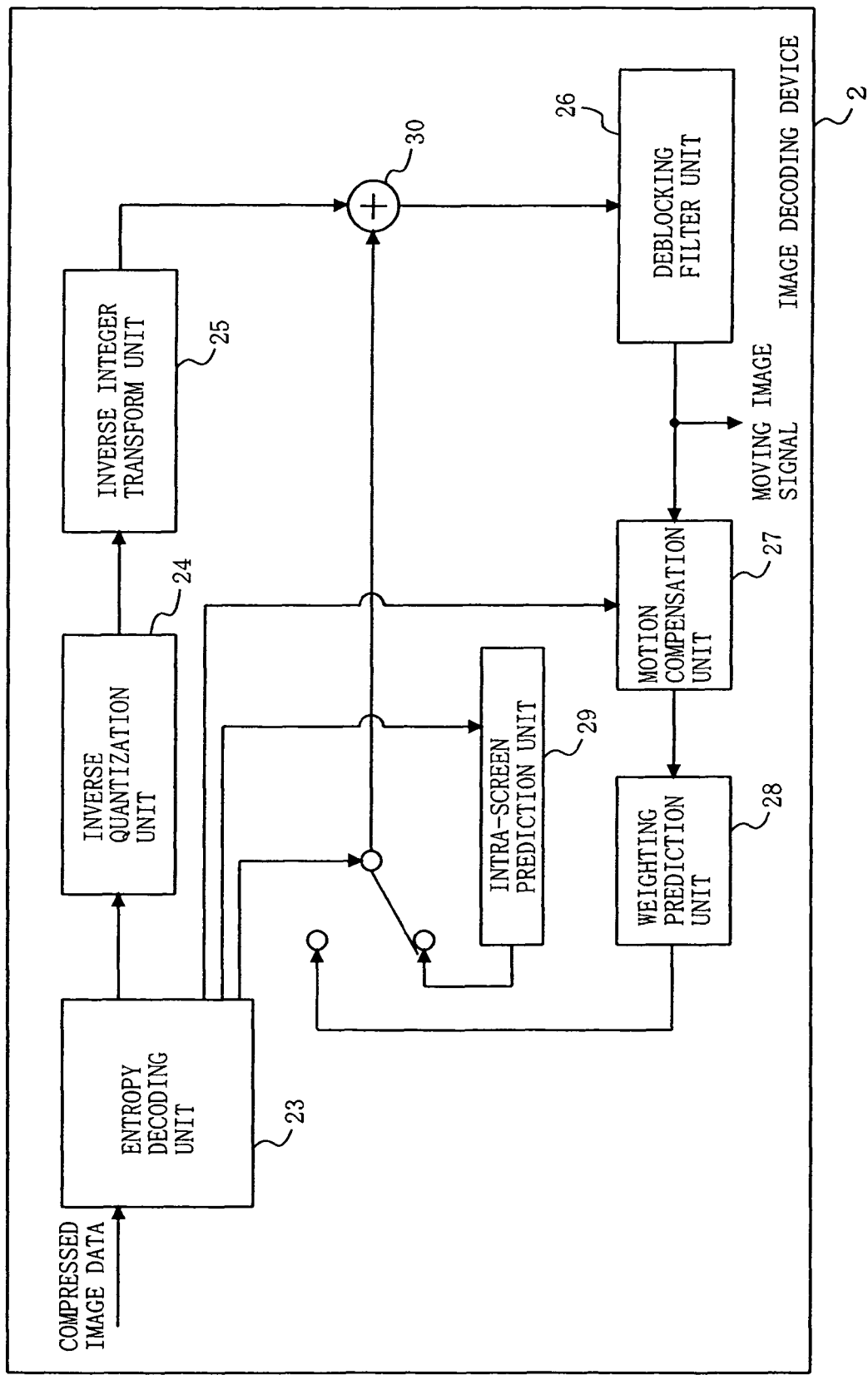
FIG. 2 is a block diagram illustrating an exemplary configuration of an image decoding device 2 according to the first embodiment of the present invention.

FIG. 2 is a block diagram illustrating an exemplary configuration of an image decoding device 2 according to the first embodiment of the present invention. In FIG. 2, the image decoding device 2 includes an entropy decoding unit 23, an inverse quantization unit 24, an inverse integer transform unit 25, a deblocking filter unit 26, a motion compensation unit 27, a weighting prediction unit 28, an intra-screen prediction unit 29, and an addition unit 30.

Compressed image data inputted to the entropy decoding unit 23 is entropy decoded. The inverse quantization unit 24 inversely quantizes an output from the entropy decoding unit 23. The inverse integer transform unit 25 subjects an output from the inverse quantization unit 24 to an inverse integer transform, and outputs time-domain data as a moving image signal.

The deblocking filter unit 26 removes block noise in the output from the inverse integer transform unit 25, and outputs it. The motion compensation unit 27 performs motion compensation based on the output from the entropy decoding unit 23. As a result of the motion compensation, the weighting prediction unit 28 outputs frames multiplied by a weighting factor with a prediction about weighting. The intra-screen prediction unit 29 predicts differences between the frames based on the output from the entropy decoding unit 23, and controls switching between the intra-screen prediction unit 29 and the weighting prediction unit 28 for connection to the addition unit 30. Thus, a moving image signal with improved motion compensation is outputted.

The image encoding device in the present embodiment has a plurality of transform modes from the time domain to the frequency domain, and switches between the transform modes as necessary to encode images. In addition, the image decoding device in the present embodiment has a plurality of transform modes from the frequency domain to the time domain, and switches between the transform modes as necessary to decode images.

The present invention is characterized by the structures of the integer transform and the inverse integer transform. Accordingly, the below-disclosed structures of the integer transform and the inverse integer transform are applicable to image encoding devices and image decoding devices with a configuration other than those shown in FIG. 1 and FIG. 2. In addition, the structures of the integer transform and the inverse integer transform according to the present invention are also applicable to others than H.264.

Figure 3:
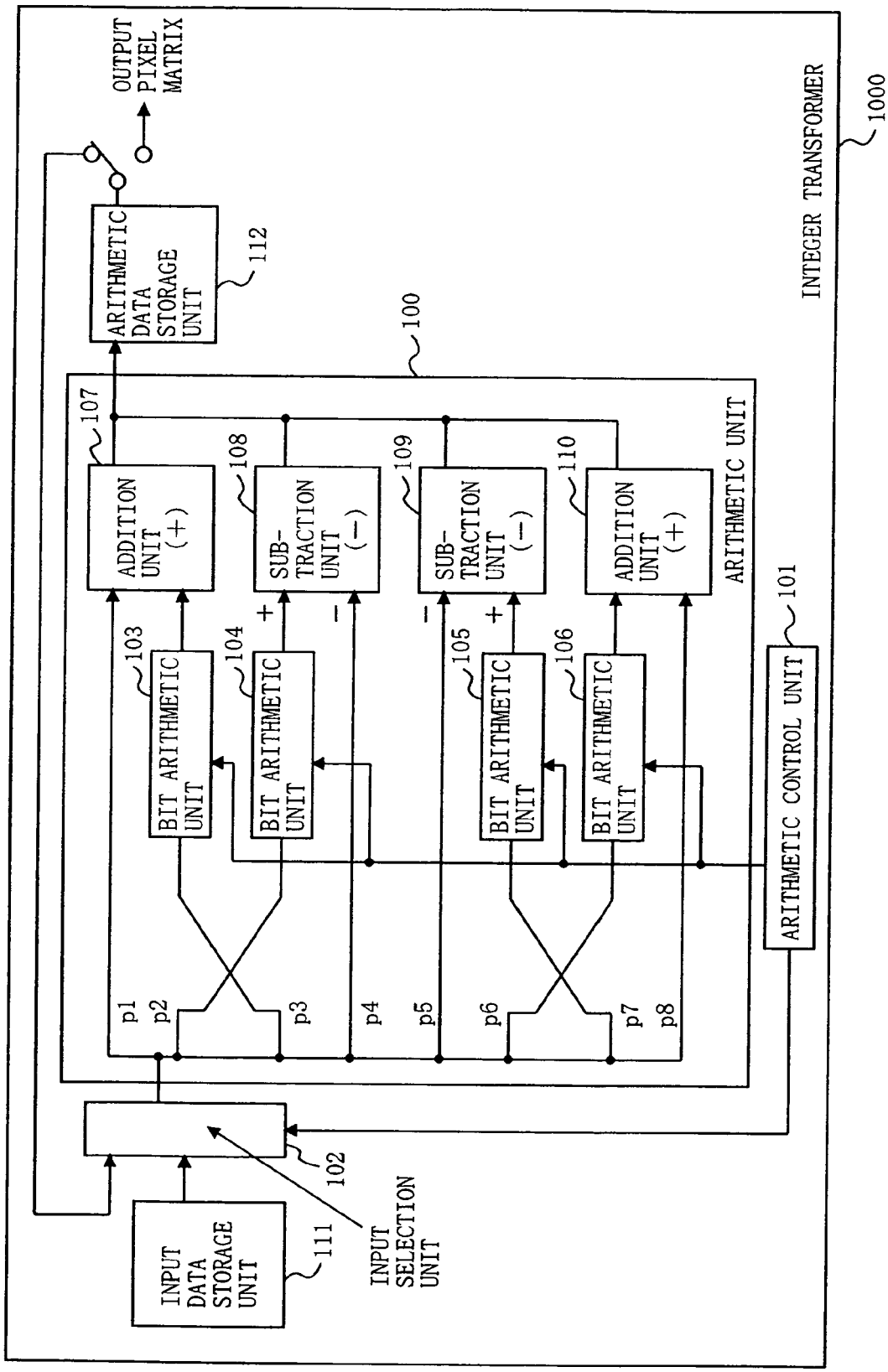
FIG. 3 is a diagram illustrating the configuration of an integer transformer 1000 according to the first embodiment of the present invention.

FIG. 3 is a diagram illustrating the configuration of an integer transformer 1000 according to the first embodiment of the present invention. The integer transformer 1000 is applied to the integer transform unit 12 and the inverse integer transform unit 16 shown in FIG. 1, and to the inverse integer transform unit 25 shown in FIG. 2. Also, in image decoding devices and image encoding devices other than those in FIG. 1 and FIG. 2, the integer transformer 1000 shown in FIG. 3 is applied to elements for performing the integer transform or the inverse integer transform.

In FIG. 3, the integer transformer 1000 includes an arithmetic unit 100, an arithmetic control unit 101, an input selection unit 102, an input data storage unit 111, and an arithmetic data storage unit 112. Note that the input data storage unit 111 and/or the arithmetic data storage unit 112 may be outside the integer transformer 1000.

The arithmetic unit 100 performs arithmetic processing on a plurality of pieces of inputted pixel data. The arithmetic unit 100 includes terminals p1 to p8, bit arithmetic units 103, 104, 105 and 106, addition units 107 and 110, and subtraction units 108 and 109. The bit arithmetic unit 104 bit shifts an input to the terminal p2. The bit arithmetic unit 103 bit shifts an input to the terminal p3. The bit arithmetic unit 106 bit shifts an input to the terminal p6. The bit arithmetic unit 105 bit shifts an input to the terminal p7. The addition unit 107 adds an input to the terminal p1 to an output of the bit arithmetic unit 103. The subtraction unit 108 subtracts an input to the terminal p4 from an output of the bit arithmetic unit 104. The subtraction unit 109 subtracts an input to the terminal p5 from an output of the bit arithmetic unit 105. The addition unit 110 adds an input to the terminal p8 to an output of the bit arithmetic unit 106. As such, the arithmetic unit 100 is configured to be able to execute integer arithmetic. The arithmetic data storage unit 112 stores arithmetic results by the addition units 107 and 110 and the subtraction units 108 and 109.

The arithmetic control unit 101 outputs an input selection instruction signal: an instruction to read pixel data for which the input selection unit 102 performs an arithmetic operation either from the input data storage unit 111 or from the arithmetic data storage unit 112 in the row direction or the column direction; and the current number of arithmetic operations. In addition, the arithmetic control unit 101 determines bit shift amounts for the bit arithmetic units 103, 104, 105 and 106 based on the current number of arithmetic operations and whether a processing target is a Hadamard transform, a 4×4 inverse integer transform or an 8×8 inverse integer transform, and outputs a bit shift instruction signal to the bit arithmetic units 103, 104, 105 and 106.

Since the arithmetic unit 100 has the above-described configuration, the content of processing executable in one arithmetic operation is limited. The arithmetic control unit 101 previously defines the arithmetic procedure for each transform mode so as to be associated with the number of arithmetic operations in units executable in one arithmetic operation in the arithmetic unit 100. Based on a transform mode used and the number of arithmetic operations, the arithmetic control unit 101 controls a destination from which pixel data that is to be inputted to the arithmetic unit 100 by the input selection unit 102 is read, as well as a combination of pieces of pixel data targeted for arithmetic processing in the arithmetic unit 100 and multiplier coefficients (bit shift amounts) for the arithmetic processing.

Based on the input selection instruction signal from the arithmetic control unit 101, the input selection unit 102 reads the pixel data targeted for processing from the input data storage unit 111 or the arithmetic data storage unit 112. In addition, the input selection unit 102 recognizes the combination of pieces of pixel data targeted for arithmetic processing based on the number of arithmetic operations indicated by the input selection instruction signal, and outputs the read pixel data to proper terminals p1 to p8.

The bit arithmetic units 103, 104, 105 and 106 perform no bit shift, a 1-bit shift to the right or a 2-bit shift to the right on pixel data inputted from the input selection unit 102 in accordance with the bit shift instruction signal inputted from the arithmetic control unit 101, and output bit-shifted pixel data to the addition units 107 and 110 and the subtraction units 108 and 109. Note that the pixel data outputted from the bit arithmetic units 103, 104, 105 and 106 is referred to as the "bit-shifted pixel data" even if it is not bit-shifted.

The addition units 107 and 110 add the bit-shifted pixel data from the bit arithmetic unit 103, 106 to pixel data inputted through the terminal p1, p8.

The subtraction units 108 and 109 subtract pixel data inputted through the terminal p4, p5 from the bit-shifted pixel data from the bit arithmetic unit 104, 105.

The input data storage unit 111 is a storage medium such as a memory, and stores pixel data targeted for an integer transform.

The arithmetic data storage unit 112 is a storage medium such as a memory, and stores pixel data transformed by the arithmetic unit 100. In addition, the arithmetic data storage unit 112 performs writing and reading in the row direction and writing and reading in the column direction in order to perform data transposition.

It is described below that a 4×4 inverse integer transform, an 8×8 inverse integer transform, a Hadamard transform, a 4×4 integer transform, and an 8×8 integer transform can be calculated by the integer transformer 1000 shown in FIG. 3. Note that at least two of the above transform modes can be switched.

First, as a premise, in these transforms, a square matrix (e.g., W) including pre-transform pixel data as its components is multiplied from the right by a square matrix T for transformation, and a square matrix WT obtained as a result of the multiplication is multiplied from the left by a transposed matrix $T^T$ of the square matrix T. Each component of a resultant square matrix $T^T$WT is post-transform pixel data. Hereinafter, an arithmetic operation of multiplying the square matrix W from the right by the square matrix T is referred to as the "row-direction arithmetic operation". In addition, an arithmetic operation of multiplying the square matrix WT from the left by the transposed matrix $T^T$ is referred to as the "column-direction arithmetic operation".

(The Operation in the Case of the 4×4 Inverse Integer Transform)

FIG. 4 is a table showing arithmetic expressions associated with the number of arithmetic operations and the relationship between combinations of pieces of pixel data targeted for arithmetic processing after inputted to the input terminals p1 to p8 by the input selection unit 102. The relationship as shown in FIG. 4 is defined in the arithmetic control unit 101. The definition method is not limited to the table format as in FIG. 4, and is not particularly restrictive.

In FIG. 4, row- and column-direction arithmetic operations are shown. Inputted pixel data is represented by components of a 4×4 matrix. In FIG. 4, components in one row of the 4×4 matrix including the inputted pixel data as its components are taken as in[0] to in[3]. In the first-round arithmetic operation, in[0] is inputted to the terminals p1 and p2, in[2] is inputted to the terminals p3 and p4, in[1] is inputted to the terminals p7 and p8, and in[3] is inputted to the terminals p5 and p6. By arithmetic expressions for the first round, a[0] to a[3] are obtained. Then, as shown in FIG. 4, a[0] to a[3] are inputted to their corresponding terminals p1 to p8. By arithmetic expressions for the second round, b[0] to b[3] are obtained. The above two arithmetic operations are performed for all rows of the inputted 4×4 pixel data. Thus, the row-direction arithmetic operations are completed, and 4×4 pixel data is obtained.

Thereafter, column-direction arithmetic operations are performed on the 4×4 pixel data matrix obtained by the row-direct ion arithmetic operations. In the column-direction arithmetic operations, components in one column of a matrix obtained by transposition are taken as in[0] to in[3]. In the first-round column-direction arithmetic operation, in[1] to in[3] are inputted to the terminals p1 to p8 as shown in FIG. 4. By the arithmetic expressions for the first round, a[0] to a[3] are obtained. Then, as shown in FIG. 4, a[0] to a [3] are inputted to their corresponding terminals p1 to p8. By the arithmetic expressions for the second round, b[0] to b[3] are obtained. The above two arithmetic operations are performed for all columns of the transposed 4×4 pixel data. Thus, the column-direction arithmetic operations are completed. As a result, 4×4 pixel data subjected to a 4×4 inverse integer transform is obtained.

Figure 5:
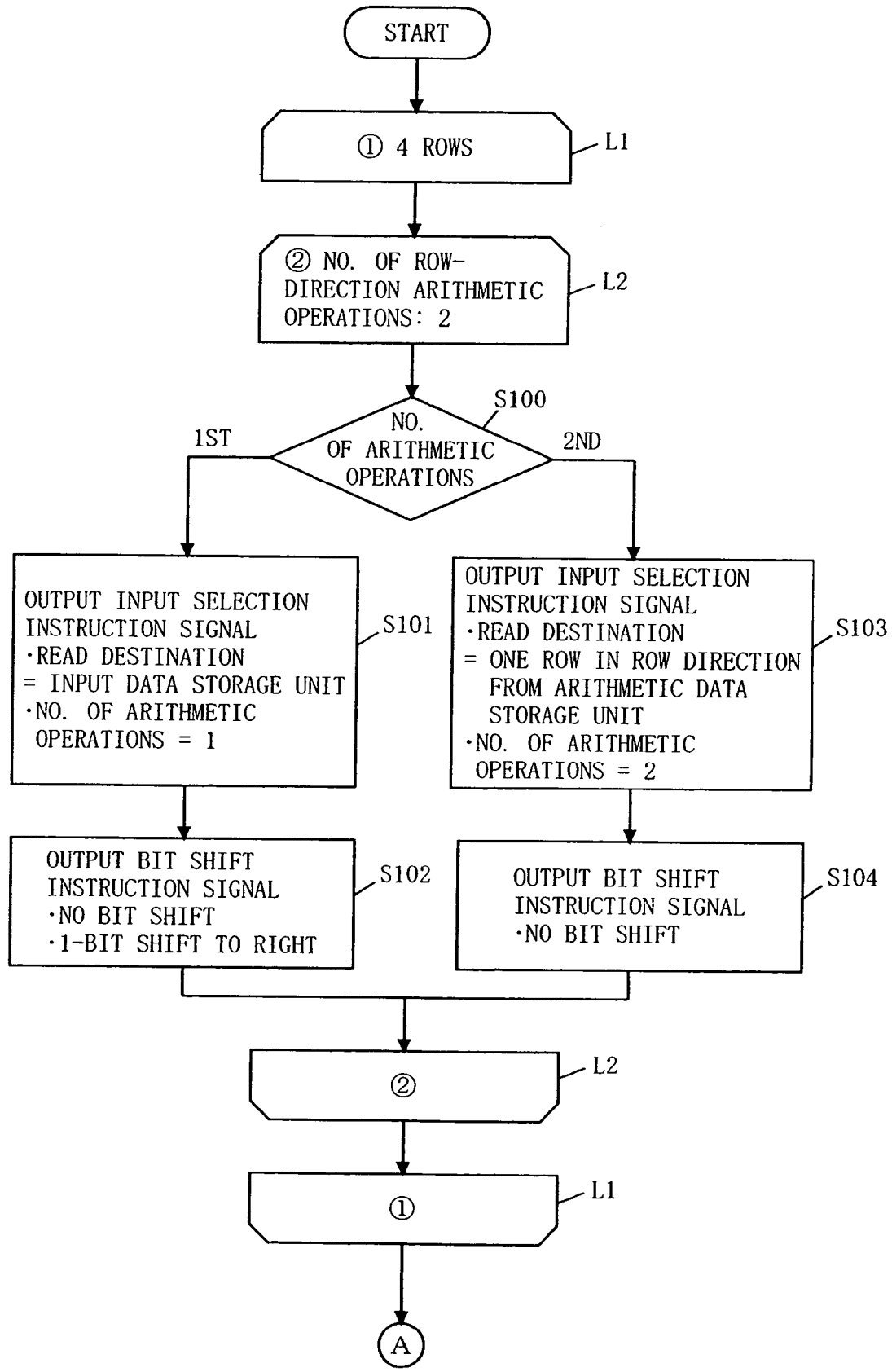
FIG. 5 is a flowchart illustrating the operation by an arithmetic control unit 101 for executing row-direction arithmetic operations for a 4×4 inverse integer transform.

FIG. 5 is a flowchart illustrating the operation by the arithmetic control unit 101 for executing row-direction arithmetic operations for a 4×4 inverse integer transform. Hereinbelow, the operation by the arithmetic control unit 101 for executing row-direction arithmetic operations for a 4×4 inverse integer transform is described with reference to FIG. 5.

In FIG. 5, loop L1 is a loop whose termination condition is when arithmetic operations in the loop L1 are completed for all rows (four rows) of inputted 4×4 pixel data. Loop L2 is a loop whose termination condition is when the number of row-direction arithmetic operations shown in FIG. 4 has reached two. Hereinafter, the inputted 4×4 pixel data is referred to as the "inputted pixel matrix".

In the first-round row-direction arithmetic operation for the inputted pixel matrix (loop L2=1st, step S100=1st), the arithmetic control unit 101 outputs an input selection instruction signal, which is inputted to the input selection unit 102. The input selection instruction signal includes an instruction to read components in the first row of the inputted pixel matrix from the input data storage unit 111, and a notification that the number of arithmetic operations is one (step S101).

In response to the input selection instruction signal, the input selection unit 102 reads input data for four pixels from the input data storage unit 111, and inputs it through terminals p1 to p8 as shown in FIG. 3.

Then, the arithmetic control unit 101 outputs a bit shift instruction signal. The bit shift instruction signal includes an instruction for the bit arithmetic units 103 and 104 to perform no bit shift, and an instruction for the bit arithmetic units 105 and 106 to perform a 1-bit shift to the right (step S102).

In response to the bit shift instruction signal, the bit arithmetic units 105 and 106 output bit-shifted pixel data generated by bit-shifting the inputted data to the right by one bit.

The addition unit 107 adds an output of the bit arithmetic unit 103 to the input to the terminal p1. The subtraction unit 108 subtracts the input to the terminal p4 from an output of the bit arithmetic unit 104. The subtraction unit 109 subtracts the input to the terminal p5 from the output of the bit arithmetic unit 105. The addition unit 110 adds the output of the bit arithmetic unit 106 to the input to the terminal p8. Results obtained by these additions and subtractions compose a first-round row-direction arithmetic result. The arithmetic data storage unit 112 stores the arithmetic result to the first row in the row direction.

In the second-round row-direction arithmetic operation for the inputted pixel matrix (loop L2=2nd, step S100=2nd), the arithmetic control unit 101 outputs an input selection instruction signal, which is inputted to the input selection unit 102. The input selection instruction signal includes an instruction to read the first-round row-direction arithmetic result from the arithmetic data storage unit 112, and a notification that the number of arithmetic operations is two (step S103).

In response to the input selection instruction signal, the input selection unit 102 reads one line in the row direction from the first-round row-direction arithmetic result stored in the arithmetic data storage unit 112, and inputs input data for four pixels to the terminals p1 to p8 corresponding to the second-round arithmetic operation as shown in FIG. 3.

Then, the arithmetic control unit 101 outputs a bit shift instruction signal. The bit shift instruction signal includes an instruction for the bit arithmetic units 103, 104, 105 and 106 to perform no bit shift (step S104).

In response to the bit shift instruction signal, the bit arithmetic units 103, 104, 105 and 106 output the inputted data without a bit shift.

The addition units 107 and 110 and the subtraction units 108 and 109 perform an arithmetic operation based on inputted data, and store a second-round row-direction arithmetic result in the first row of the arithmetic data storage unit 112. Thus, the processing in the loop L2 for the first row is completed.

The arithmetic control unit 101 executes the processing in the loop L2 for the remaining three rows. As such, the termination condition for the loop L1 is satisfied. As a result, pixel data for four rows by the row-direction arithmetic operations is obtained. The arithmetic data storage unit 112 stores the pixel data for four rows as a 4×4 matrix row-direction arithmetic result.

Figure 6:
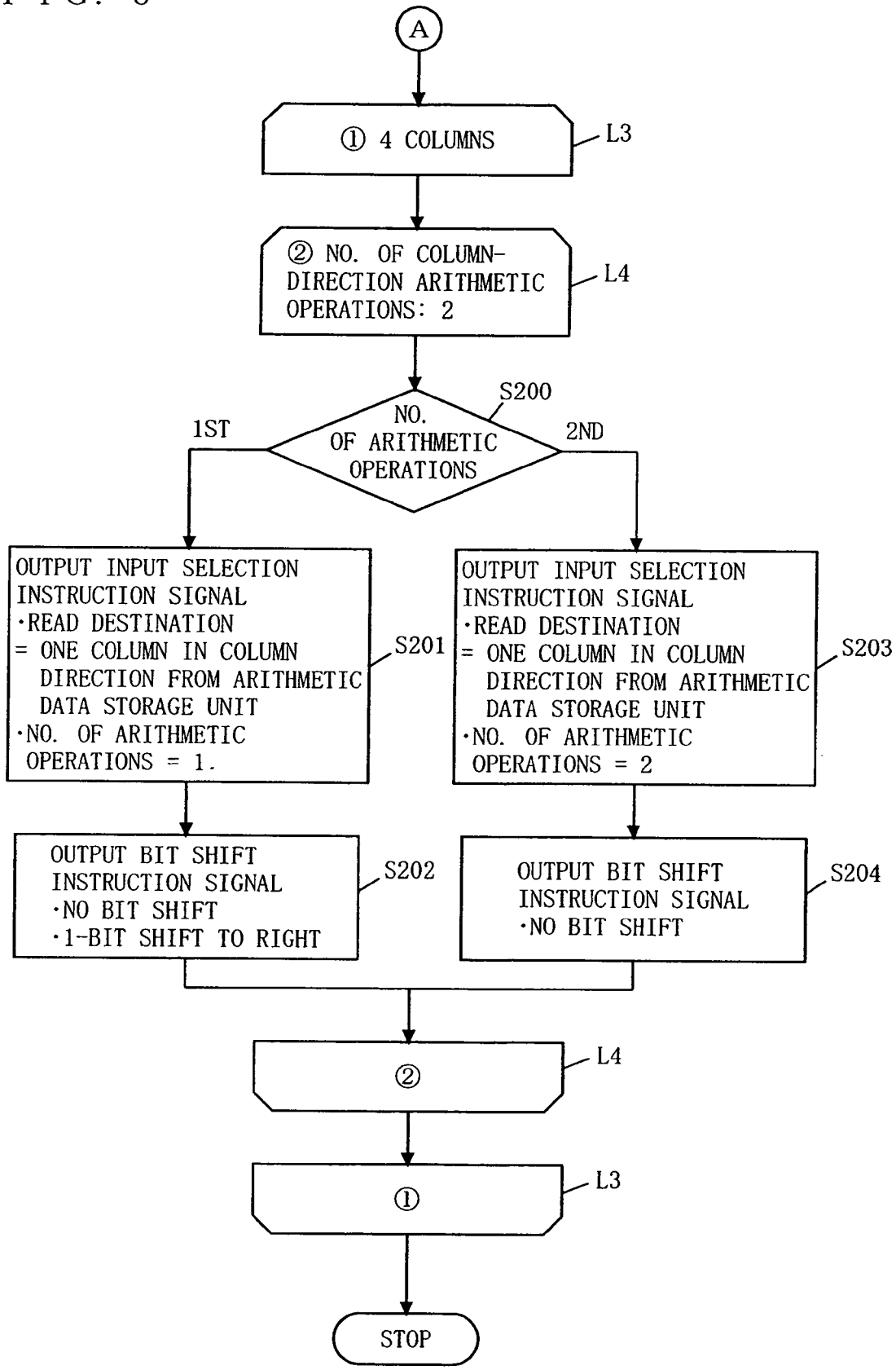
FIG. 6 is a flowchart illustrating the operation by the arithmetic control unit 101 for executing column-direction arithmetic operations for a 4×4 inverse integer transform.

FIG. 6 is a flowchart illustrating the operation by the arithmetic control unit 101 for executing column-direction arithmetic operations for a 4×4 inverse integer transform. Hereinbelow, the operation by the arithmetic control unit 101 for executing column-direction arithmetic operations for a 4×4 inverse integer transform is described with reference to FIG. 6.

In FIG. 6, loop L3 is a loop whose termination condition is when arithmetic operations in the loop L1 are completed for all columns (four columns) of the 4×4 matrix row-direction arithmetic result obtained by the row-direction arithmetic operations. Loop L4 is a loop whose termination condition is when the number of column-direction arithmetic operations shown in FIG. 4 has reached two.

In the first-round column-direction arithmetic operation for the 4×4 matrix row-direction arithmetic result (loop L4=1st, step S200=1st), the arithmetic control unit 101 outputs an input selection instruction signal, which is inputted to the input selection unit 102. The input selection instruction signal includes an instruction to read from the row direction the 4×4 matrix row-direction arithmetic result stored in the arithmetic data storage unit 112, and a notification that the number of arithmetic operations is one (step S201).

In response to the input selection instruction signal, the input selection unit 102 reads one column in the column direction from the 4×4 matrix row-direction arithmetic result stored in the arithmetic data storage unit 112, and inputs pixel data for four pixels in[0] to in[3] to the terminals p1 to p8 as shown in FIG. 3.

Then, the arithmetic control unit 101 outputs a bit shift instruction signal. The bit shift instruction signal includes an instruction for the bit arithmetic units 103 and 104 to perform no bit shift, and an instruction for the bit arithmetic units 105 and 106 to perform a 1-bit shift to the right (step S202).

In response to the bit shift instruction signal, the bit arithmetic units 105 and 106 output bit-shifted pixel data generated by bit-shifting the inputted data to the right by one bit.

The addition unit 107 adds an output of the bit arithmetic unit 103 to the input to the terminal p1. The subtraction unit 108 subtracts the input to the terminal p4 from an output of the bit arithmetic unit 104. The subtraction unit 109 subtracts the input to the terminal p5 from the output of the bit arithmetic unit 105. The addition unit 110 adds the output of the bit arithmetic unit 106 to the input to the terminal p8. Results obtained by these additions and subtractions compose a first-round column-direction arithmetic result. The arithmetic data storage unit 112 stores the arithmetic result in the first column in the column direction.

In the second-round column-direction arithmetic operation for the 4×4 matrix row-direction arithmetic result (loop L4=2nd, step S200=2nd), the arithmetic control unit 101 outputs an input selection instruction signal, which is inputted to the input selection unit 102. The input selection instruction signal includes an instruction to read the first-round column-direction arithmetic result from the arithmetic data storage unit 112, and a notification that the number of arithmetic operations is two (step S203).

In response to the input selection instruction signal, the input selection unit 102 reads one line in the column direction from the first-round column-direction arithmetic result stored in the arithmetic data storage unit 112, and inputs input data for four pixels to the terminals p1 to p8 corresponding to the second-round arithmetic operation as shown in FIG. 3.

Then, the arithmetic control unit 101 outputs a bit shift instruction signal. The bit shift instruction signal includes an instruction for the bit arithmetic units 103, 104, 105 and 106 to perform no bit shift (step S204).

In response to the bit shift instruction signal, the bit arithmetic units 103, 104, 105 and 106 output inputted data without a bit shift.

The addition units 107 and 110 and the subtraction units 108 and 109 perform an arithmetic operation based on inputted data, and store a second-round row-direction arithmetic result in the first column of the arithmetic data storage unit 112. Thus, the processing in the loop L4 for the first column is completed.

The arithmetic control unit 101 executes the processing in the loop L4 for the remaining three columns. As such, the termination condition for the loop L3 is satisfied. As a result, pixel data for four columns by the column-direction arithmetic operations is obtained. The pixel data for four columns is a final result obtained by the 4×4 inverse integer transform. Thus, the arithmetic data storage unit 112 outputs the pixel data for four columns as an output pixel matrix.

As such, the integer transformer 1000 is able to perform the 4×4 inverse integer transform.

(The Operation in the Case of the 8×8 Inverse Integer Transform)

FIG. 7 is a table showing arithmetic expressions associated with the number of arithmetic operations and the relationship between combinations of pieces of pixel data that are to be inputted to the input terminals p1 to p8 by the input selection unit 102. The relationship as shown in FIG. 7 is defined in the arithmetic control unit 101. The definition method is not limited to the table format as in FIG. 7, and is not particularly restrictive.

In FIG. 7, row- and column-direction arithmetic operations are shown. Inputted pixel data is represented by components of an 8×8 matrix. In FIG. 7, components in one row (one column) of the 8×8 matrix including the inputted pixel data as its components are taken as in[0] to in[7]. In the first through eighth arithmetic operations, combinations of pixel data inputted to the terminals p1 through P8 are associated. By the first through eighth arithmetic operations, arithmetic results defined by their respective arithmetic expressions are obtained. By the arithmetic operations up to the eighth round shown in FIG. 7, the row-direction (column-direction) operations are completed, and 8×8 pixel data is obtained.

Figure 8:
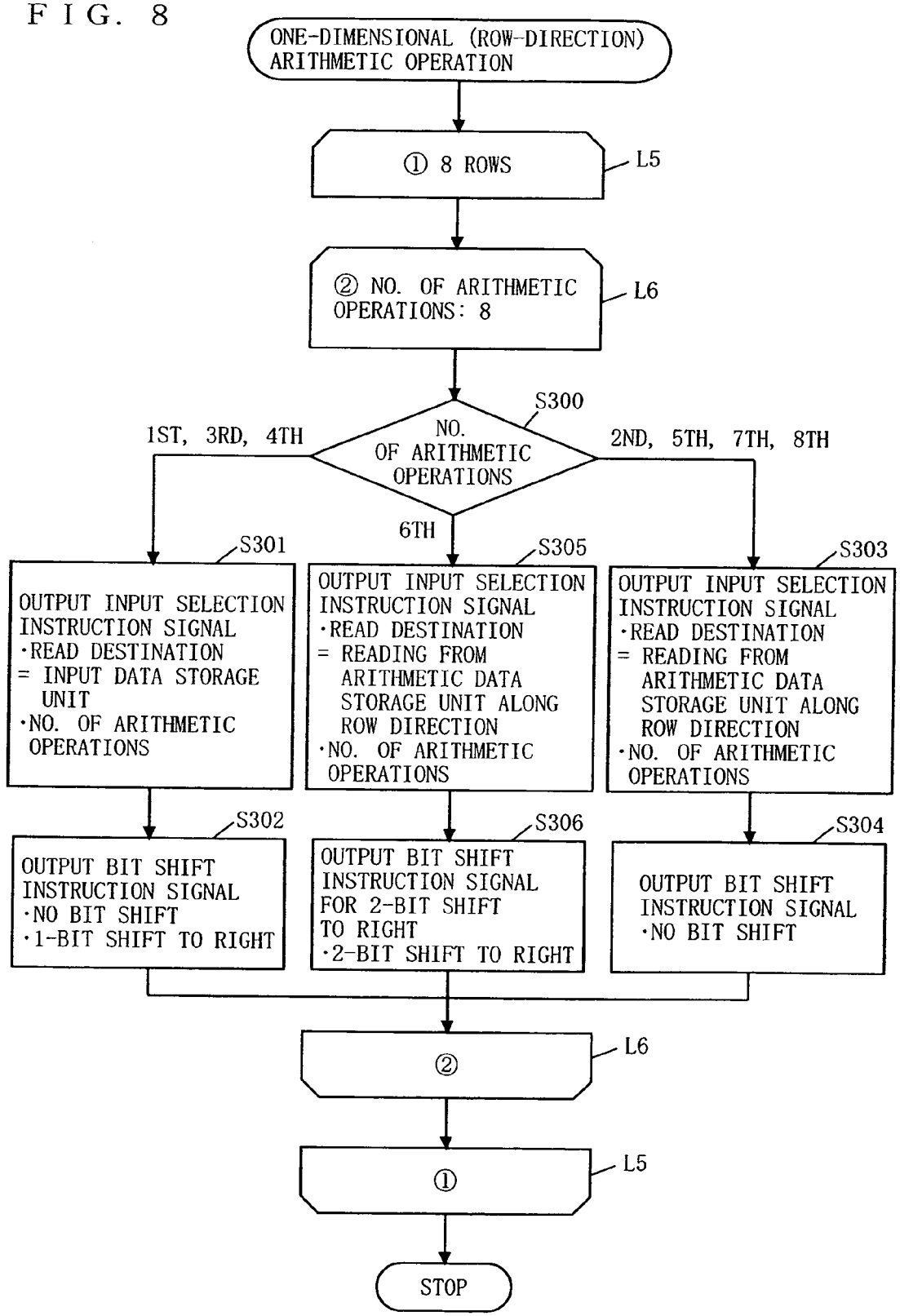
FIG. 8 is a flowchart illustrating the operation by the arithmetic control unit 101 for executing row-direction arithmetic operations for an 8×8 inverse integer transform.

FIG. 8 is a flowchart illustrating the operation by the arithmetic control unit 101 for executing row-direction arithmetic operations for an 8×8 inverse integer transform. Hereinbelow, the operation by the arithmetic control unit 101 for executing row-direction arithmetic operations for an 8×8 inverse integer transform is described with reference to FIG. 8.

In FIG. 8, loop L5 is a loop whose termination condition is when arithmetic operations in the loop L5 are completed for all rows (eight rows) of inputted 8×8 pixel data. Loop L6 is a loop whose termination condition is when the number of row-direction arithmetic operations shown in FIG. 8 has reached eight. Hereinafter, the inputted 8×8 pixel data is referred to as the "inputted pixel matrix".

In the case of performing the 8×8 inverse integer transform, processing is performed by eight arithmetic operations as shown in FIG. 7 into which one-dimensional row (column) direction transform expression given in (Expression 3) is divided.

In the first-round column-direction arithmetic operation (loop L6=1st, step S300=1st), the arithmetic control unit 101 outputs an input selection instruction signal, which is inputted to the input selection unit 102. The input selection instruction signal includes an instruction to read in[0], in[4], in[2] and in[6], which are components of the first row of the inputted pixel matrix, from the input data storage unit 111, and a notification that the number of arithmetic operations is one (step S301).

In response to the input selection instruction signal, the input selection unit 102 reads pieces of the inputted pixel data in[0], in[4], in[2] and in[6] from the input data storage unit 111, and inputs them to the terminals p1 to p8 as shown in FIG. 7.

Then, the arithmetic control unit 101 outputs a bit shift instruction signal. The bit shift instruction signal includes an instruction for the bit arithmetic units 103 and 104 to perform no bit shift, and an instruction for the bit arithmetic units 105 and 106 to perform a 1-bit shift to the right (step S302).

In response to the bit shift instruction signal, the bit arithmetic units 105 and 106 output bit-shifted pixel data generated by bit-shifting the inputted data to the right by one bit.

The addition unit 107 adds an output of the bit arithmetic unit 103 to the input to the terminal p1. The subtraction unit 108 subtracts the input to the terminal p4 from an output of the bit arithmetic unit 104. The subtraction unit 109 subtracts the input to the terminal p5 from the output of the bit arithmetic unit 105. The addition unit 110 adds the output of the bit arithmetic unit 106 to the input to the terminal p8. Results obtained by these additions and subtractions are stored as a first-round row-direction arithmetic result to the arithmetic data storage unit 112 along the row direction.

In the second-round row-direction arithmetic operation (loop L6=2nd, step S300=2nd), the arithmetic control unit 101 outputs an input selection instruction signal, which is inputted to the input selection unit 102. The input selection instruction signal includes an instruction to read the first-round row-direction arithmetic result from the arithmetic data storage unit 112, and a notification that the number of arithmetic operations is two (step S303).

In response to the input selection instruction signal, the input selection unit 102 reads the first-round row-direction arithmetic result stored in the arithmetic data storage unit 112, and inputs input data for four pixels to the terminals p1 to p8 corresponding to the second-round arithmetic operation as shown in FIG. 7.

Then, the arithmetic control unit 101 outputs a bit shift instruction signal. The bit shift instruction signal includes an instruction for the bit arithmetic units 103, 104, 105 and 106 to perform no bit shift (step S304).

In response to the bit shift instruction signal, the bit arithmetic units 103, 104, 105 and 106 output the inputted data without a bit shift.

The addition units 107 and 110 and the subtraction units 108 and 109 perform an arithmetic operation based on inputted data, and store a second-round row-direction arithmetic result in the arithmetic data storage unit 112.

In the third-round row-direction arithmetic operation (loop L6=3rd, step S300=3rd) and the fourth-round row-direction arithmetic operation (loop L6=4th, step S300=4th), the arithmetic control unit 101 outputs an input selection instruction signal including an instruction to read from the input data storage unit 111, and a notification that the number of arithmetic operations is three/four (step S301). Also, the arithmetic control unit 101 outputs a bit shift instruction signal that instructs the bit arithmetic units 103 and 104 to perform no bit shift and instructs the bit arithmetic units 105 and 106 to perform a 1-bit shift to the right (step S302).

In response to the input selection instruction signal, the input selection unit 102 reads pieces of the inputted pixel data in[1], in[3], in[5] and in[7] from the input data storage unit 111, and inputs them to the terminals p1 to p8 as shown in FIG. 7 in accordance with the number of arithmetic operations.

In response to the bit shift instruction signal, the bit arithmetic units 105 and 106 output bit-shifted pixel data generated by bit-shifting data to the right by one bit.

The addition units 107 and 110 and the subtraction units 108 and 109 perform an arithmetic operation. The arithmetic data storage unit 112 stores a third-round row-direction arithmetic result and a fourth-round row-direction arithmetic result along the row direction.

In the fifth-round row-direction arithmetic operation (loop L6=5th, step S300=5th), the arithmetic control unit 101 outputs an input selection instruction signal including an instruction to read the third-round row-direction arithmetic result and the fourth-round row-direction arithmetic result from the arithmetic data storage unit 112, and a notification that the number of arithmetic operations is five (step S303). Also, the arithmetic control unit 101 outputs a bit shift instruction signal that instructs the bit arithmetic units 103, 104, 105 and 106 not to perform a bit shift (step S304).

In response to the input selection instruction signal, the input selection unit 102 reads the third-round row-direction arithmetic result and the fourth-round row-direction arithmetic result stored in the input data storage unit 111, and inputs input data for eight pixels to their corresponding terminals p1 to p8 as shown in FIG. 7.

In response to the bit shift instruction signal, the bit arithmetic units 103, 104, 105 and 106 output the inputted data without a bit shift.

The addition units 107 and 110 and the subtraction units 108 and 109 perform an arithmetic operation. The arithmetic data storage unit 112 stores a fifth-round row-direction arithmetic result along the row direction.

In the sixth-round row-direction arithmetic operation (loop L6=6th, step S300=6th), the arithmetic control unit 101 outputs an input selection instruction signal including an instruction to read the fifth-round row-direction arithmetic result from the arithmetic data storage unit 112, and a notification that the number of arithmetic operations is six (step S305). Also, the arithmetic control unit 101 outputs a bit shift instruction signal that instructs the bit arithmetic units 103, 104, 105 and 106 to perform a 2-bit shift to the right (step S306).

In response to the input selection instruction signal, the input selection unit 102 reads the fifth-round row-direction arithmetic result stored in the arithmetic data storage unit 112, and inputs it to its corresponding terminals p1 to p8 as shown in FIG. 7.

In response to the bit shift instruction signal, the bit arithmetic units 103, 104, 105 and 106 bit shift the inputted data to the right by two bits, and output it as bit-shifted pixel data.

The addition units 107 and 110 and the subtraction units 108 and 109 perform an arithmetic operation. The arithmetic data storage unit 112 stores a sixth-round row-direction arithmetic result along the row direction.

In the seventh-round row-direction arithmetic operation (loop L6=7th, step S300=7th) and the eighth-round row-direction arithmetic operation (loop L6=8th, step S300=8th), the arithmetic control unit 101 outputs an input selection instruction signal including an instruction to read the second-round row-direction arithmetic result and the sixth-round row-direction arithmetic result from the arithmetic data storage unit 112, and a notification that the number of arithmetic operations is seven/eight. Also, the arithmetic control unit 101 outputs a bit shift instruction signal that instructs the bit arithmetic units 103, 104, 105 and 106 not to perform a bit shift (step S304).

In response to the input selection instruction signal, the input selection unit 102 reads the second-round row-direction arithmetic result and the sixth-round row-direction arithmetic result stored in the arithmetic data storage unit 112, and inputs input data for four pixels to their corresponding terminals p1 to p8 as shown in FIG. 7.

In response to the bit shift instruction signal, the bit arithmetic units 103, 104, 105 and 106 output the inputted data as bit-shifted pixel data without bit-shifting it.

The addition units 107 and 110 and the subtraction units 108 and 109 perform an arithmetic operation. The arithmetic data storage unit 112 stores a seventh-round row-direction arithmetic result and an eighth-round row-direction arithmetic result along the row direction. By the seventh-round row-direction arithmetic result and the eighth-round row-direction arithmetic result, an arithmetic result for one row in the row-direction arithmetic operations is obtained.

The processing in the loop L6 for the remaining seven rows is executed. As a result, the 8×8 matrix row-direction arithmetic result is obtained, and stored in the arithmetic data storage unit 112.

Next, the integer transformer 1000 performs the column-direction arithmetic operations on the obtained 8×8 matrix row-direction arithmetic result. In the column-direction arithmetic operations, the arithmetic control unit 101 causes the arithmetic unit 100 to perform eight arithmetic operations shown in the loop L6 such that the arithmetic unit 100 is caused to perform eight arithmetic operations shown in the loop L6 to obtain data for one column for each column of the 8×8 matrix row-direction arithmetic result, i.e., data for eight columns in total. The pixel data for eight columns obtained by the column-direction arithmetic operations is a final result obtained by the 8×8 inverse integer transform. Thus, the arithmetic data storage unit 112 outputs the pixel data for eight columns as an output pixel matrix.

As such, the integer transformer 1000 is able to performs the 8×8 inverse integer transform.

As described above, the arithmetic control unit 101 defines the arithmetic procedures for the 4×4 inverse integer transform and the 8×8 inverse integer transform by dividing them into units executable in one arithmetic operation in the arithmetic unit 100 in association with the number of arithmetic operations. In addition, in accordance with a transform mode used and the number of arithmetic operations, the arithmetic control unit controls combinations of pieces of pixel data inputted to the terminals p1 to p8 by the input selection unit 102, and the bit shift amounts (multiplier coefficients) for the bit arithmetic units 103 to 106. Thus, it is possible to realize switching between the 4×4 inverse integer transform and the 8×8 inverse integer transform by using a single integer transformer 1000.

(The Operation in the Case of the 4×4 Integer Transform)

Row-direction transform expressions for the 4×4 integer transform are given in Expression 6, and therefore the input selection unit 102 inputs pixel data to the terminals p1 to p8 as shown in FIG. 9. The arithmetic control unit 101 controls arithmetic operations such that the bit shift amounts for the bit arithmetic units 105 and 106 in the second-round arithmetic operation are shifted to the left by one bit. Note that this makes it possible to realize the 4×4 integer transform by the circuit shown in FIG. 3.

$$e[i][0]=d[i][0]+d[i][3], \text{ where } i=0,\ldots,3$$

$$e[i][1]=d[i][1]+d[i][2], \text{ where } i=0,\ldots,3$$

$$e[i][2]=d[i][1]-d[i][2], \text{ where } i=0,\ldots,3$$

$$e[i][3]=d[i][0]-d[i][3], \text{ where } i=0,\ldots,3$$

$$f[i][0]=e[i][0]+e[i][1], \text{ where } i=0,\ldots,3$$

$$f[i][1]=(e[i][3]<<1)+e[i][2], \text{ where } i=0,\ldots,\mathbf{3}$$

$$f[i][2]=e[i][0]-e[i][1], \text{ where } i=0,\ldots,3$$

$$f[i][3]=e[i][3]-(e[i][2]<<1), \text{ where } i=0,\ldots,\mathbf{3} \quad \text{[Expression 6]}$$

Note that in Expression 6 and FIG. 9, d[i][j] corresponds to in[i], e[i][j] corresponds to a[i], and f[i][j] corresponds to b[i].

(The operation in the case of the 8×8 integer transform)

Figure 10B:
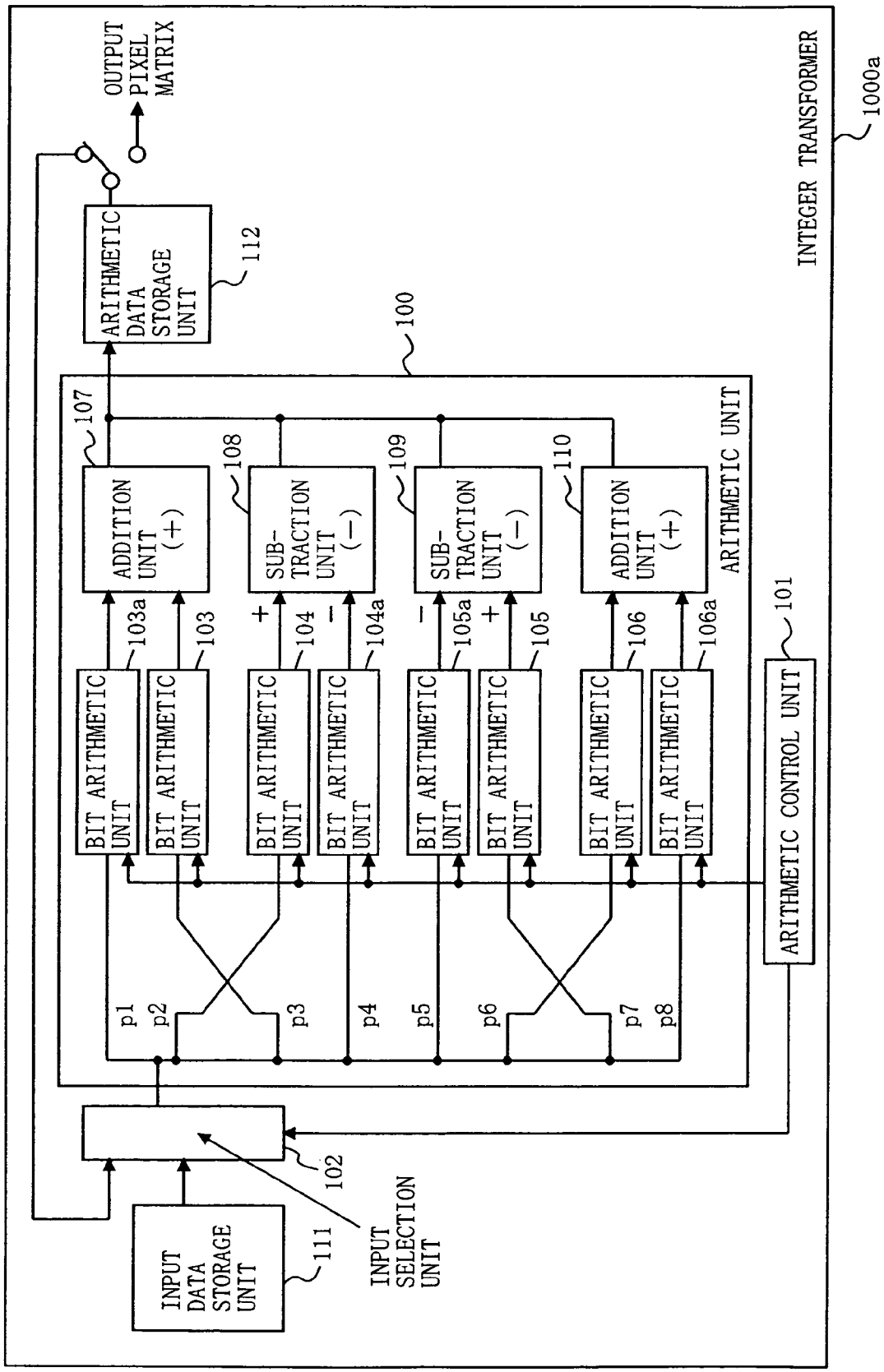
FIG. 10A is a table showing, in relation to a 8×8 integer transform, arithmetic expressions associated with the number of arithmetic operations and the relationship between combinations of pieces of pixel data that are to be inputted to the input terminals p1 to p8 by the input selection unit 102.

Row-direction transform expressions for the 8×8 integer transform are given in Expression 7, and therefore the input selection unit 102 inputs pixel data to the terminals p1 to p8 as shown in FIG. 10A. The arithmetic control unit 101 controls arithmetic operations by adjusting the bit shift amount.

$$g[i][0] = f[i][0] + f[i][7] \quad \text{[Expression 7]}$$

$$g[i][1] = f[i][1] + f[i][6]$$

$$g[i][2] = f[i][2] + f[i][5]$$

$$g[i][3] = f[i][3] + f[i][4]$$

$$g[i][4] = f[i][0] - f[i][7]$$

$$g[i][5] = f[i][1] - f[i][6]$$

$$g[i][6] = f[i][2] - f[i][5]$$

$$g[i][7] = f[i][3] - f[i][4]$$

$$h[i][0] = g[i][0] + g[i][3]$$

$$h[i][1] = g[i][1] + g[i][2]$$

$$h[i][2] = g[i][0] - g[i][3]$$

$$h[i][3] = g[i][1] - g[i][2]$$

$$h[i][4] = g[i][5] + g[i][6] + \{(g[i][4] >> 1) + g[i][4]\}$$
$$= g[i][4] + g[i][6] + \{(g[i][4] >> 1) + g[i][5]\}$$

$$h[i][5] = g[i][4] - g[i][7] - \{(g[i][6] >> 1) + g[i][6]\}$$
$$= g[i][4] - g[i][6] - \{(g[i][6] >> 1) + g[i][7]\}$$

$$h[i][6] = g[i][4] + g[i][7] - \{(g[i][5] >> 1) + g[i][5]\}$$
$$= g[i][7] - g[i][5] + \{(g[i][4] - (g[i][5] >> 1)\}$$

$$h[i][7] = g[i][5] - g[i][6] + \{(g[i][7] >> 1) + g[i][7]\}$$
$$= g[i][7] + g[i][5] + \{(g[i][6] - (g[i][7] >> 1)\}$$

$$k[i][0] = h[i][0] + h[i][1], \text{ where } i = 0, \ldots, 7$$

$$k[i][2] = h[i][2] + (h[i][3] >> 1), \text{ where } i = 0, \ldots, 7$$

$$k[i][4] = h[i][0] - h[i][1], \text{ where } i = 0, \ldots, 7$$

$$k[i][6] = (h[i][2] >> 1) - h[i][3], \text{ where } i = 0, \ldots, 7$$

$$k[i][1] = h[i][4] + (h[i][7] >> 2), \text{ where } i = 0, \ldots, 7$$

$$k[i][3] = h[i][5] + (h[i][6] >> 2), \text{ where } i = 0, \ldots, 7$$

$$k[i][5] = h[i][6] - (h[i][5] >> 2), \text{ where } i = 0, \ldots, 7$$

$$k[i][7] = -h[i][7] + (h[i][4] >> 2), \text{ where } i = 0, \ldots, 7$$

Note that in Expression 7 and FIG. 10A, f[i][j] corresponds to in[i], g[i][j] corresponds to a[i], and k[i][j] corresponds to out[i]. Note that the correspondences among h, b, b1 and b2 can be appreciated from Expression 7 and FIG. 10A.

(The Operation in the Case of the Intra 16×16 Hadamard Transform)

In the case of the Intra 16×16 Hadamard transform, the Hadamard transform is executed in units of 4×4. The Hadamard transform is performed on a 4×4 matrix obtained by extracting DC components obtained by subjecting a 16×16 time domain to an integer transform in units of 4×4 as shown in FIG. 30. A transform expression for the Hadamard transform is represented as in Expression 8.

$$\begin{vmatrix} 1, & 1, & 1, & 1 \\ 1, & 1, & -1, & -1 \\ 1, & -1, & -1, & 1 \\ 1, & -1, & 1, & -1 \end{vmatrix} \begin{vmatrix} C00, & C01, & C02, & C03 \\ C10, & C11, & C12, & C13 \\ C20, & C21, & C22, & C23 \\ C30, & C31, & C32, & C33 \end{vmatrix} \begin{vmatrix} 1, & 1, & 1, & 1 \\ 1, & 1, & -1, & -1 \\ 1, & -1, & -1, & 1 \\ 1, & -1, & 1, & -1 \end{vmatrix} \quad \text{[Expression 8]}$$

$$+\text{------(1)------}+$$
$$+\text{------(2)------}+$$

Here, $C_{ij}$ (i, j=0, 1, ... 3) represents extracted DC components.

(1) is expanded as in Expression 9.

$$\begin{vmatrix} C00+C01+C02+C03, & C00+C01-C02-C03, & C00-C01-C02+C03, & C00-C01+C02-C03 \\ C10+C11+C12+C13, & C10+C11-C12-C13, & C10-C11-C12+C13, & C10-C11+C12-C13 \\ C20+C21+C22+C23, & C20+C21-C22-C23, & C20-C21-C22+C23, & C20-C21+C22-C23 \\ C30+C31+C32+C33, & C30+C31-C32-C33, & C30-C31-C32+C33, & C30-C31+C32-C33 \end{vmatrix} \quad \text{[Expression 9]}$$

Here, a definition is made as in Expression 10.

$A=C00+C01, B=C00-C01, C=C02+C03, D=C02-C03$ $E=C10+C11, F=C10-C11, G=C12+C13, H=C12-C13$ $I=C20+C21, J=C20-C21, K=C22+C23, L=C22-C23$ $M=C30+C31, N=C30-C31, O=C32+C33, P=C32-C33$ [Expression 10]

Therefore, Expression 9 is represented as in Expression 11.

$$\begin{vmatrix} A+C, & A-C, & B-D, & B+D \\ E+G, & E-G, & F-H, & F+H \\ I+K, & I-K, & J-L, & J+L \\ M+O, & M-O, & N-P, & N+P \end{vmatrix}$$ [Expression 11]

Expression 11 is defined as in Expression 12.

$$\begin{vmatrix} C00', & C01', & C02', & C03' \\ C10', & C11', & C12', & C13' \\ C20', & C21', & C22', & C23' \\ C30', & C31', & C32', & C33' \end{vmatrix}$$ [Expression 12]

Expression 12 is used to expand (2) in Expression 8 as in Expression 13.

$$\begin{vmatrix} C00'+C10'+C20'+C30', & C01'+C11'+C21'+C31', & C02'+C12'+C22'+C32', & C03'+C13'+C23'+C33' \\ C00'+C10'-C20'-C30', & C01'+C11'-C21'-C31', & C02'+C12'-C22'-C32', & C03'+C13'-C23'-C33' \\ C00'-C10'-C20'+C30', & C01'-C11'-C21'+C31', & C02'-C12'-C22'+C32', & C03'-C13'-C23'+C33' \\ C00'-C10'+C20'-C30', & C01'-C11'+C21'-C31', & C02'-C12'+C22'-C32', & C03'-C13'+C23'-C33' \end{vmatrix}$$ [Expression 13]

Here, a definition is made as in Expression 14.

$A'=C00'+C10', B'=C00'-C10', C'=C20'+C30', D'=C20'-C30'$ $E'=C01'+C11', F'=C01'-C11', G'=C21'+C31', H'=C21'-C31'$ $I'=C02'+C12', J'=C02'-C12', K'=C22'+C32', L'=C22'-C32'$ $M'=C03'+C13', N'=C03'-C13', O'=C23'+C33', P'=C23'-C33'$ [Expression 14]

Therefore, Expression 13 is represented as in Expression 15.

$$\begin{vmatrix} A'+C', & E'+G', & I'+K', & M'+O' \\ A'-C', & E'-G', & I'-K', & M'-O' \\ B'-D', & F'-H', & J'-L', & N'-P' \\ B'+D', & F'+H', & J'+L', & N'+P' \end{vmatrix}$$ [Expression 15]

From the above calculation results, it can be appreciated that the Intra 16×16 Hadamard transform can be calculated by the integer transformer 1000 in FIG. 3. Specifically, the integer transformer 1000 may execute arithmetic operations in the following arithmetic procedure.

(step 1) The arithmetic control unit 101 horizontally reads one row of four coefficients from the 4×4 matrix ($C_{ij}$) of DC components, and inputs them to their corresponding terminals p1 to p8. Note that by the above expressions, it is possible to make a definition as to which terminal receives the input.

(step 2) The arithmetic control unit 101 outputs a bit shift instruction signal indicating that no bit shift is performed.

(step 3) In the first-round arithmetic operation, the addition units 107 and 110 and the subtraction units 108 and 109 calculate A, B, C and D shown in Expression 10, and store them in the arithmetic data storage unit 112.

(step 4) In the second-round arithmetic operation, the arithmetic control unit 101 outputs an input selection instruction signal, which indicates that A, B, C and D are read from the arithmetic data storage unit 112, and a bit shift instruction, and the addition units 107 and 110 and the subtraction units 108 and 109 calculate the first row shown in Expression 11. Thus, calculation of the first row shown in Expression 9 is completed.

(step 5) Similarly, the second through fourth rows shown in Expression 9 are calculated. As a result, Expression 12 is obtained.

(step 6) Then, the arithmetic control unit 101 executes the column-direction arithmetic operations to obtain a matrix shown in Expression 13. The column-direction arithmetic operations are similar to the row-direction arithmetic operations up to step 5, and therefore can be executed by the arithmetic unit 100.

As such, the arithmetic control unit 101 also defines the Intra 16×16 Hadamard transform by dividing it into units executable in one arithmetic operation in the arithmetic unit in association with the number of arithmetic operations. Therefore, by controlling combinations of pieces of pixel data that are to be inputted to the arithmetic unit 100 and the bit shift amount in accordance with the number of arithmetic operations, the arithmetic control unit 101 can execute the Intra 16×16 Hadamard transform. While the foregoing description has been given with respect to the Hadamard transform for encoding, the same transform expressions are used for a Hadamard transform for decoding, and therefore it can be executed by the integer transformer 1000.

(The Operation in the Case of a Chroma Hadamard Transform)

In the case of a Chroma Hadamard transform, a Hadamard transform is executed in units of 2×2. The transform expression for the Chroma Hadamard transform is represented as in Expression 16.

$$\begin{bmatrix} 1, & 1 \\ 1, & -1 \end{bmatrix} \begin{bmatrix} C00, & C01 \\ C10, & C11 \end{bmatrix} \begin{bmatrix} 1, & 1 \\ 1, & -1 \end{bmatrix}$$ [Expression 16]

+------(3)-------+
+------(4)-------+

Here, $C_{ij}$ (i, j=0, 1) represents extracted DC components.

(3) is expanded as in Expression 17.

$$\begin{vmatrix} C00+C01, & C00-C01 \\ C10+C11, & C10-C11 \end{vmatrix}$$ [Expression 17]

Here, a definition is made as in Expression 18.

$A=C00+C01, B=C00-C01, C=C10+C11, D=C10-C11$ [Expression 18]

Then, (4) is expanded as in Expression 19.

$$\begin{vmatrix} A+C, & B+D \\ A-C, & B-D \end{vmatrix}$$ [Expression 19]

From the above calculations results, it can be appreciated that the Chroma Hadamard transform can be calculated by the integer transformer 1000 in FIG. 3. Specifically, the integer transformer 1000 executes arithmetic operations in the following arithmetic procedure.

(step 1) The arithmetic control unit 101 causes the input selection unit 102 to read four coefficients from the 2×2 matrix ($C_{ij}$), and input them to their corresponding terminals p1 to p8. Note that any reference as to which terminal should receive the input is omitted since it is readily estimated from the above expressions.

(step 2) A, B, C and D are calculated by the addition units 107 and 110 and the subtraction units 108 and 109, and stored in the arithmetic data storage unit 112.

(step 3) The arithmetic control unit 101 causes the input selection unit 102 to read A, B, C and D stored in the arithmetic data storage unit 112, and input them to the terminals p1 to p8 such that the calculation in Expression 19 can be performed. Thus, the arithmetic unit 100 can calculate the result shown in Expression 19.

As such, the arithmetic control unit 101 also defines the Chroma Hadamard transform by dividing it into units executable in one arithmetic operation in the arithmetic unit in association with the number of arithmetic operations. Therefore, by controlling combinations of pieces of pixel data that are to be inputted to the arithmetic unit 100 and the bit shift amount in accordance with the number of arithmetic operations, the arithmetic control unit 101 can execute the Chroma Hadamard transform. While the foregoing description has been given with respect to the Chroma Hadamard transform for encoding, the same transform expressions are used for a Chroma Hadamard transform for decoding, and therefore it can be executed by the integer transformer 1000.

Note that when simply referred to as the Hadamard transform, it means the Intra 16×16 Hadamard transform and the Chroma Hadamard transform.

As described above, the arithmetic control unit 101 defines arithmetic procedures for the 4×4 inverse integer transform, the 8×8 inverse integer transform, the 4×4 integer transform, the 8×8 integer transform, and the Hadamard transform by dividing them into units executable in one arithmetic operation in the arithmetic unit 100 in association with the number of arithmetic operations. Also, in accordance with the transform mode used and the number of arithmetic operations, the arithmetic control unit controls the combinations pieces of pixel data that are inputted to the terminals p1 to p8 by the input selection unit 102, and the bit shift amounts (the multiplier coefficients) for the bit arithmetic units 103 to 106. Thus, it is possible to realize switching among the 4×4 inverse integer transform, the 8×8 inverse integer transform, the 4×4 integer transform, the 8×8 integer transform, and the Hadamard transform by using a single integer transformer 1000.

The reason for this is as follows. Of the transform expressions described in the first embodiment, the fifth-round arithmetic expressions for the 8×8 inverse integer transform shown in FIG. 7 includes a pair (*1) of two arithmetic expressions for inputting four values (e.g., a1[1], a1[5], a2[1] and a2[5]) and outputting two values (e.g., a[1] and a[5]), and there are two pairs of such arithmetic expressions (*1 and *2). Other arithmetic expressions are arithmetic expressions for inputting two values and outputting two values. The minimum possible configuration of a circuit capable of realizing the fifth-round arithmetic expressions for the 8×8 inverse integer transform includes the terminals p1 to p4, the bit arithmetic units 103 and 104, the addition unit 107, and the subtraction unit 108. In the arithmetic unit 100, another such minimum possible configuration is provided (the terminals p5 to p8, the bit arithmetic units 105 and 106, the subtraction unit 109, and the addition unit 110). The minimum possible configuration is referred to as the "four-input/two-output circuit". The four-input/two-output circuit functions as a two-input/two-output circuit when the same value is inputted to two terminals as in arithmetic expressions other than the fifth-round arithmetic expressions for the 8×8 inverse integer transform. Accordingly, by defining the 4×4 inverse integer transform, the 8×8 inverse integer transform, the 4×4 integer transform, the 8×8 integer transform, the Intra 16×16 Hadamard transform (the 4×4 Hadamard transform), and the Chroma Hadamard transform (the 2×2 Hadamard transform) with arithmetic expressions that can be calculated in the four-input/two-output circuit or the two-input/two-output circuit to allow the arithmetic control unit 101 to control at least terminals to which data is inputted and the bit shift amounts, it is made possible to realize the transforms using a common integer transformer.

Thus, the image encoding device and the image decoding device can use a single integer transformer in a time-sharing manner, while changing a standard used as necessary, and therefore are capable of dealing with various encoding standards, while achieving compactness.

Second Embodiment

A second embodiment will be described with respect to an integer transformer including two arithmetic units. Since the integer transformer according to the second embodiment has two arithmetic units, it is possible to enhance the processing speed for integer transforms.

Figure 11:
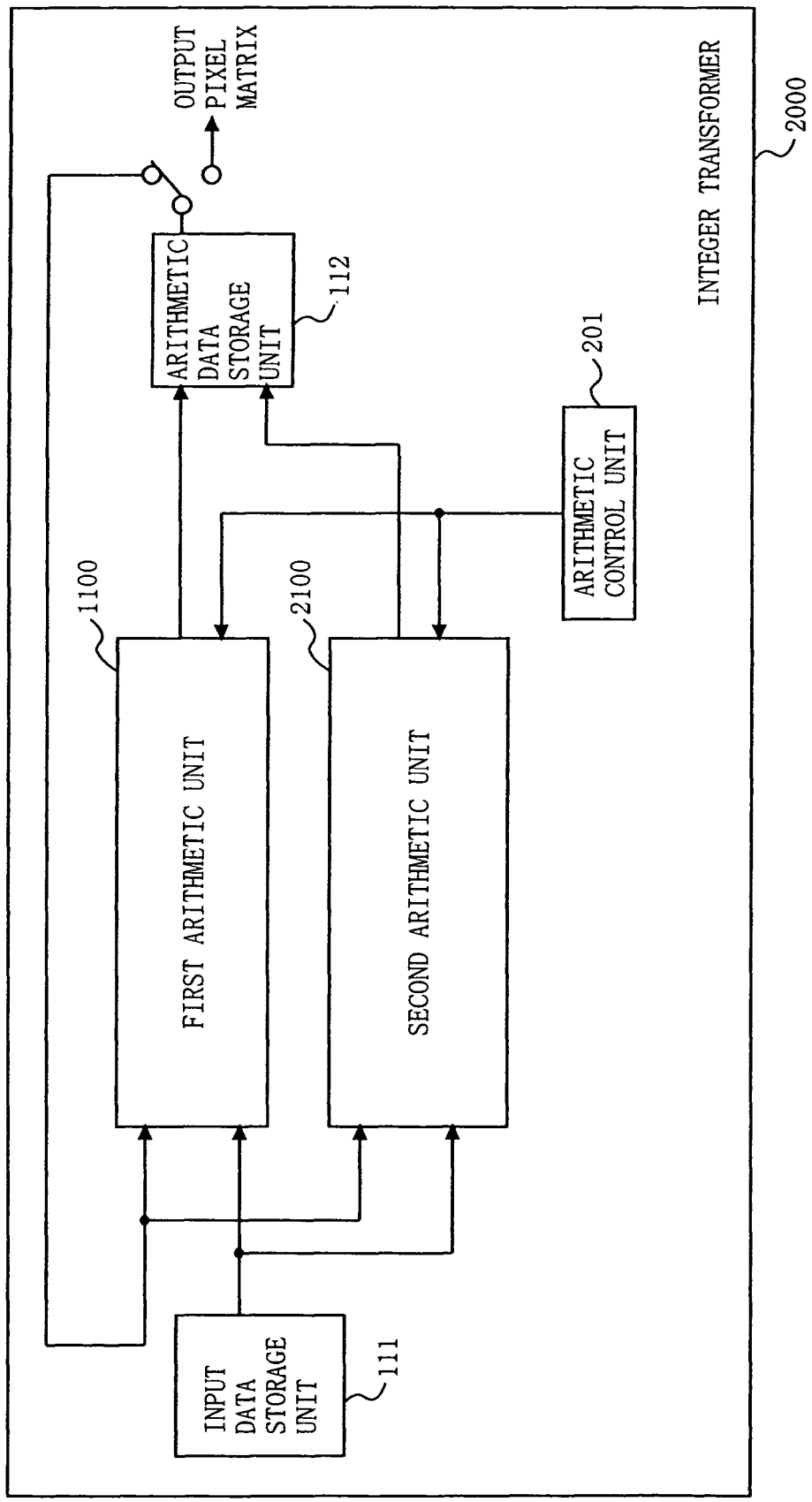
FIG. 11 is a block diagram illustrating the configuration of an integer transformer 2000 according to a second embodiment of the present invention.

FIG. 11 is a block diagram illustrating the configuration of an integer transformer 2000 according to the second embodiment of the present invention. The integer transformer 2000 according to the second embodiment is applied to the integer transform unit 12 and the inverse integer transform unit 16 shown in FIG. 1, and the inverse integer transform unit 25 shown in FIG. 2. The integer transformer 2000 shown in FIG. 11 is also applied to elements for performing an integer transform or an inverse integer transform in image decoding devices and image encoding devices other than those shown in FIG. 1 and FIG. 2.

In FIG. 11, the integer transformer 2000 includes a first arithmetic unit 1100, a second arithmetic unit 2100, an input data storage unit 111, an arithmetic data storage unit 112, and an arithmetic control unit 201. In FIG. 11, elements having functions similar to those in the first embodiment are denoted by the same reference characters, and the description thereof will be omitted.

Figure 12:
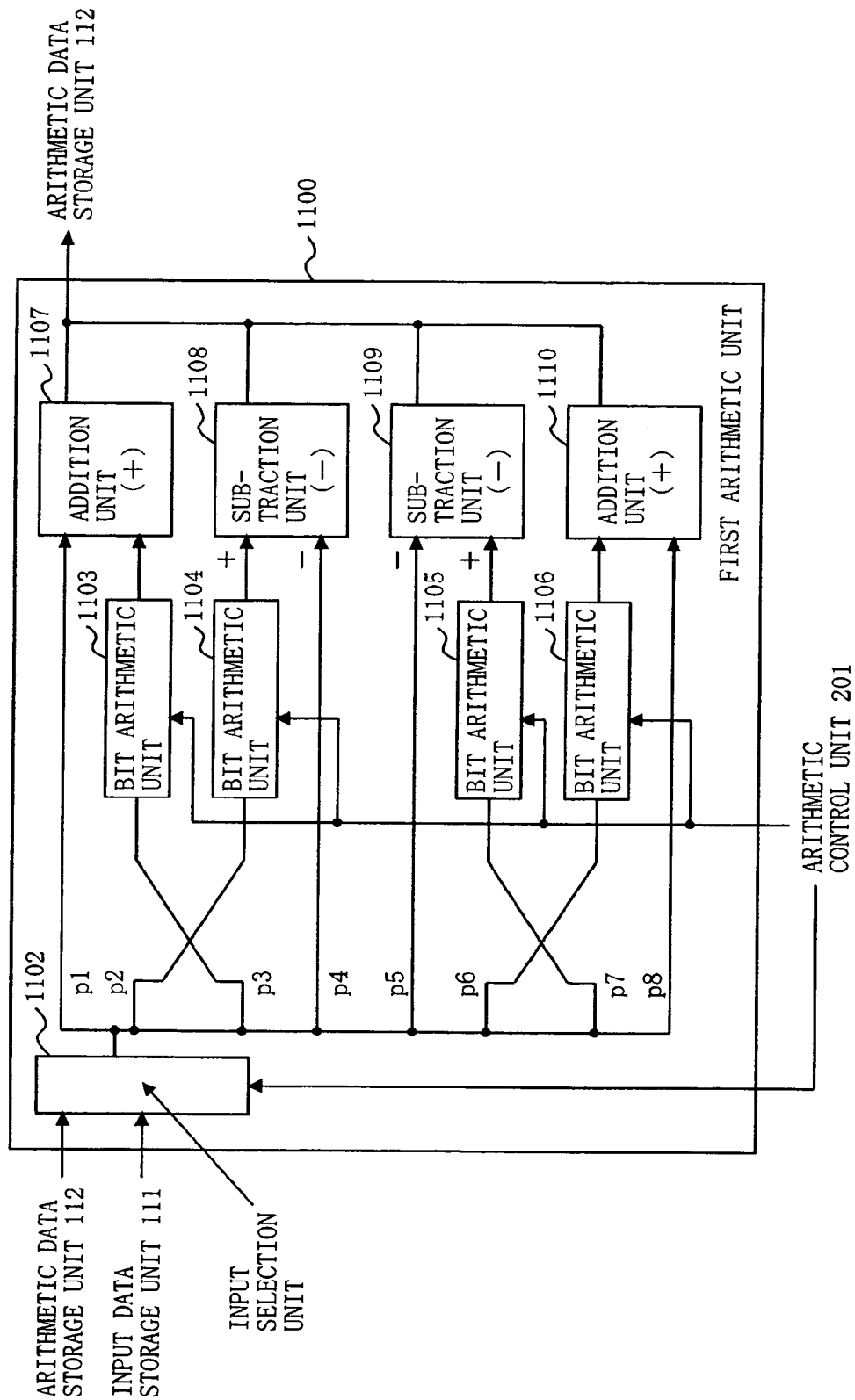
FIG. 12 is a block diagram illustrating the configuration of a first arithmetic unit 1100.

FIG. 12 is a block diagram illustrating the configuration of the first arithmetic unit 1100. In FIG. 12, the first arithmetic unit 1100 includes an input selection unit 1102, bit arithmetic units 1103, 1104, 1105 and 1106, addition units 1107 and 1110, and subtraction units 1108 and 1109. The internal configuration of the first arithmetic unit 1100 is similar to that of the arithmetic unit 100 described in the first embodiment, and therefore the description thereof will be omitted.

Figure 13:
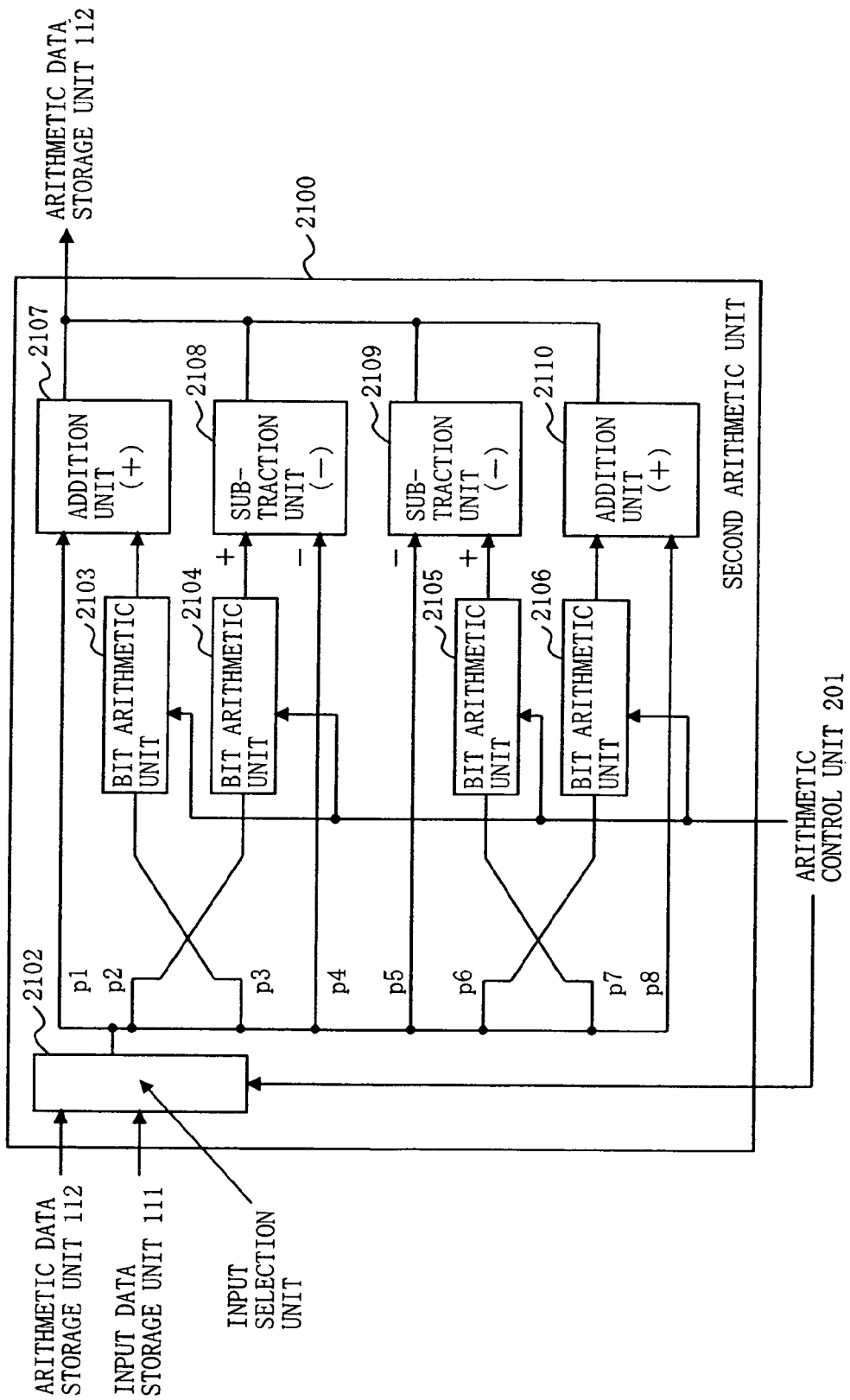
FIG. 13 is a block diagram illustrating the configuration of a second arithmetic unit 2100.

FIG. 13 is a block diagram illustrating the configuration of the second arithmetic unit 2100. In FIG. 13, the first arithmetic unit 2100 includes an input selection unit 2102, bit arithmetic units 2103, 2104, 2105 and 2106, addition units 2107 and 2110, and subtraction units 2108 and 2109. The internal configuration of the second arithmetic unit 2100 is similar to that of the arithmetic unit 100 described in the first embodiment, and therefore the description thereof will be omitted.

The arithmetic control unit 201 outputs a first input selection instruction signal including an instruction indicating that the input selection unit 1102 in the first arithmetic unit 1100 reads data from the input data storage unit 111 or from the arithmetic data storage unit 112 in the row direction or the column direction, and an instruction indicating the current number of arithmetic operations. In addition, the arithmetic control unit 201 determines the bit shift amount for the bit arithmetic units 1103, 1104, 1105 and 1106 in accordance with a transform mode (4×4 Hadamard transform, 2×2 Hadamard transform, 4×4 inverse integer transform, 8×8 inverse integer transform, 4×4 integer transform or 8×8 integer transform) and the number of arithmetic operations, and outputs the determined bit shift amount to the bit arithmetic units 1103, 1104, 1105 and 1106 as a first bit shift instruction signal.

Similarly, the arithmetic control unit 201 outputs a second input selection instruction signal including an instruction indicating that the input selection unit 2102 in the second arithmetic unit 2100 reads data from the input data storage unit 111 or from the arithmetic data storage unit 112 in the row direction or the column direction, and an instruction indicating the current number of arithmetic operations. In addition, the arithmetic control unit 201 determines the bit shift amount for the bit arithmetic units 2103, 2104, 2105 and 2106 in accordance with a transform mode (4×4 Hadamard transform, 2×2 Hadamard transform, 4×4 inverse integer transform, 8×8 inverse integer transform, 4×4 integer transform or 8×8 integer transform) and the number of arithmetic operations, and outputs the determined bit shift amount to the bit arithmetic units 2103, 2104, 2105 and 2106 as a second bit shift instruction signal.

In the case of the 4×4 Hadamard transform, the 2×2 Hadamard transform, the 4×4 inverse integer transform, and the 4×4 integer transform, the arithmetic control unit 201 outputs the first input selection instruction signal and the first bit shift instruction signal such that transform processing is performed using the first arithmetic unit 1100. In this case, the operation of the integer transformer 2000 is the same as that of the integer transformer 1000 according to the first embodiment, except that the second arithmetic unit 2100 is not used, and therefore the description thereof will be omitted.

In the case of the 8×8 inverse integer transform and the 8×8 integer transform, the arithmetic control unit 201 uses the first and second arithmetic units 1100 and 2100 to enhance the speed of transform processing.

(The Operation in the Case of the 8×8 Inverse Integer Transform)

FIG. 15 is a table showing arithmetic expressions for the first arithmetic unit 1100 and the second arithmetic unit 2100 in association with the number of arithmetic operations. The relationship as shown in FIG. 15 is defined in the arithmetic control unit 201. The definition method is not limited to the table format as in FIG. 15, and is not particularly restrictive.

Processing numbers shown in FIG. 15 are associated with the number of arithmetic operations shown in FIG. 7 so as to correspond to the same arithmetic expressions. For example, processing number 3 in FIG. 15 is associated with the number of arithmetic operations for the third round in FIG. 7. In the arithmetic operations shown in FIG. 15, the first and second arithmetic units 1100 and 2100 read data required for arithmetic operations corresponding to the processing numbers from the input data storage unit 111 or the arithmetic data storage unit 112, and execute similar arithmetic operations.

Figure 16:
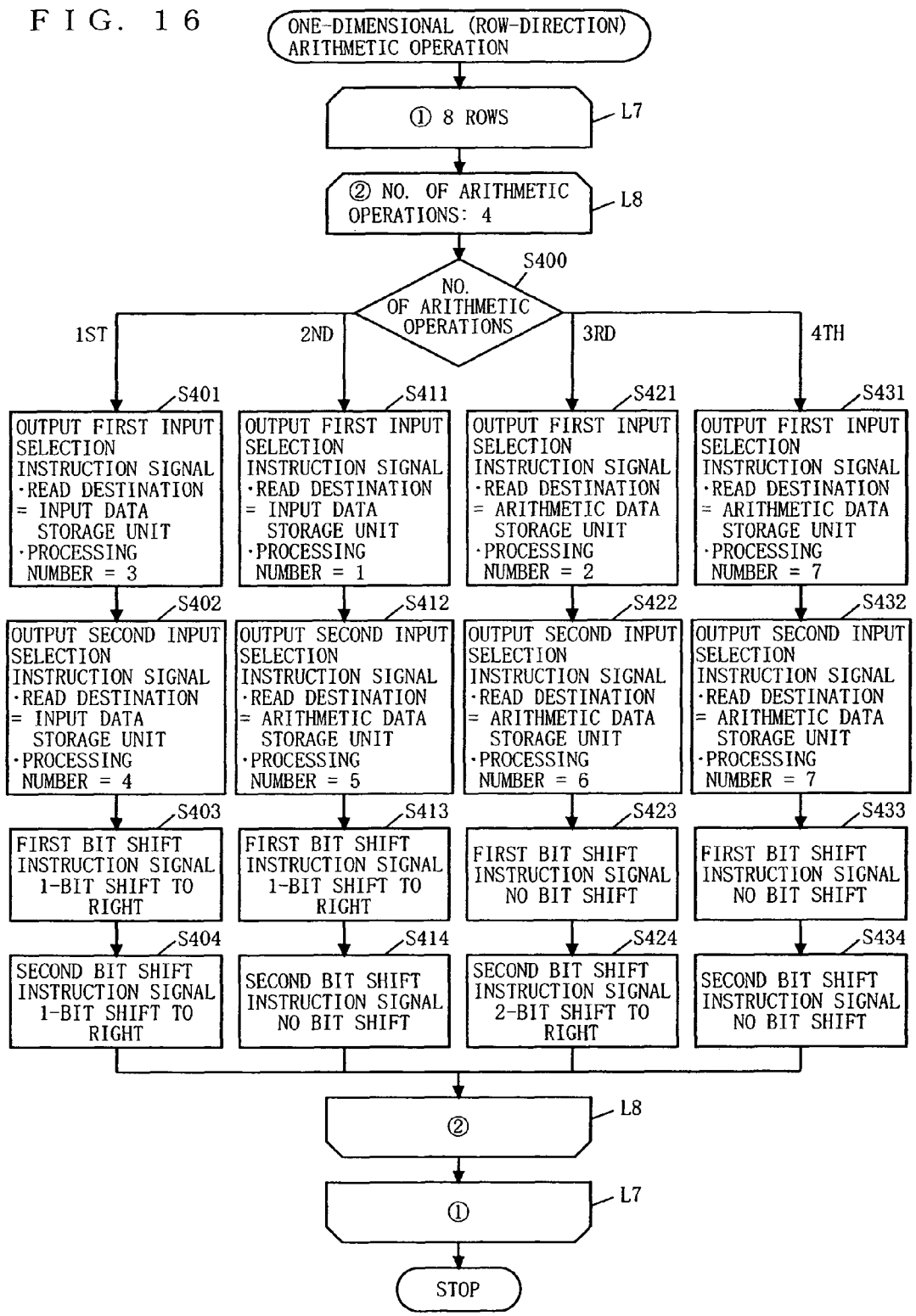
FIG. 16 is a flowchart illustrating the operation by an arithmetic control unit 201 for executing row-direction arithmetic operations for an 8×8 inverse integer transform.

FIG. 16 is a flowchart illustrating the operation by the arithmetic control unit 201 for executing row-direction arithmetic operations for an 8×8 inverse integer transform. Hereinbelow, the operation by the arithmetic control unit 201 for executing row-direction arithmetic operations for an 8×8 inverse integer transform is described with reference to FIG. 16.

In FIG. 16, loop L7 is a loop whose termination condition is when arithmetic operations in the loop L7 are completed for all rows (eight rows) of inputted 8×8 pixel data. Loop L8 is a loop whose termination condition is when the number of row-direction arithmetic operations shown in FIG. 16 has reached four. Hereinafter, the inputted 8×8 pixel data is referred to as the "inputted pixel matrix".

In the first-round row-direction arithmetic operation for the inputted pixel matrix (loop L8=1st, step S400=1st), the arithmetic control unit 201 outputs a first input selection instruction signal, which is inputted to the first arithmetic unit 1100 (step S401), and a second input selection instruction signal, which is inputted to the second arithmetic unit 2100 (step S402). The first input selection instruction signal includes an instruction to read pieces of input pixel data in[1], in[3], in[5] and in[7] from the input data storage unit 111, and a notification that the processing number is three. The second input selection instruction signal includes an instruction to read pieces of input pixel data in[1], in[3], in[5] and in[7] from the input data storage unit 111, and a notification that the processing number is four.

In response to the first and second input selection instruction signals, the input selection units 1102 and 2102 operate in a similar manner to the third- and fourth-round arithmetic operations of the input selection unit 102 in the first embodiment.

Then, the arithmetic control unit 201 outputs a first bit shift instruction signal (step S403), and a second bit shift instruction signal (step S404). The first bit shift instruction signal includes an instruction for the bit arithmetic units 1105 and 1106 to perform a 1-bit shift to the right. The second bit shift instruction signal includes an instruction for the bit arithmetic units 2105 and 2106 to perform a 1-bit shift to the right.

In response to the first and second bit shift instruction signals, the first and second arithmetic units 1100 and 2100 operate in a manner similar to the third- and fourth-round arithmetic operations of the arithmetic unit 100 in the first embodiment.

In the second-round row-direction arithmetic operation (loop L8=2nd, step S400=2nd), the arithmetic control unit 201 outputs a first input selection instruction signal, which is inputted to the first arithmetic unit 1100 (step S411), and a second input selection instruction signal, which is inputted to the second arithmetic unit 2100 (step S412). The first input selection instruction signal includes an instruction to read pieces of input pixel data in[0], in[2], in[4] and in[6] from the input data storage unit 111, and a notification that the processing number is one. The second input selection instruction signal includes an instruction to read a first-round row-direction arithmetic result stored in the arithmetic data storage unit 112, and a notification that the processing number is five.

In response to the first and second input selection instruction signals, the input selection units 1102 and 2102 operate in a similar manner to the first- and fifth-round arithmetic operations of the input selection unit 102 in the first embodiment.

Then, the arithmetic control unit 201 outputs a first bit shift instruction signal (step S413), and a second bit shift instruction signal (step S414). The first bit shift instruction signal includes an instruction for the bit arithmetic units 1105 and 1106 to perform a 1-bit shift to the right. The second bit shift instruction signal includes an instruction for the bit arithmetic units 2103, 2104, 2105 and 2106 not to perform a bit shift.

In response to the first and second bit shift instruction signals, the first and second arithmetic units 1100 and 2100 operate in a similar manner to the first- and fifth-round arithmetic operations of the arithmetic unit 100 in the first embodiment.

In the third-round row-direction arithmetic operation (loop L8=3rd, step S400=3rd), the arithmetic control unit 201 outputs a first input selection instruction signal, which is inputted to the first arithmetic unit 1100 (step S421), and a second input selection instruction signal, which is inputted to the second arithmetic unit 2100 (step S422). The first input selection instruction signal includes an instruction to read a second-round row-direction arithmetic result from the arithmetic data storage unit 112, and a notification that the processing number is two. The second input selection instruction signal includes an instruction to read the second-round row-direction arithmetic result from the arithmetic data storage unit 112, and a notification that the processing number is six.

In response to the first and second input selection instruction signals, the input selection units 1102 and 2102 operate in a similar manner to the second- and sixth-round arithmetic operations of the input selection unit 102 in the first embodiment.

Then, the arithmetic control unit 201 outputs a first bit shift instruction signal (step S423), and a second bit shift instruction signal (step S424). The first bit shift instruction signal includes an instruction for the bit arithmetic units 1103, 1104, 1105 and 1106 not to perform a bit shift. The second bit shift instruction signal includes an instruction for the bit arithmetic units 2103, 2104, 2105 and 2106 to perform a 2-bit shift to the right.

In response to the first and second bit shift instruction signals, the first and second arithmetic units 1100 and 2100 operate in a similar manner to the second- and sixth-round arithmetic operations of the arithmetic unit 100 in the first embodiment.

In the fourth-round row-direction arithmetic operation (loop L8=4th, step S400=4th), the arithmetic control unit 201 outputs a first input selection instruction signal, which is inputted to the first arithmetic unit 1100 (step S431), and a second input selection instruction signal, which is inputted to the second arithmetic unit 2100 (step S432). The first input selection instruction signal includes an instruction to read a third-round row-direction arithmetic result from the arithmetic data storage unit 112, and a notification that the processing number is seven. The second input selection instruction signal includes an instruction to read the third-round row-direction arithmetic result from the arithmetic data storage unit 112, and a notification that the processing number is eight.

In response to the first and second input selection instruction signals, the input selection units 1102 and 2102 operate in a similar manner to the seventh- and eighth-round arithmetic operations of the input selection unit 102 in the first embodiment.

Then, the arithmetic control unit 201 outputs a first bit shift instruction signal (step S433), and a second bit shift instruction signal (step S434). The first bit shift instruction signal includes an instruction for the bit arithmetic units 1103, 1104, 1105 and 1106 not to perform a bit shift. The second bit shift instruction signal includes an instruction for the bit arithmetic units 2103, 2104, 2105 and 2106 not to perform a bit shift.

In response to the first and second bit shift instruction signals, the first and second arithmetic units 1100 and 2100 operate in a similar manner to the seventh- and eighth-round arithmetic operations of the arithmetic unit 100 in the first embodiment.

The processing in the loop L8 is performed for the remaining seven rows. Thus, an 8×8 matrix row direction arithmetic result is obtained, and stored to the arithmetic data storage unit 112.

Then, in column-direction arithmetic operations for performing column-direction arithmetic operations on the obtained 8×8 matrix row direction arithmetic result, the integer transformer 2000 causes the first and second arithmetic units 1100 and 2100 to each perform four arithmetic operations shown in the loop L8 such that first and second arithmetic units 1100 and 2100 are each caused to perform four arithmetic operations shown in the loop L8 to obtain data for one column for each column of the 8×8 matrix row-direction arithmetic result, i.e., data for eight columns in total. The pixel data for eight columns obtained by the column-direction arithmetic operations is a final result obtained by the 8×8 inverse integer transform. Thus, the arithmetic data storage unit 112 outputs the pixel data for eight columns as an output pixel matrix.

As such, the integer transformer 2000 is able to perform the 8×8 inverse integer transform.

(The Operation in the Case of the 8×8 Integer Transform)

As in the above description of the 8×8 inverse integer transform in which the processing procedure in FIG. 7 is performed in the processing order in FIG. 15, by simultaneously performing operations in processing numbers (1,2), (4,5), (3,6) or (7,8) in FIG. 10A, it is made possible to realize the 8×8 integer transform using the circuit in FIG. 11.

Note that in the above embodiment, the first and second integer transformers 1100 and 2100 are connected in parallel to perform arithmetic operations in parallel, but the first and second integer transformers 1100 and 2100 may be connected in series to enhance the processing speed. Concretely, arithmetic units 100 as shown in FIG. 3 may be connected in series, and an arithmetic control unit may cause the input selection unit 102 in each arithmetic unit 100 to acquire necessary data, such that while the latter-stage arithmetic unit 100 is performing an arithmetic operation, the next arithmetic operation is executed by the former-stage arithmetic unit 100. For example, in arithmetic operations for the 4×4 inverse integer transform, the former-stage arithmetic unit 1100 is caused to perform the first-round calculation in FIG. 4, whereas the latter-stage arithmetic unit 2100 is caused to perform the second-round calculation and sequentially input row-direction data to the former-stage arithmetic unit 1100, thereby making it possible to sequentially obtain row-direction results from the latter-stage arithmetic unit 2100, and enhance the processing speed more than in the first embodiment.

Figure 14:
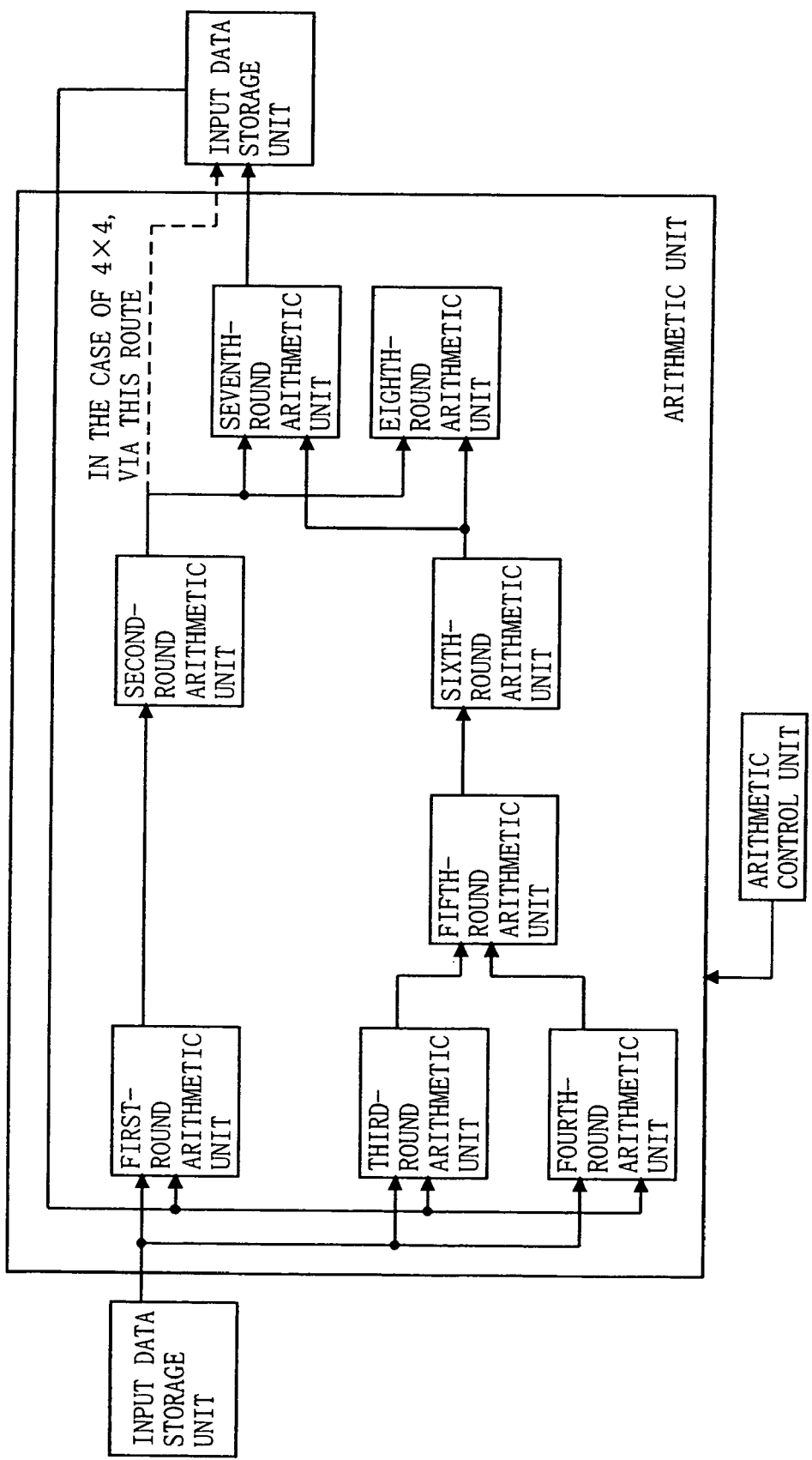
FIG. 14 is a block diagram illustrating a configuration of an arithmetic unit in which arithmetic units are connected in series and/or in parallel to implement an 8×8 integer transform.

Note that the present invention is not limited to the case where there are two integer transformers, and three or more plural transformers may be used. Even in the case of three or more plural integer transformers, transform processing can be correctly executed so long as the transformers are connected in parallel or in series and the arithmetic control unit controls data that is to be inputted and the bit shift amount. For example, by configuring arithmetic units as shown in FIG. 14, it is made possible that each arithmetic unit as shown in FIG. 14 executes an arithmetic operation corresponding to the number of arithmetic operations in FIG. 7. Thus, it is possible to enhance the processing speed for the 8×8 inverse integer transform. Note that in the 4×4 inverse transform and the like, only the first- and second-round arithmetic units may be used to perform outputting to the input data storage unit via the broken-line path.

Note that in the above embodiment, the arithmetic units are connected in parallel or in series to perform the 8×8 inverse integer transform and the 8×8 integer transform by pipeline processing, but the pipeline processing may also be executed for the 4×4 inverse integer transform, the 4×4 integer transform, the 4×4 Hadamard transform, and the 2×2 Hadamard transform by connecting the arithmetic units in parallel or in series. Concretely, a different arithmetic unit may be used for each arithmetic expression to enhance the processing speed.

While in the above embodiment, a different arithmetic unit is used for each arithmetic expression to enhance the speed of the 8×8 inverse integer transform, the 8×8 integer transform, the 4×4 inverse integer transform, the 4×4 integer transform, the 4×4 Hadamard transform, and the 2×2 Hadamard transform, a different arithmetic unit may be used for each pixel to enhance the processing speed.

According to the second embodiment, the arithmetic control unit 201 previously defines, in association with the number of arithmetic operations, which arithmetic unit among a plurality of arithmetic units receives necessary pixel data and executes a necessary arithmetic operation, and uses the arithmetic units in parallel or in series. As such, by using the fundamental arithmetic units in parallel or series connection, it is made possible to perform the pipeline processing with a simple configuration, and therefore it is possible to provide an image encoding device and an image decoding device with enhanced processing speed.

Third Embodiment

A third embodiment will be described with respect to a image encoding device and a image decoding device, which are small-sized, but capable of dealing with the DCT, the inverse DCT, the 4×4 integer transform, the 4×4 inverse integer transform, the 8×8 integer transform, the 8×8 inverse integer transform, the 4×4 Hadamard transform, the 2×2 Hadamard transform, and unknown transform methods that will be introduced anew.

Figure 17:
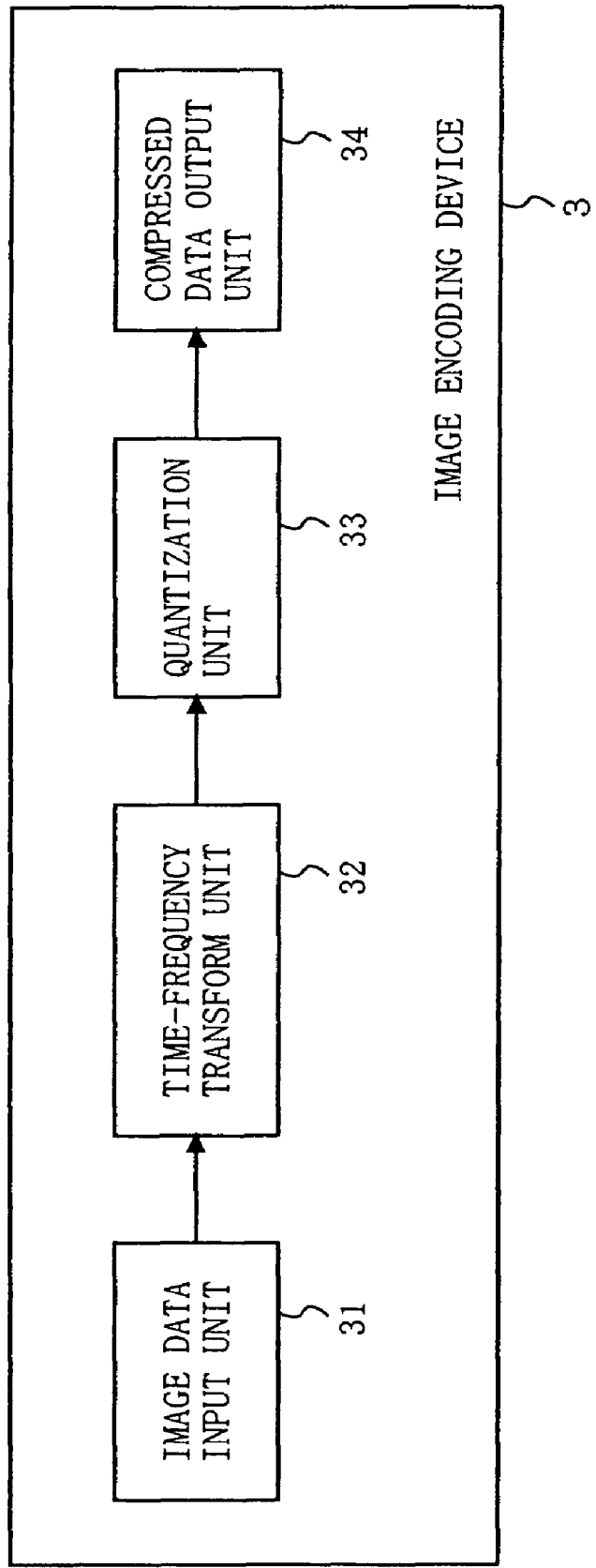
FIG. 17 is a block diagram illustrating a schematic configuration of an image encoding device 3.

Schematic configurations of the image encoding device and the image decoding device are described first. FIG. 17 is a block diagram illustrating a schematic configuration of an image encoding device 3. FIG. 17 shows only features for performing compression by transforming a time domain to a frequency domain, and features for compression by motion compensation prediction or the like are omitted. In FIG. 17, the image encoding device 3 includes an image data input unit 31, a time-frequency transform unit 32, a quantization unit 33, and a compressed data output unit 34. The image input unit 31 inputs time-domain image data to the time-frequency transform unit 32. The time-frequency transform unit 32 transforms the time-domain image data to frequency-domain image data. The time-frequency transform unit 32 uses the DCT, the 4×4 integer transform, the 8×8 integer transform, the 4×4 Hadamard transform, the 2×2 Hadamard transform or an unknown transform method that will be introduced anew to execute the transform from the time domain to the frequency domain. The quantization unit 33 quantizes the frequency-domain image data by subjecting it to variable-length encoding, thereby compressing the original image data. The compressed data output unit 34 outputs or stores the compressed image data.

Figure 18:
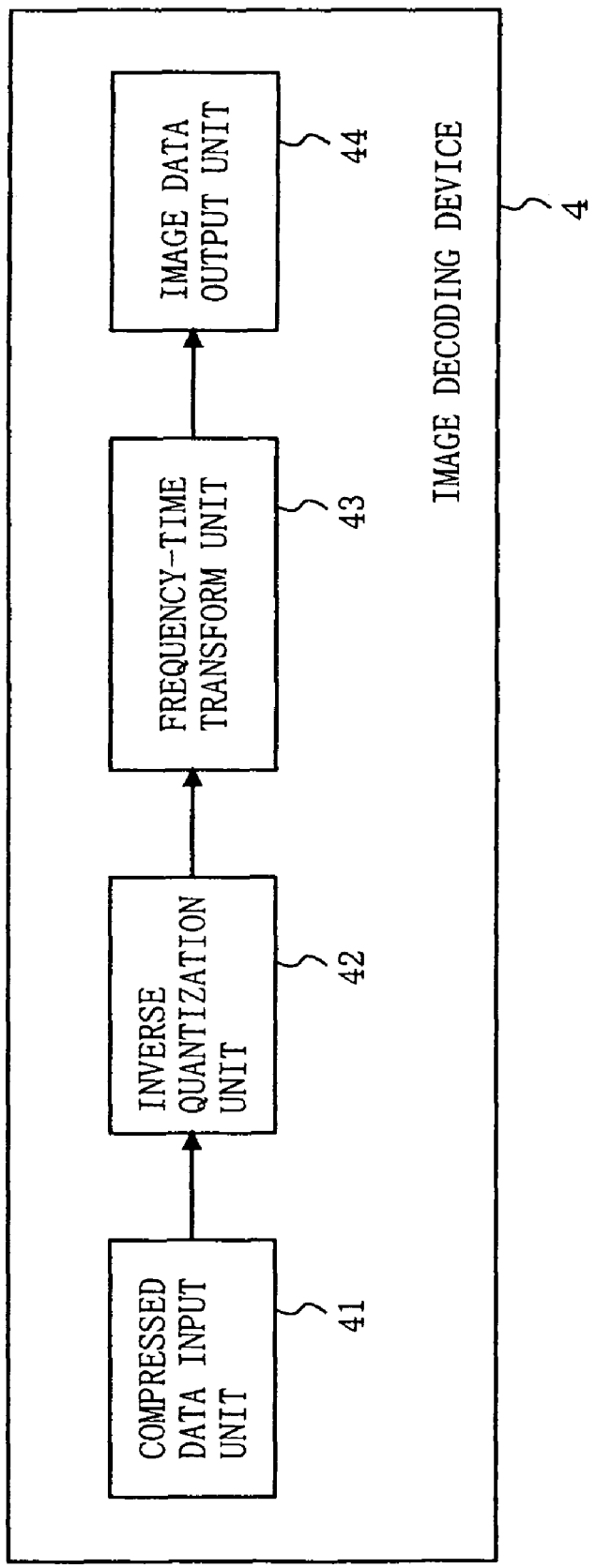
FIG. 18 is a block diagram illustrating a schematic configuration of an image decoding device 4.

FIG. 18 is a block diagram illustrating a schematic configuration of an image decoding device 4. FIG. 18 shows only features for decoding by transforming a frequency domain to a time domain, and features for decoding by motion compensation prediction or the like are omitted. In FIG. 18, the image decoding device 4 includes a compressed data input unit 41, an inverse quantization unit 42, a frequency-time transform unit 43, and an image data output unit 44. The compressed data input unit 41 inputs compressed image data to the inverse quantization unit 42. The inverse quantization unit 42 inversely quantizes the image data to effect variable-length decoding, thereby obtaining frequency-domain image data. The frequency-time transform unit 43 transforms the frequency-domain image data to time-domain image data. The frequency-time transform unit 43 uses the inverse DCT, the 4×4 inverse integer transform, the 8×8 inverse integer transform, the 4×4 Hadamard transform, the 2×2 Hadamard transform or an unknown transform method that will be introduced anew to execute the transform from the frequency domain to the time domain. The image data output unit 44 outputs or stores the time-domain image data obtained by the frequency-time transform unit 43.

The time-frequency transform unit 32 and the frequency-time transform unit 43 are capable of executing the DCT, the inverse DCT, the 4×4 integer transform, the 4×4 inverse integer transform, the 8×8 integer transform, the 8×8 inverse integer transform, the 4×4 Hadamard transform, the 2×2 Hadamard transform, and novel transform methods that will be introduced anew. The time-frequency transform unit 32 and the frequency-time transform unit 43 can be implemented with common elements. Hereinafter, the time-frequency transform unit 32 and the frequency-time transform unit 43 are simply referred to as "transformers 3000".

Figure 19:
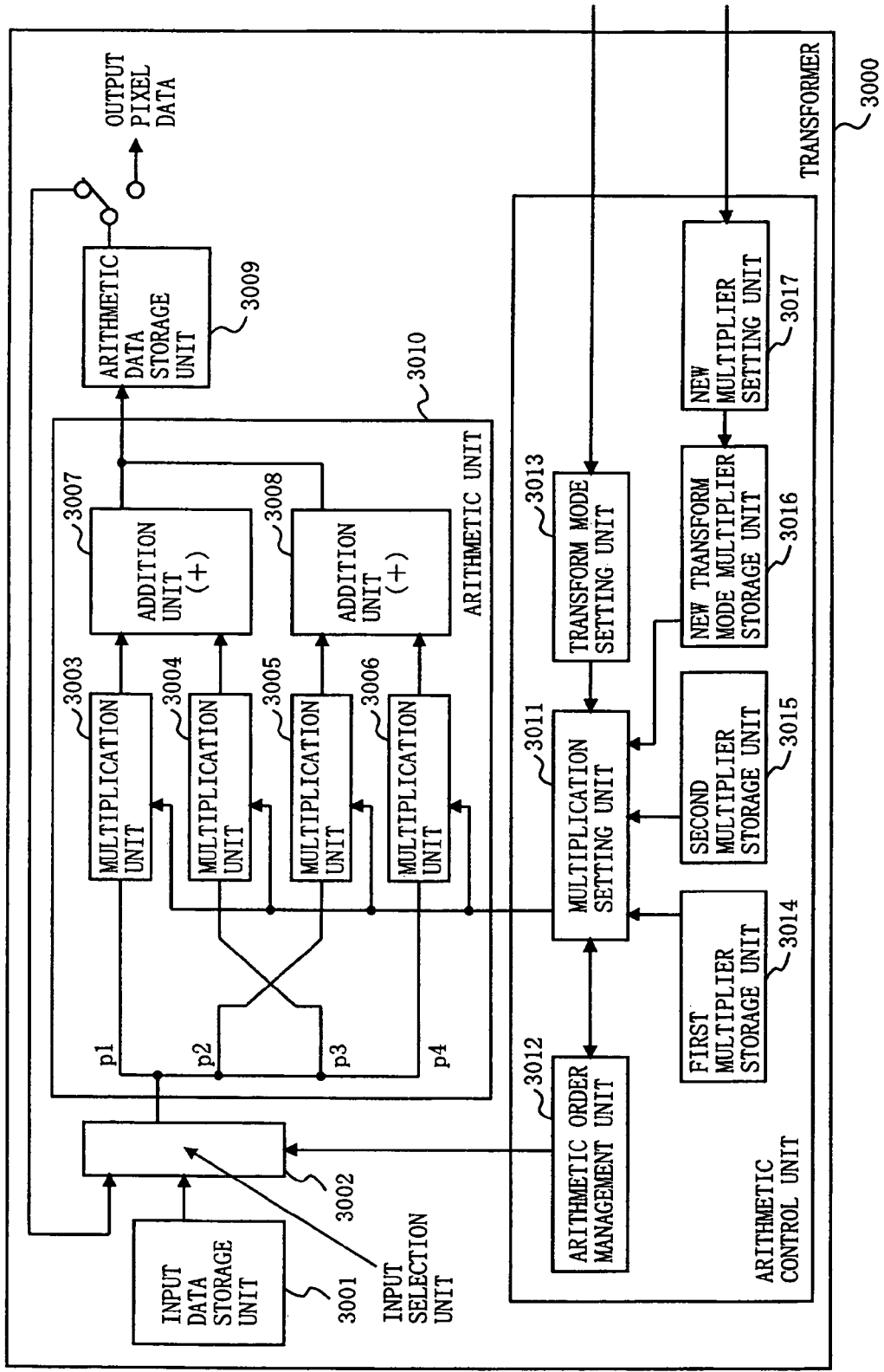
FIG. 19 is a block diagram illustrating the configuration of a transformer 3000.

FIG. 19 is a block diagram illustrating the configuration of the transformer 3000. In FIG. 19, the transformer 3000 includes an input data storage unit 3001, an input selection unit 3002, an arithmetic unit 3010, an arithmetic data storage unit 3009, a multiplier setting unit 3011, an arithmetic order management unit 3012, a transform mode setting unit 3013, a first multiplier storage unit 3014, a second multiplier storage unit 3015, a new transform mode multiplier storage unit 3016, and a new multiplier setting unit 3017. The arithmetic unit 3010 has multiplication units 3003, 3004, 3005 and 3006, and addition units 3007 and 3008. The multiplier unit 3011, the arithmetic order management unit 3012, the transform mode setting unit 3013, the first multiplier storage unit 3014, the second multiplier storage unit 3015, the new transform mode multiplier storage unit 3016, and the new multiplier setting unit 3017 compose an arithmetic control unit.

Transform methods available in the third embodiment are the DCT, the inverse DCT, the 4×4 integer transform, the 4×4 inverse integer transform, the 8×8 integer transform, the 8×8 inverse integer transform, the 4×4 Hadamard transform, the 2×2 Hadamard transform, and novel transform methods that will be introduced anew. A novel transform mode is set in the transform mode setting unit 3013 by an unillustrated processor.

The input data storage unit 3001 is a memory for storing data targeted for transformation. The arithmetic data storage unit 3009 is a memory for storing post-arithmetic data outputted from the arithmetic unit 3010.

The arithmetic order management unit 3012 manages the number of arithmetic operations for the transform in accordance with the transform mode managed by the transform mode setting unit 3013, and notifies the current number of arithmetic operations to the input selection unit 3002. In response to the notification from the arithmetic order management unit 3012, the input selection unit 3002 reads necessary data from the input data storage unit 3001 or the arithmetic data storage unit 3009, and inputs the read data to any suitable terminal among the terminals p1 to p4. Which data the input selection unit 3002 reads from the input data storage unit 3001 and which data input selection unit 3002 reads from the arithmetic data storage unit 3009 are previously determined in accordance with the transform method and the number of arithmetic operations.

The first multiplier storage unit 3014 has stored therein multipliers (multiplier coefficients) required for the DCT and the inverse DCT. Note that in the image encoding device 3, the first multiplier storage unit 3014 may have only multipliers for the DCT stored therein. Also, in the image decoding device 4, the first multiplier storage unit 3014 may have only multipliers for the inverse DCT stored therein.

The second multiplier storage unit 3014 have stored therein multipliers for transformation in H.264, i.e., multipliers required for the 4×4 integer transform, the 4×4 inverse integer transform, the 8×8 integer transform, the 8×8 inverse integer transform, the 4×4 Hadamard transform, and the 2×2 Hadamard transform. Note that in the image encoding device 3, the first multiplier storage unit 3014 may have stored therein only multipliers for the 4×4 integer transform, the 8×8 integer transform, the 4×4 Hadamard transform, and the 2×2 Hadamard transform. Also, in the image decoding device 4, the first multiplier storage unit 3014 may shave stored therein only multipliers for the 4×4 inverse integer transform, the 8×8 inverse integer transform, the 4×4 Hadamard transform, and the 2×2 Hadamard transform.

When it becomes necessary to introduce a new transform mode, the new multiplier setting unit 3017 can set a multiplier for use in the new transform mode in association with the number of arithmetic operations. The new transform mode multiplier storage unit 3016 is a memory for storing the new multiplier set by an unillustrated processor or the like via the new multiplier setting unit 3017.

The multiplier setting unit 3011 prestores multipliers that are to be used in the multiplication units 3003 to 3006 in association with the number of arithmetic operations. The multiplier setting unit 3011 reads a necessary multiplier from any of the first to third multiplier storage units 3014, 3015 and 3016 in accordance with the current transform mode managed by the transform mode setting unit 3013 and the number of arithmetic operations managed by the arithmetic order management unit 3012. The multiplier setting unit 3011 inputs the read multiplier to a proper multiplication unit 3003 to 3006.

In the arithmetic unit 3010, the multiplication units 3003 to 3006 output data inputted to the terminals p1 to p4 after multiplying it by the multiplier from the multiplier setting unit 3011. The addition unit 3007 adds data outputted from the multiplication unit 3003 and data outputted from the multiplication unit 3004, and outputs it. The addition unit 3008 adds data outputted from the multiplication unit 3005 and data outputted from the multiplication unit 3006, and outputs it. The data outputted from the addition units 3007 and 3008 is stored to the arithmetic data storage unit 3009. When all row- and column-direction arithmetic operations are completed, the arithmetic data storage unit 3009 outputs an arithmetic result as output pixel data.

Described next is the reason why the configuration of the arithmetic unit 3010 makes it possible to calculate all of the DCT, the inverse DCT, the 4×4 integer transform, the 4×4 inverse integer transform, the 8×8 integer transform, the 8×8 inverse integer transform, the 4×4 Hadamard transform, and the 2×2 Hadamard transform.

Figure 20:
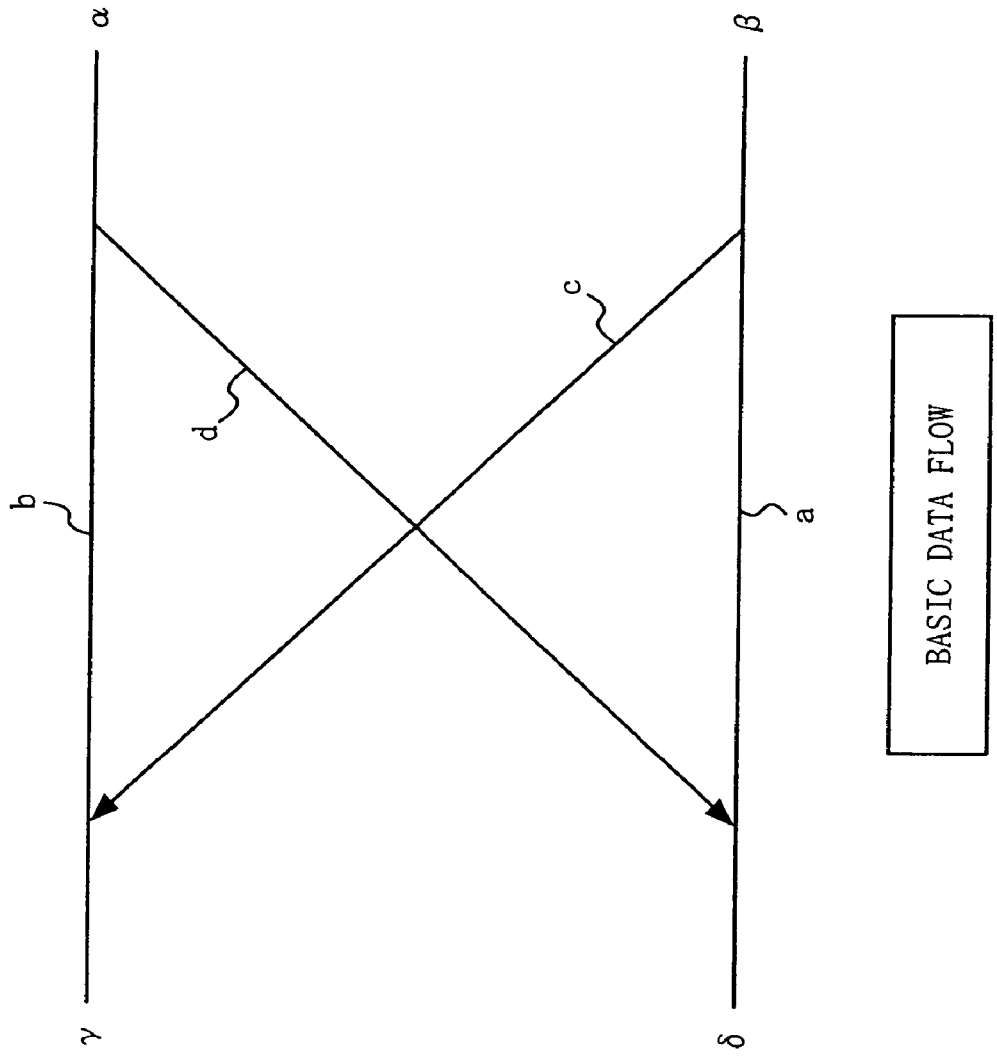
FIG. 20 is a data flow representation for explaining arithmetic flows in the arithmetic unit 3010.

FIG. 20 is a data flow representation for explaining arithmetic flows in the arithmetic unit 3010. First, how to view FIG. 20 is described. In FIG. 20, $\alpha$ and $\beta$ on the right represent inputs, and $\gamma$ and $\delta$ on the left represent outputs. Multipliers are denoted by a, b, c and d on lines. The data flow shown in FIG. 20 results in $\gamma = b \times \alpha + c \times \beta$ and $\delta = d \times \alpha + a \times \beta$. In the arithmetic unit 3010, when an input to the terminal p1 is taken as $\alpha$, an input to the terminal p3 is taken as $\beta$, a multiplier in the multiplication unit 3003 is taken as d, and a multiplier in the multiplication unit 3004 is taken as a, the value outputted from the addition unit 3007 is $\delta = d \times \alpha + a \times \beta$. In addition, in the arithmetic unit 3010, when an input to the terminal p2 is taken as $\alpha$, an input to the terminal p4 is taken as $\beta$, a multiplier in the multiplication unit 3005 is taken as b, and a multiplier in the multiplication unit 3006 is taken as c, the value outputted from the addition unit 3008 is $\gamma = b \times \alpha + c \times \beta$. Therefore, it can be said that the basic data flow shown in FIG. 20 represents a data flow obtained through arithmetic operations by the arithmetic unit 3010.

As such, the arithmetic unit 3010 is able to execute arithmetic processing that makes it possible to implement a two-input/two-output data flow as shown in FIG. 20. The arithmetic processing that makes it possible to implement the two-input/two-output data flow is referred to as a "basic unit of arithmetic processing".

If a transform mode that is desired to be handled by the transformer 3000 can be realized by repeating arithmetic operations by the basic data flow shown in FIG. 20, it is possible to allow the transformer 3000 to execute all of the DCT, the inverse DCT, the 4×4 integer transform, the 4×4 inverse integer transform, the 8×8 integer transform, the 8×8 inverse integer transform, the 4×4 Hadamard transform, and the 2×2 Hadamard transform. Therefore, the arithmetic control unit defines the arithmetic procedure for each transform mode by dividing it into basic units of arithmetic processing for each number of arithmetic operations to cause the arithmetic unit 3010 to repeat the basic units of arithmetic processing, thereby making it possible to execute each transform.

Therefore, the present inventors have obtained data flows for repeating basic units of arithmetic operations by manipulating arithmetic expressions for each of the DCT, the inverse DCT, the 4×4 integer transform, the 4×4 inverse integer transform, the 8×8 integer transform, the 8×8 inverse integer transform, the 4×4 Hadamard transform, and the 2×2 Hadamard transform (see FIG. 21 to FIG. 27).

Figure 21:
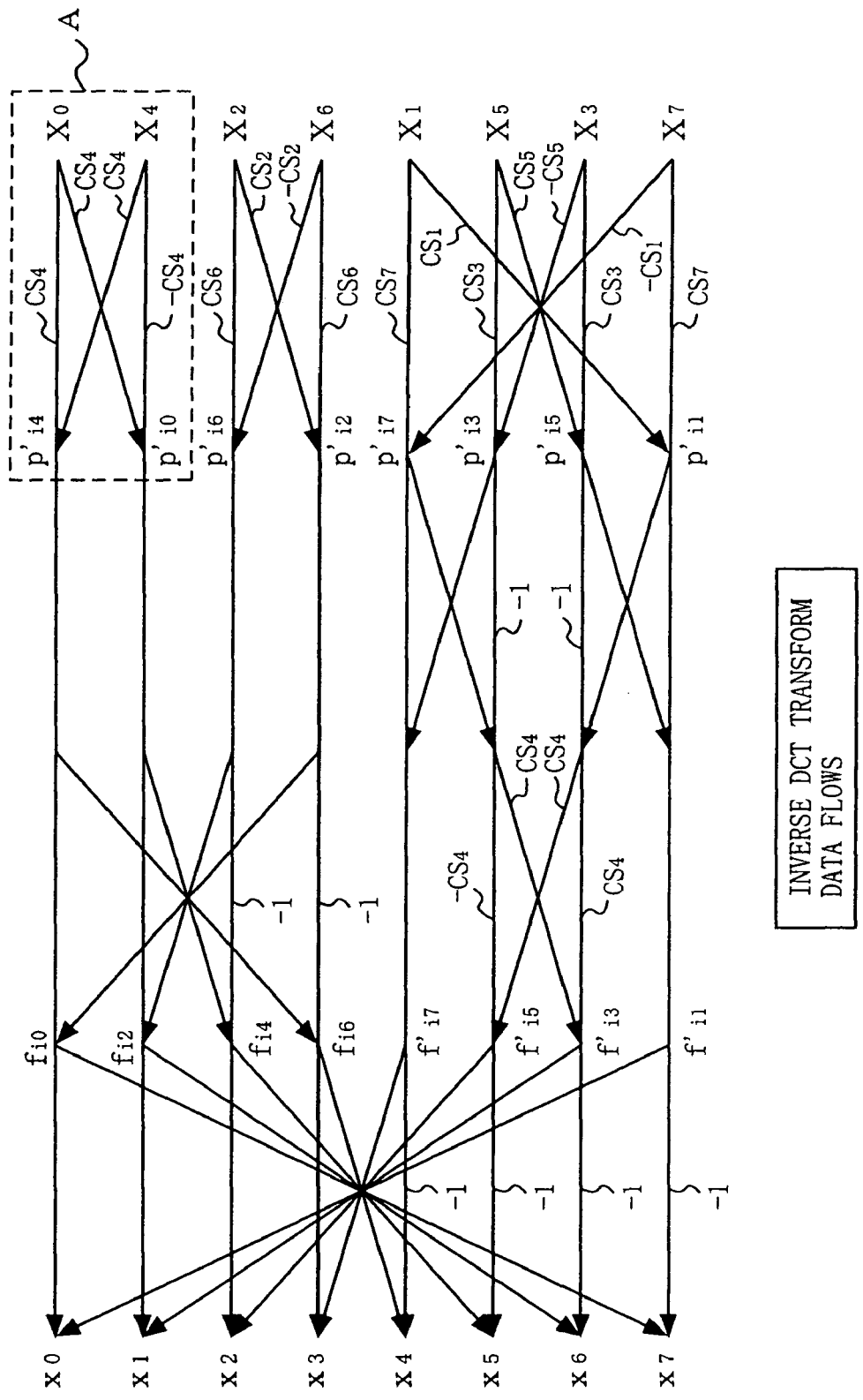
FIG. 21 is a diagram illustrating data flows for an inverse DCT transform.

FIG. 21 is a diagram illustrating data flows for the inverse DCT transform. The arithmetic flow in portion A enclosed in a dotted-line rectangle in FIG. 21 is described by way of example. In FIG. 21, $CS_k = \cos(k\pi/16)$. Input data $X_0$ is inputted to the terminals p1 and p2. Input data $X_4$ is inputted to the terminals p3 and p4. A multiplier for the multiplication unit 3003 is taken as $CS_4$. A multiplier for the multiplication unit 3004 is taken as $CS_4$. A multiplier for the multiplication unit 3005 is taken as $CS_4$. A multiplier for the multiplication unit 3006 is taken as $-CS_4$. Thus, $p'_{i4}$ is outputted from the addition unit 3007. $p'_{i0}$ is outputted from the addition unit 3008. All data flows shown in FIG. 21 are composed of combinations of basic unit data flows (hereinafter, referred to as the "basic data flows") such as portion A. Herein, execution of an arithmetic operation for the basic data flow is referred to as the "one arithmetic operation". Accordingly, when the current transform mode is set to the inverse DCT by the transform mode setting unit 3013, the multiplier setting unit 3011 inputs an associated multiplier for each number of arithmetic operations to the multiplication units 3003 to 3006 in accordance with the data flows shown in FIG. 21. The input selection unit 3002 reads necessary data from the input data storage unit 3001 or the arithmetic data storage unit 3009, and inputs it to the terminals p1 to p4 in association with the number of arithmetic operations.

For confirmation, how the transformer 3000 should input multipliers and data to the arithmetic unit 3010 will be described with reference to the data flows shown in FIG. 21. The designer of the transformer 3000 first selects one basic data flow for the data flows shown in FIG. 21. Then, in the selected basic data flow, data corresponding to a shown in FIG. 20 is determined to be inputted to the terminals p1 and p2. Data corresponding to β shown in FIG. 20 is determined to be inputted to the terminals p3 and p4. A multiplier corresponding to a shown in FIG. 20 is determined to be inputted to the multiplication unit 3006. A multiplier corresponding to b shown in FIG. 20 is determined to be inputted to the multiplication unit 3003. A multiplier corresponding to c shown in FIG. 20 is determined to be inputted to the multiplication unit 3004. A multiplier corresponding to d shown in FIG. 20 is determined to be inputted to the multiplication unit 3005. Such rules may be defined for each selected basic data flow (for each number of arithmetic operations) to design the input selection unit 3002, the arithmetic order management unit 3012, the multiplier setting unit 3011, and the first multiplier storage unit 3014. The transformer 3000 executes row- and column-direction arithmetic operations based on the data flows shown in FIG. 21, and outputs transformed pixel data.

The above-described method for designing the transformer 3000 is similarly applicable to other transform modes, and therefore as for the other transform modes, only data flows are shown.

Note that the DCT transform can be realized by directing data flow arrows for the inverse DCT transform to the opposite direction and considering the left and right sides as input and output stages, respectively, while leaving the multipliers unchanged. Therefore, the inverse DCT transform and the DCT transform may be stored as common multipliers in the first multiplier storage unit 3014.

Figure 22:
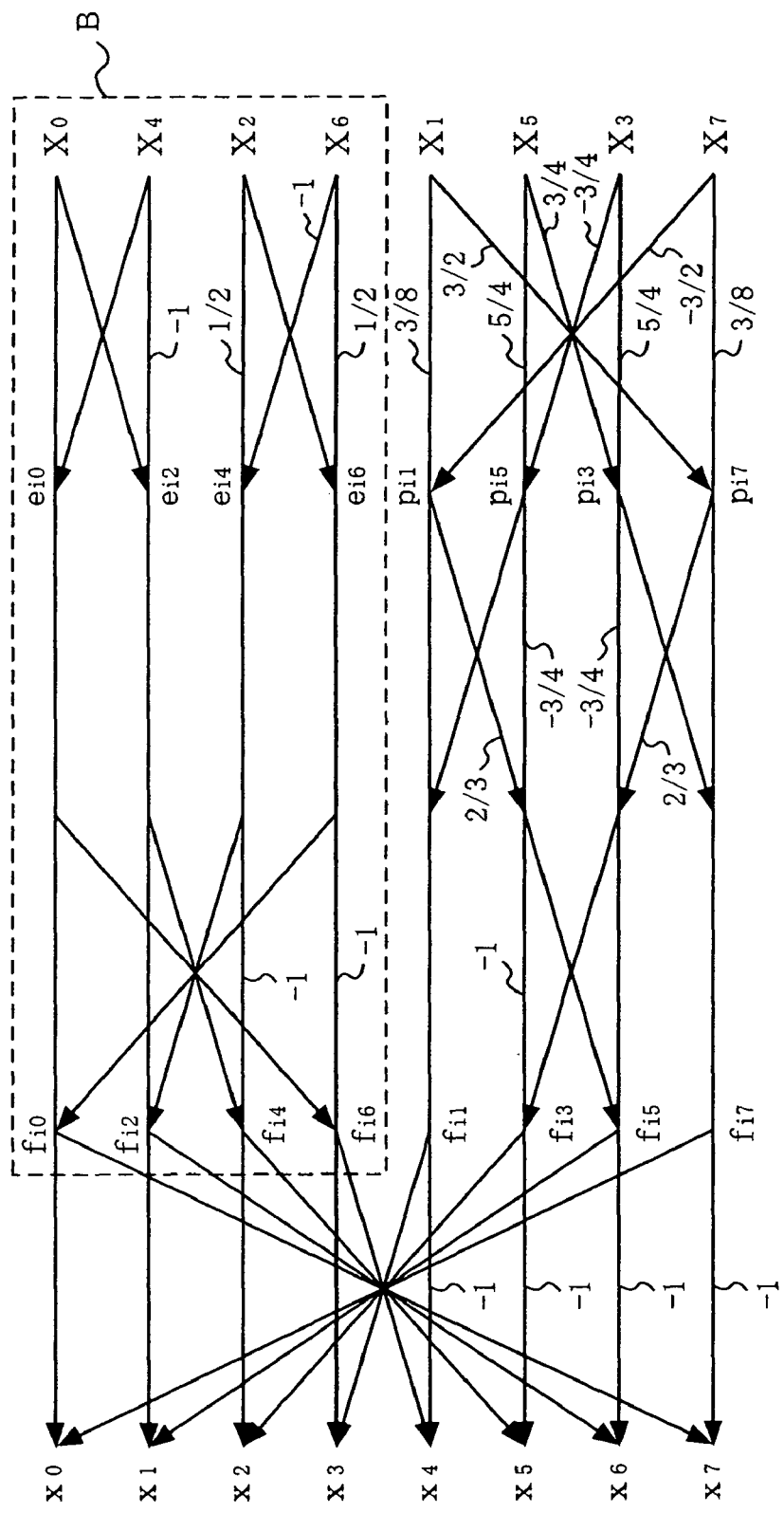
FIG. 22 is a diagram illustrating data flows for an 8×8 inverse integer transform.

FIG. 22 is a diagram illustrating data flows for the 8×8 inverse integer transform. As shown in FIG. 22, it is also possible to perform row-direction arithmetic operations for the 8×8 inverse integer transform by combining basic data flows. Similarly, it is possible to perform column-direction arithmetic operations. Therefore, the 8×8 inverse integer transform can also be calculated with the configuration of the arithmetic unit 3010 shown in FIG. 19. Multipliers required for the 8×8 inverse integer transform are stored in the second multiplier storage unit 3015. The data flows shown in FIG. 21 and the data flows shown in FIG. 22 are the same except for the multipliers, and therefore the inverse DCT transform and the 8×8 inverse integer transform can be calculated by similar procedures. Thus, the configuration of the transformer 3000 can be simplified.

Figure 23:
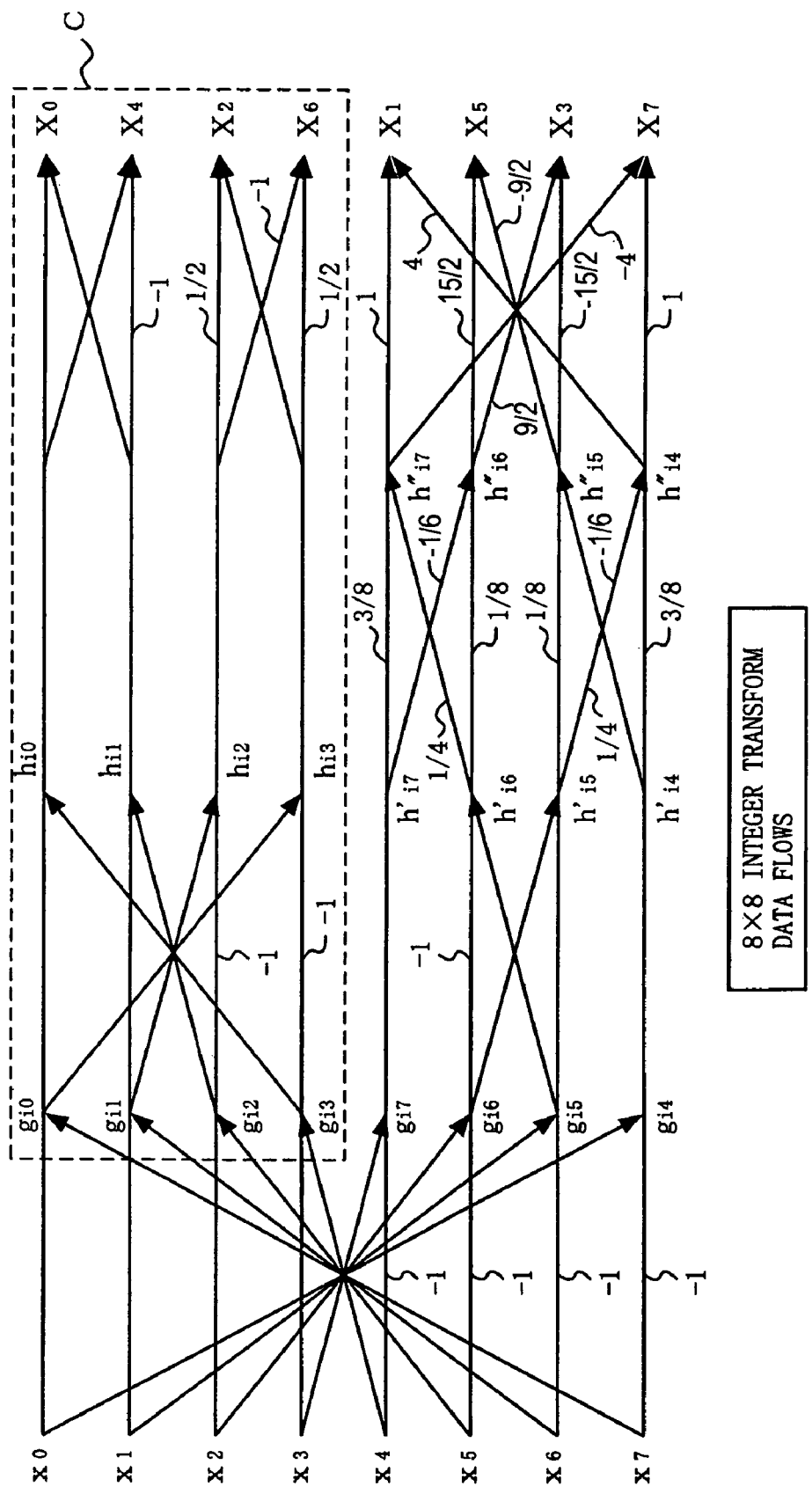
FIG. 23 is a diagram illustrating data flows for an 8×8 integer transform.

FIG. 23 is a diagram illustrating data flows for the 8×8 integer transform. As shown in FIG. 23, it is also possible to perform row-direction arithmetic operations for the 8×8 integer transform by combining basic data flows. Similarly, it is possible to perform column-direction arithmetic operations. Therefore, the 8×8 integer transform can also be calculated with the configuration of the arithmetic unit 3010 shown in FIG. 19. Multipliers required for the 8×8 integer transform are stored in the second multiplier storage unit 3015.

Figure 24:
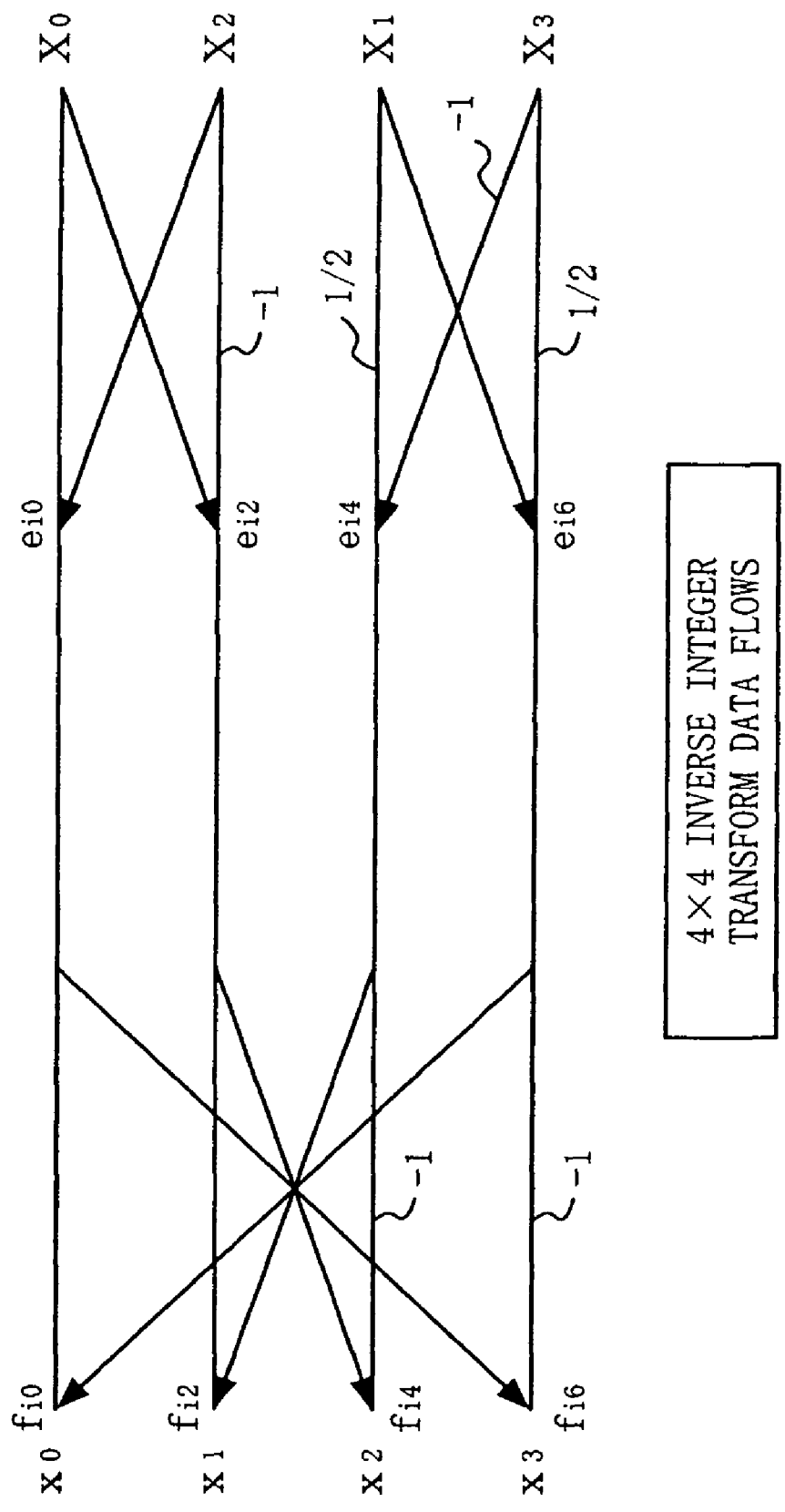
FIG. 24 is a diagram illustrating data flows for a 4×4 inverse integer transform.

FIG. 24 is a diagram illustrating data flows for the 4×4 inverse integer transform. As shown in FIG. 24, it is also possible to perform row-direction arithmetic operations for the 4×4 inverse integer transform by combining basic data flows. Similarly, it is possible to perform column-direction arithmetic operations. Therefore, the 4×4 inverse integer transform can also be calculated with the configuration of the arithmetic unit 3010 shown in FIG. 19. Multipliers required for the 4×4 inverse integer transform are stored in the second multiplier storage unit 3015. As can be seen by comparing FIG. 24 with FIG. 22, the calculation procedure for the area enclosed in dotted-line frame B is duplicated between them. Therefore, for the 4×4 inverse integer transform, the transformer 3000 may cease to operate in the middle of the calculation procedure for the 8×8 inverse integer transform.

Figure 25:
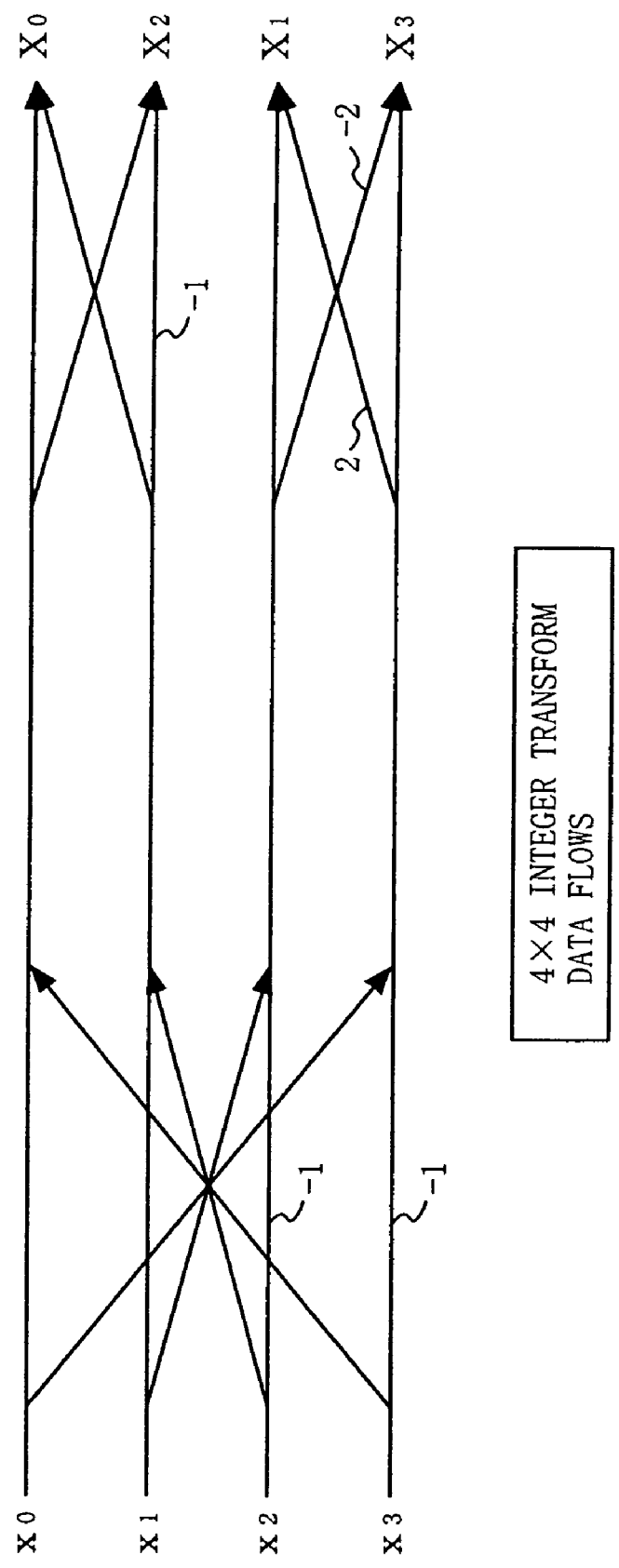
FIG. 25 is a diagram illustrating data flows for a 4×4 integer transform.

FIG. 25 is a diagram illustrating data flows for the 4×4 integer transform. As shown in FIG. 25, it is also possible to perform row-direction arithmetic operations for the 4×4 integer transform by combining basic data flows. Similarly, it is possible to perform column-direction arithmetic operations. Therefore, the 4×4 integer transform can also be calculated with the configuration of the arithmetic unit 3010 shown in FIG. 19. Multipliers required for the 4×4 integer transform are stored in the second multiplier storage unit 3015. As can be seen by comparing FIG. 25 with FIG. 23, the input order for the area enclosed in dotted-line frame C is consistent between them, though some multipliers are different. Therefore, for the 4×4 integer transform, the transformer 3000 may cease to operate in the middle of the calculation procedure for the 8×8 integer transform.

FIG. 26 is a diagram illustrating data flows for the 4×4 Hadamard transform. As shown in FIG. 26, it is also possible to perform row-direction arithmetic operations for the 4×4 Hadamard transform by combining basic data flows. Similarly, it is possible to perform column-direction arithmetic operations. Therefore, the 4×4 Hadamard transform can also be calculated with the configuration of the arithmetic unit 3010 shown in FIG. 19. Multipliers required for the 4×4 Hadamard transform are stored in the second multiplier storage unit 3015.

FIG. 27 is a diagram illustrating data flows for the 2×2 Hadamard transform. As shown in FIG. 27, it is also possible to perform row-direction arithmetic operations for the 2×2 Hadamard transform by combining basic data flows. Similarly, it is possible to perform column-direction arithmetic operations. Therefore, the 2×2 Hadamard transform can also be calculated with the configuration of the arithmetic unit 3010 shown in FIG. 19. Multipliers required for the 2×2 Hadamard transform are stored in the second multiplier storage unit 3015.

When a new transform mode emerges, the designer divides the arithmetic procedure for the new transform mode into basic units of arithmetic processing, and sets combinations of pieces of pixel data and multiplier coefficients in association with the number of arithmetic operations. Thereafter, data flows may be created as described above to determine multipliers and a calculation procedure. The determined multipliers are inputted to the new multiplier setting unit 3017 in association with the number of arithmetic operations. In addition, an input is provided to the new multiplier setting unit 3017, regarding which data should be read from the input data storage unit 3001 and the arithmetic data storage unit 3009 in association with the number of arithmetic operations. The new multiplier setting unit 3017 causes the new transform mode multiplier storage unit 3016 to memorize the inputted multipliers in association with the number of arithmetic operations, as well as to memorize which data should be read from the input data storage unit 3001 and the arithmetic data storage unit 3009. Note that in the case of performing an 8×8 matrix transform in the new transform method, the calculation procedure is the same as the calculation procedures for the DCT and the 8×8 integer transform, and therefore it is possible to readily associate the number of arithmetic operations with multipliers and read destinations. When a new arithmetic method is set in the transform mode setting unit 3013, the multiplier setting unit 3011 reads proper multipliers for each number of arithmetic operations from the new transform mode multiplier storage unit 3016, and inputs them to the arithmetic unit 3010, as well as providing an instruction as to which data should be read to the input selection unit 3002 via the arithmetic order management unit 3012. As such, even in the case of a new transform method, by setting data flows with a combination of basic data flows, it is made possible to use a common transform unit with other transform methods.

As such, according to the third embodiment, by implementing a transform in each transform mode based on combinations of basic data flows, it is made possible to share the arithmetic unit, and therefore it is possible to provide an image encoding device and an image decoding device, which are small-sized, but capable of dealing with the DCT, the inverse DCT, the 4×4 integer transform, the 4×4 inverse integer transform, the 8×8 integer transform, the 8×8 inverse integer transform, the 4×4 Hadamard transform, the 2×2 Hadamard transform, and unknown transform methods that will be introduced anew.

Note that in the third embodiment, the image encoding device and the image decoding device capable of switching between the inverse DCT and the DCT and between the integer transform and the inverse integer transform have been proposed, but only the integer transform and the inverse integer transform may be switched.

Fourth Embodiment

FIG. 28 is a block diagram illustrating the configuration of a transformer 4000 according to a fourth embodiment. In FIG. 28, the transformer 4000 includes an input data storage unit 4001, a plurality of arithmetic units 4002, an arithmetic control unit 4003, and an arithmetic data storage unit 4004. In FIG. 28, the input data storage unit 4001 stores input data. The arithmetic units 4002 are each configured in a similar manner to the arithmetic unit 3010 shown in FIG. 19. The arithmetic units 4002 are connected in parallel. The arithmetic data storage unit 4004 stores data obtained by arithmetic operations by the arithmetic units 4002. The arithmetic control unit 4003 designates destinations from which data is to be read and multipliers to the arithmetic units 4002 in accordance with transform modes and the number of arithmetic operations. The arithmetic control unit 4003 designates necessary multipliers and destinations from which data is to be read to each arithmetic unit 4002, such that arithmetic operations in units of basic data flows performed in the third embodiment are concurrently executed by the arithmetic units 4002. The arithmetic control unit 4003 includes the arithmetic order management unit 3012, the multiplier setting unit 3011, the transform mode setting unit 3013, the first to second multiplier storage units 3014 and 3015, the new transform mode multiplier storage unit 3016, and the new multiplier setting unit 3017, which are shown in FIG. 19. Unlike in the third embodiment, the multiplier setting unit 3011 designates necessary multipliers and destinations from which data is to be read to each arithmetic unit 4002, such that a plurality of arithmetic operations are concurrently executed by the arithmetic units 4002.

As such, according to the fourth embodiment, the arithmetic control unit 4003 previously defines which of a plurality of arithmetic units receives necessary pixel data and is caused to execute necessary arithmetic operations, in association with the number of arithmetic operations, before using the arithmetic units in parallel. Since it is possible to cause the transform units to perform arithmetic operations in units of basic data flows, the processing speed of the transformer can be enhanced.

While the foregoing description has been given with respect to the case where the arithmetic units 4002 are caused to execute arithmetic operations in units of basic data flows, the arithmetic control unit 4003 may cause the arithmetic units 4002 to transform pixel data targeted for transformation.

Fifth Embodiment

FIG. 29 is a block diagram illustrating the configuration of a transformer 5000 according to a fifth embodiment. In FIG. 29, the transformer 5000 includes an input data storage unit 5001, a plurality of arithmetic units 5002, an arithmetic control unit 5003, and an arithmetic data storage unit 5004. In FIG. 29, the input data storage unit 5001 stores input data. The arithmetic units 5002 are each configured in a similar manner to the arithmetic unit 3010 shown in FIG. 19. The arithmetic units 5002 are connected in series. The arithmetic data storage unit 5004 stores data obtained by arithmetic operations by the last-stage arithmetic unit 5002. The arithmetic control unit 5003 designates destinations from which data is to be read and multipliers to the arithmetic units 5002 in accordance with transform modes and the number of arithmetic operations. Since the arithmetic units 5002 are connected in series, the arithmetic control unit 5003 instructs the arithmetic units 5002 other than the first-stage arithmetic unit to use arithmetic results by their immediately previous arithmetic unit 5002. On the other hand, the arithmetic control unit 5003 instructs the first-stage arithmetic unit 5002 to read data from the arithmetic data storage unit 5004 or the input data storage unit 5001. The arithmetic units 5002 each perform arithmetic operations in units of basic data flows as performed in the third embodiment. While one arithmetic unit 5002 is performing arithmetic operations in units of basic data flows, the other arithmetic units 5002 perform other arithmetic operations in units of basic data flows. As a result, a plurality of arithmetic operations are performed simultaneously, thereby enhancing the processing speed.

The arithmetic control unit 5003 includes the arithmetic order management unit 3012, the multiplier setting unit 3011, the transform mode setting unit 3013, the first to second multiplier storage units 3014 and 3015, the new transform mode multiplier setting unit 3016, and the new multiplier setting unit 3017, which are shown in FIG. 19. Unlike in the third embodiment, the multiplier setting unit 3011 designates necessary multipliers and destinations from which data is to be read to each arithmetic unit 5002, such that a plurality of arithmetic operations are concurrently executed by the arithmetic units 5002.

As such, according to the fifth embodiment, the arithmetic control unit 5003 previously defines which of a plurality of arithmetic units receives necessary pixel data and is caused to execute necessary arithmetic operations, in association with the number of arithmetic operations, before using the arithmetic units in parallel. Since it is possible to cause the transform units to perform arithmetic operations in units of basic data flows, the processing speed of the transformer can be enhanced.

While the foregoing description has been given with respect to the case where the arithmetic units 5002 are caused to execute arithmetic operations in units of basic data flows, the arithmetic control unit 5003 may cause the arithmetic units 5002 to transform pixel data targeted for transformation.

Note that each of the functional blocks shown in FIG. 3, FIG. 11, FIG. 12, FIG. 13, FIG. 14, FIG. 19, FIG. 28, and FIG. 29 may be implemented as an LSI, which is an integrated circuit. These functional blocks may be formed into one chip or the one chip may include part or all of them. Although the LSI is mentioned herein, it may be referred to as "IC", "system LSI", "super LSI" or "ultra LSI" depending on differences in degree of integration. In addition, the circuit integration approach is not limited to the LSI, and the circuit integration may be implemented by a dedicated circuit or a general-purpose processor. Further, an FPGA (Field Programmable Gate Array), which can be programmed after the LSI is fabricated, and a reconfigurable processor, which allows reconfiguration of connections and settings of circuit cells in the LSI. Furthermore, when a circuit integration technique, which replaces the LSI, emerges with the development of semiconductor technology or because of another derivative technology, such a technique may be naturally used to integrate functional blocks. For example, application of Biotechnology is conceivable.

Note that the present invention may be implemented in the form of software. Specifically, a program capable of executing the above-described operations may be stored in a computer device including a storage unit, and when transforming pixel data, the program may be executed in the CPU, while suitably storing necessary data to the storage unit, thereby obtaining transformed pixel data.

While the invention has been described in detail, the foregoing description is in all aspects illustrative and not restrictive. It is understood that numerous other modifications and variations can be devised without departing from the scope of the invention.

An integer transformer according to the present invention is capable of executing matrix arithmetic operations unique to H.264 with one circuit, and it is useful as a system LSI or the like that constitutes a part of a hardware engine for portable products and the like that are desired to be small-sized. In addition, the processing speed can be enhanced by pipeline processing, and therefore it can be used for applications such as an HDTV (High Definition Television). Furthermore, a small-sized transformer capable of dealing with the DCT, the inverse DCT, the integer transform, the inverse integer transform, the Hadamard transform, and new transform methods is provided, which is extremely useful for image encoding/decoding devices and the like.

The invention claimed is:

1. An image decoding device for decoding compressed image data by switching between a plurality of transform modes from a frequency domain to a time domain as necessary, the image decoding device comprising:
    an arithmetic unit for performing arithmetic processing on a plurality of pieces of inputted pixel data;
    an arithmetic data storage unit for storing an arithmetic result by the arithmetic unit;
    an input selection unit for selecting whether to read pixel data that is to be inputted to the arithmetic unit from the compressed image data or from pixel data stored in the arithmetic data storage unit, and inputting the read pixel data to the arithmetic unit; and
    an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations,
    wherein the arithmetic control unit defines the arithmetic procedure in each transform mode by dividing the arithmetic procedure into basic units of arithmetic processing for each number of arithmetic operations,
    wherein the arithmetic unit is configured to be able to execute the basic units of arithmetic processing,
    wherein the arithmetic control unit controls a combination of pieces of pixel data targeted for the arithmetic processing and the multiplier coefficients, such that the basic units of arithmetic processing are repeated by the arithmetic unit,
    wherein the arithmetic unit includes first to fourth terminals, a first multiplication unit for performing multiplication processing on an input to the first terminal, a second multiplication unit for performing multiplication processing on an input to the third terminal, a third multiplication unit for performing multiplication processing on a input to the second terminal; a fourth multiplication unit for performing multiplication processing on an input to the fourth terminal, a first addition unit for adding an output of the first multiplication unit to an output of the second multiplication unit, and a second addition unit for adding an output of the third multiplication unit to an output of the fourth multiplication unit,
    wherein the arithmetic data storage unit stores arithmetic results by the first and second addition units,
    wherein the arithmetic control unit causes the input selection unit to control, based on the transform mode and the number of arithmetic operations, pieces of pixel data that are to be inputted to the first to fourth terminals, and multipliers as the multiplier coefficients for the first to fourth multiplication units,
    wherein the arithmetic control unit includes a multiplier storage unit for storing the multipliers in association with the transform modes, a multiplier setting unit for setting the multipliers for the first to fourth multiplication units, a transform mode setting unit for managing the transform modes, and an arithmetic order management unit for managing an arithmetic order in the arithmetic unit,
    wherein based on a current transform mode managed by the transform mode setting unit and the number of arithmetic operations managed by the arithmetic order management unit, the multiplier setting unit reads proper multipliers from the multiplier storage unit and sets the multipliers for the first to fourth multiplication units, and
    wherein based on the current transform mode and the number of arithmetic operations, the arithmetic order management unit causes the input selection unit to control the pieces of pixel data that are to be inputted to the first to fourth terminals.

2. The image decoding device according to claim 1, wherein the arithmetic unit is configured to be able to execute an integer arithmetic, and wherein the arithmetic control unit controls a combination of pieces of pixel data targeted for the integer arithmetic, and bit shift amounts for the arithmetic unit as the multiplier coefficients.

3. The image decoding device according to claim 2, wherein the arithmetic unit includes:
   first to eighth terminals;
   a first bit arithmetic unit for bit-shifting an input to the second terminal;
   a second bit arithmetic unit for bit-shifting an input to the third terminal;
   a third bit arithmetic unit for bit-shifting an input to the sixth terminal;
   a fourth bit arithmetic unit for bit-shifting an input to the seventh terminal;
   a first addition unit for adding an input to the first terminal to an output of the second bit arithmetic unit;
   a first subtraction unit for subtracting an input to the fourth terminal from an output of the first bit arithmetic unit;
   a second subtraction unit for subtracting an input to the fifth terminal from an output of the fourth bit arithmetic unit; and
   a second addition unit for adding an input to the eighth terminal to an output of the third bit arithmetic unit,
   wherein the arithmetic data storage unit stores arithmetic results by the first and second addition units and the first and second subtraction units, and
   wherein the arithmetic control unit controls, based on the transform mode and the number of arithmetic operations, pieces of pixel data that are to be inputted to the first to eighth terminals, and bit shift amounts for the first to fourth bit arithmetic units.

4. The image decoding device according to claim 2, wherein the plurality of transform modes include at least two among a 4×4 inverse integer transform, an 8×8 inverse integer transform, and a Hadamard transform.

5. The image decoding device according to claim 1, wherein the basic units of arithmetic processing constitute an arithmetic processing capable of implementing a two-input/two-output data flow.

6. The image decoding device according to claim 1, wherein the arithmetic control unit is capable of storing a combination of pieces of pixel data for a new transform mode and multiplier coefficients in association with the number of arithmetic operations, and when the new transform mode is used, the arithmetic control unit controls the input selection unit and the arithmetic unit based on the stored content.

7. The image decoding device according to claim 1, wherein the arithmetic control unit further includes:
   a multiplier setting unit for setting multipliers for use in a new transform mode in association with the number of arithmetic operations; and
   a new transform mode multiplier storage unit for storing the multipliers set by the multiplier setting unit,
   wherein when the new transform mode is used,
   the multiplier setting unit reads multipliers associated with the number of arithmetic operations from the new transform mode multiplier storage unit, and sets the multipliers for the first to fourth multiplication units, and
   the arithmetic order management unit causes the input selection unit to control the pieces of pixel data that are to be inputted to the first to fourth terminals based on the number of arithmetic operations.

8. The image decoding device according to claim 1, wherein the plurality of transform modes include at least two among an inverse discrete cosine transform, a 4×4 inverse integer transform, an 8×8 inverse integer transform, and a Hadamard transform.

9. The image decoding device according to claim 1,
   wherein a plurality of arithmetic units are connected in parallel or in series, and
   wherein the arithmetic control unit controls the arithmetic units connected in parallel or in series.

10. An image encoding device for encoding image data by switching between a plurality of transform modes from a time domain to a frequency domain as necessary, the image encoding device comprising:
   an arithmetic unit for performing arithmetic processing on a plurality of pieces of inputted pixel data;
   an arithmetic data storage unit for storing an arithmetic result by the arithmetic unit;
   an input selection unit for selecting whether to read pixel data that is to be inputted to the arithmetic unit from the image data or from pixel data stored in the arithmetic data storage unit, and inputting the read pixel data to the arithmetic unit; and
   an arithmetic control unit for controlling, based on a transform mode used and the number of arithmetic operations in the arithmetic unit, a destination from which the pixel data that is to be inputted to the arithmetic unit by the input selection unit is read as well as a combination of pieces of pixel data targeted for the arithmetic processing by the arithmetic unit and multiplier coefficients for the arithmetic processing, the arithmetic control unit previously defining an arithmetic procedure in each transform mode for each unit executable in one arithmetic operation in the arithmetic unit in association with the number of arithmetic operations,
   wherein the arithmetic control unit defines the arithmetic procedure in each transform mode by dividing the arithmetic procedure into basic units of arithmetic processing for each number of arithmetic operations,
   wherein the arithmetic unit is configured to be able to execute the basic units of arithmetic processing,
   wherein the arithmetic control unit controls a combination of pieces of pixel data targeted for the arithmetic processing and the multiplier coefficients, such that the basic units of arithmetic processing are repeated by the arithmetic unit,
   wherein the arithmetic unit includes first to fourth terminals, a first multiplication unit for performing multiplication processing on an input to the first terminal, a second multiplication unit for performing multiplication processing on an input to the third terminal, a third multiplication unit for performing multiplication processing on an input to the second terminal, a fourth multiplication unit for performing multiplication processing on an input to the fourth terminal, a first addition unit for adding an output of the first multiplication unit to an output of the second multiplication unit, and a second addition unit for adding an output of the third multiplication unit to an output of the fourth multiplication unit,
   wherein the arithmetic data storage unit stores arithmetic results by the first and second addition units,
   wherein the arithmetic control unit causes the input selection unit to control, based on the transform mode and the number of arithmetic operations, pieces of pixel data that are to be inputted to the first to fourth terminals, and multipliers as the multiplier coefficients for the first to fourth multiplication units,
   wherein the arithmetic control unit includes a multiplier storage unit for storing the multipliers in association with the transform modes, a multiplier setting unit for setting the multipliers for the first to fourth multiplication units, a transform mode setting unit for managing the transform modes, and an arithmetic order management unit for managing an arithmetic order in the arithmetic unit, wherein based on a current transform mode managed by the transform mode setting unit and the number of arithmetic operations managed by the arithmetic order management unit, the multiplier setting unit reads proper multipliers from the multiplier storage unit and sets the multipliers for the first to fourth multiplication units, and wherein based on the current transform mode and the number of arithmetic operations, the arithmetic order management unit causes the input selection unit to control the pieces of pixel data that are to be inputted to the first to fourth terminals.

11. The image encoding device according to claim 10, wherein the arithmetic unit is configured to be able to execute an integer arithmetic, and wherein the arithmetic control unit controls a combination of pieces of pixel data targeted for the integer arithmetic, and bit shift amounts for the arithmetic unit as the multiplier coefficients.

12. The image encoding device according to claim 11, wherein the arithmetic unit includes:

first to eighth terminals;
a first bit arithmetic unit for bit-shifting an input to the second terminal;
a second bit arithmetic unit for bit-shifting an input to the third terminal;
a third bit arithmetic unit for bit-shifting an input to the sixth terminal;
a fourth bit arithmetic unit for bit-shifting an input to the seventh terminal;
a fifth bit arithmetic unit for bit-shifting an input to the first terminal;
a sixth bit arithmetic unit for bit-shifting an input to the fourth terminal;
a seventh bit arithmetic unit for bit-shifting an input to the fifth terminal;
an eighth bit arithmetic unit for bit-shifting an input to the eighth terminal;
a first addition unit for adding an output of the fifth terminal to an output of the second bit arithmetic unit;
a first subtraction unit for subtracting an output of the first terminal from an output of the sixth bit arithmetic unit;
a second subtraction unit for subtracting an output of the seventh terminal from an output of the fourth bit arithmetic unit; and
a second addition unit for adding an output of the eighth bit arithmetic unit to an output of the third bit arithmetic unit, wherein the arithmetic data storage unit stores arithmetic results by the first and second addition units and the first and second subtraction units, and wherein the arithmetic control unit controls, based on the transform mode and the number of arithmetic operations, pieces of pixel data that are to be inputted to the first to eighth terminals, and bit shift amounts for the first to fourth bit arithmetic units.

13. The image encoding device according to claim 11, wherein the plurality of transform modes include at least two among a 4×4 inverse integer transform, an 8×8 inverse integer transform, a 4×4 integer transform, an 8×8 integer transform, and a Hadamard transform.

14. The image encoding device according to claim 10, wherein the basic units of arithmetic processing constitute an arithmetic processing capable of implementing a two-input/two-output data flow.

15. The image encoding device according to claim 10, wherein the arithmetic control unit is capable of storing a combination of pieces of pixel data for a new transform mode and multiplier coefficients in association with the number of arithmetic operations, and when the new transform mode is used, the arithmetic control unit controls the input selection unit and the arithmetic unit based on the stored content.

16. The image encoding device according to claim 10, wherein the arithmetic control unit further includes:

a multiplier setting unit for setting multipliers for use in a new transform mode in association with the number of arithmetic operations; and
a new transform mode multiplier storage unit for storing the multipliers set by the multiplier setting unit, wherein when the new transform mode is used,
the multiplier setting unit reads multipliers associated with the number of arithmetic operations from the new transform mode multiplier storage unit, and sets the multipliers for the first to fourth multiplication units, and
the arithmetic order management unit causes the input selection unit to control the pieces of pixel data that are to be inputted to the first to fourth terminals based on the number of arithmetic operations.

17. The image encoding device according to claim 10, wherein the plurality of transform modes include at least two among an inverse discrete cosine transform, a 4×4 inverse integer transform, an 8×8 inverse integer transform, a discrete cosine transform, a 4×4 integer transform, an 8×8 integer, transform, and a Hadamard transform.

18. The image encoding device according to claim 10, wherein a plurality of arithmetic units are connected in parallel or in series, and wherein the arithmetic control unit controls the arithmetic units connected in parallel or in series.

* * * * *